(12) United States Patent
Li et al.

(10) Patent No.: US 11,758,127 B2
(45) Date of Patent: *Sep. 12, 2023

(54) INTRA-PICTURE PREDICTION USING NON-ADJACENT REFERENCE LINES OF SAMPLE VALUES

(71) Applicant: Microsoft Technology Licensing, LLC, Redmond, WA (US)

(72) Inventors: Bin Li, Beijing (CN); Jizheng Xu, Beijing (CN); Jiahao Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,342

(22) Filed: Mar. 22, 2022

(65) Prior Publication Data

US 2022/0217331 A1 Jul. 7, 2022

Related U.S. Application Data

(63) Continuation of application No. 16/942,628, filed on Jul. 29, 2020, now Pat. No. 11,317,084, which is a (Continued)

(51) Int. Cl.
*H04N 19/11* (2014.01)
*H04N 19/105* (2014.01)
(Continued)

(52) U.S. Cl.
CPC ........... *H04N 19/105* (2014.11); *H04N 19/11* (2014.11); *H04N 19/117* (2014.11);
(Continued)

(58) Field of Classification Search
CPC .. H04N 19/105; H04N 19/176; H04N 19/159; H04N 19/196
See application file for complete search history.

(56) References Cited

U.S. PATENT DOCUMENTS

| 4,837,848 A | 6/1989 | Henderson et al. |
| 10,764,576 B2 | 9/2020 | Li et al. |

(Continued)

FOREIGN PATENT DOCUMENTS

CN 105096958 11/2015

OTHER PUBLICATIONS

Notice on Reexamination dated Mar. 31, 2022, from Chinese Patent Application No. 201680085403.8, 13 pp.
(Continued)

*Primary Examiner* — Tsion B Owens
(74) *Attorney, Agent, or Firm* — Klarquist Sparkman, LLP

(57) ABSTRACT

Innovations in intra-picture prediction with multiple candidate reference lines available are described herein. For example, intra-picture prediction for a current block uses a non-adjacent reference line of sample values to predict the sample values of the current block. This can improve the effectiveness of the intra-picture prediction when the reference line of sample values that is adjacent the current block includes significant capture noise, significant quantization error, or significantly different values (compared to the current block) due to an occlusion. Innovations described herein include, but are not limited to, the following: intra-picture prediction with multiple candidate reference lines available; encoding/decoding of reference line indices using prediction; filtering of reference sample values; residue compensation; weighted prediction; mode-dependent padding to replace unavailable reference sample values; using in-loop-filtered reference sample values; encoder-side decisions for selecting reference lines; and post-filtering of predicted sample values.

20 Claims, 46 Drawing Sheets

Related U.S. Application Data continuation of application No. 16/099,077, filed as application No. PCT/CN2016/080966 on May 4, 2016, now Pat. No. 10,764,576.

(51) Int. Cl.
| | |
|---|---|
| *H04N 19/176* | (2014.01) |
| *H04N 19/593* | (2014.01) |
| *H04N 19/147* | (2014.01) |
| *H04N 19/117* | (2014.01) |
| *H04N 19/82* | (2014.01) |
| *H04N 19/159* | (2014.01) |
| *H04N 19/196* | (2014.01) |

(52) U.S. Cl.
CPC ......... *H04N 19/147* (2014.11); *H04N 19/159* (2014.11); *H04N 19/176* (2014.11); *H04N 19/593* (2014.11); *H04N 19/82* (2014.11); *H04N 19/196* (2014.11)

(56) References Cited

U.S. PATENT DOCUMENTS

| | | | |
|---|---|---|---|
| 11,303,886 B2 | 4/2022 | Li et al. | |
| 11,317,084 B2 | 4/2022 | Li et al. | |
| 11,323,693 B2 | 5/2022 | Li et al. | |
| 11,563,943 B2* | 1/2023 | Lee | H04N 19/593 |
| 2010/0027655 A1* | 2/2010 | Matsuo | H04N 19/176 375/E7.243 |
| 2013/0251036 A1* | 9/2013 | Lee | H04N 19/593 375/240.12 |
| 2013/0266063 A1* | 10/2013 | Jun | H04N 19/147 375/240.12 |
| 2016/0261868 A1 | 9/2016 | Chien et al. | |
| 2017/0332084 A1* | 11/2017 | Seregin | H04N 19/157 |
| 2017/0347103 A1* | 11/2017 | Yu | H04N 19/126 |
| 2018/0160113 A1 | 6/2018 | Jeong et al. | |

OTHER PUBLICATIONS

Notice on Reexamination dated Jul. 29, 2022, from Chinese Patent Application No. 201680085403.8, 13 pp.

Li et al., "Collect and Add MAPGIS Image Control Points to Correct the Error of the Base Map," Jiangxi Coal Science & Technology, Issue 4, 3 pp. (Dec. 2004) (w/ English abstract).

Notice on the Second Office Action dated Feb. 9, 2023, from Chinese Patent Application No. 201680085403.8, 10 pp.

Notice on Grant of Patent Right for Invention, dated Apr. 22, 2023, from Chinese Patent Application No. 201680085403.8, 4 pp.

* cited by examiner software 180 implementing one or more innovations for
intra-picture prediction with non-adjacent reference line available

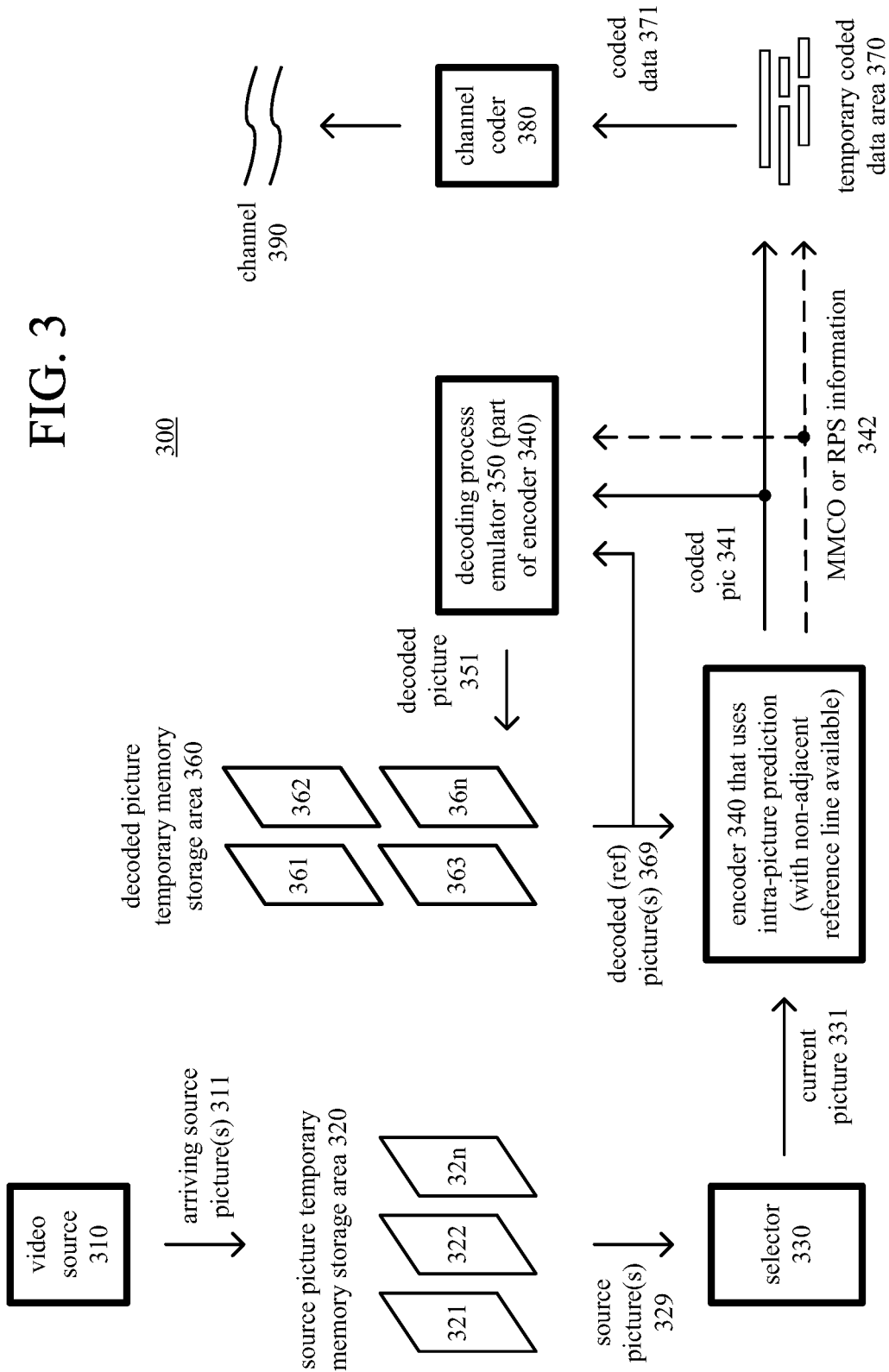

400

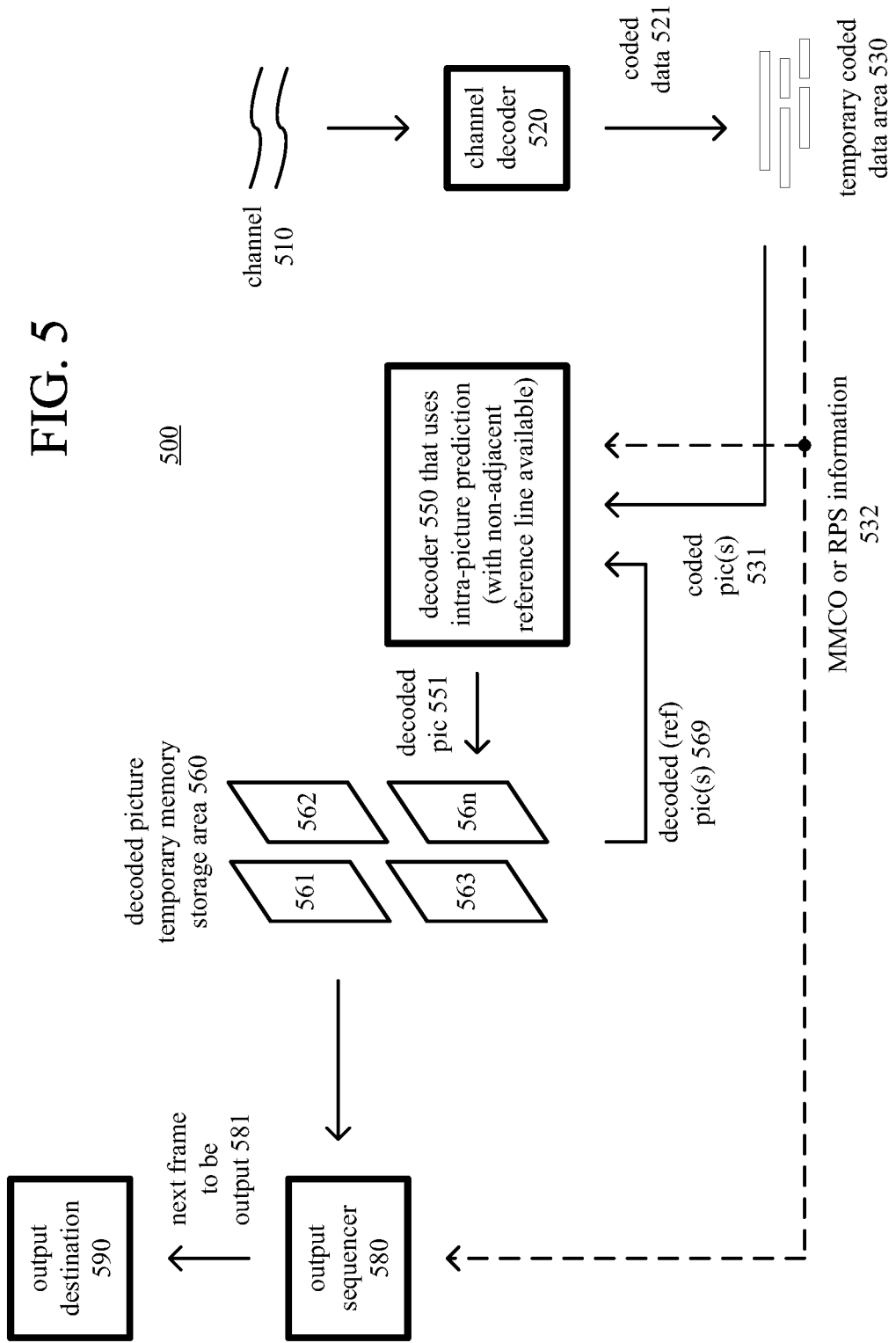

550

FIG. 7    700    angular intra-picture prediction modes usable with a non-adjacent reference line of sample values planar prediction mode for predicted sample value at position A of current block (810), as a weighted average of reference sample values at positions B, C, D, and E ⊛ reconstructed sample value of reference line ⊘ padded sample value of reference line ○ predicted sample value of current block (810)

FIG. 9 900

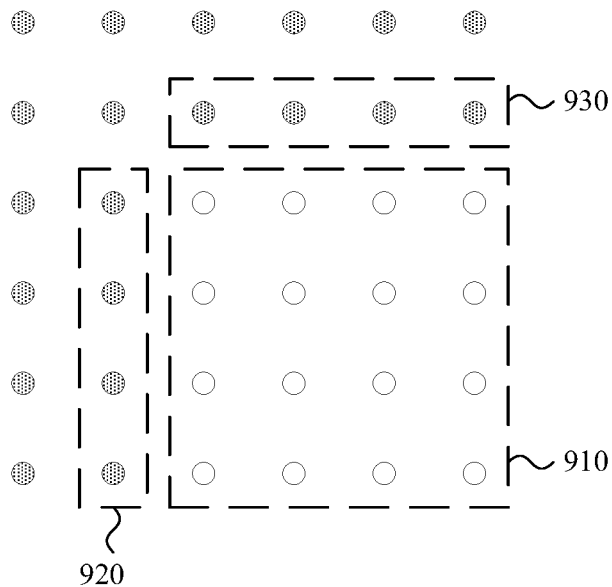

DC prediction mode for predicted sample values at positions of current block (910) using average of sample values (920, 930) of boundary reference lines ⬤ reconstructed sample value of reference line ○ predicted sample value of current block (910)

FIG. 10 1000

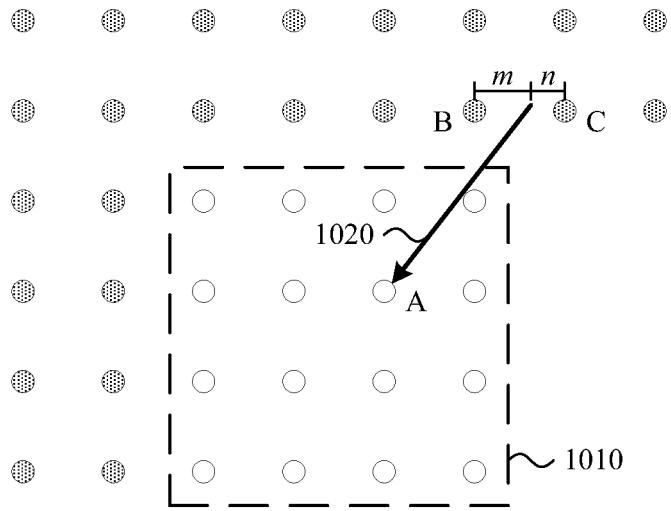

angular prediction mode along prediction direction (1020) for predicted sample value at position A of current block (1010) using interpolation between reference sample values at positions B and C FIG. 13    1300
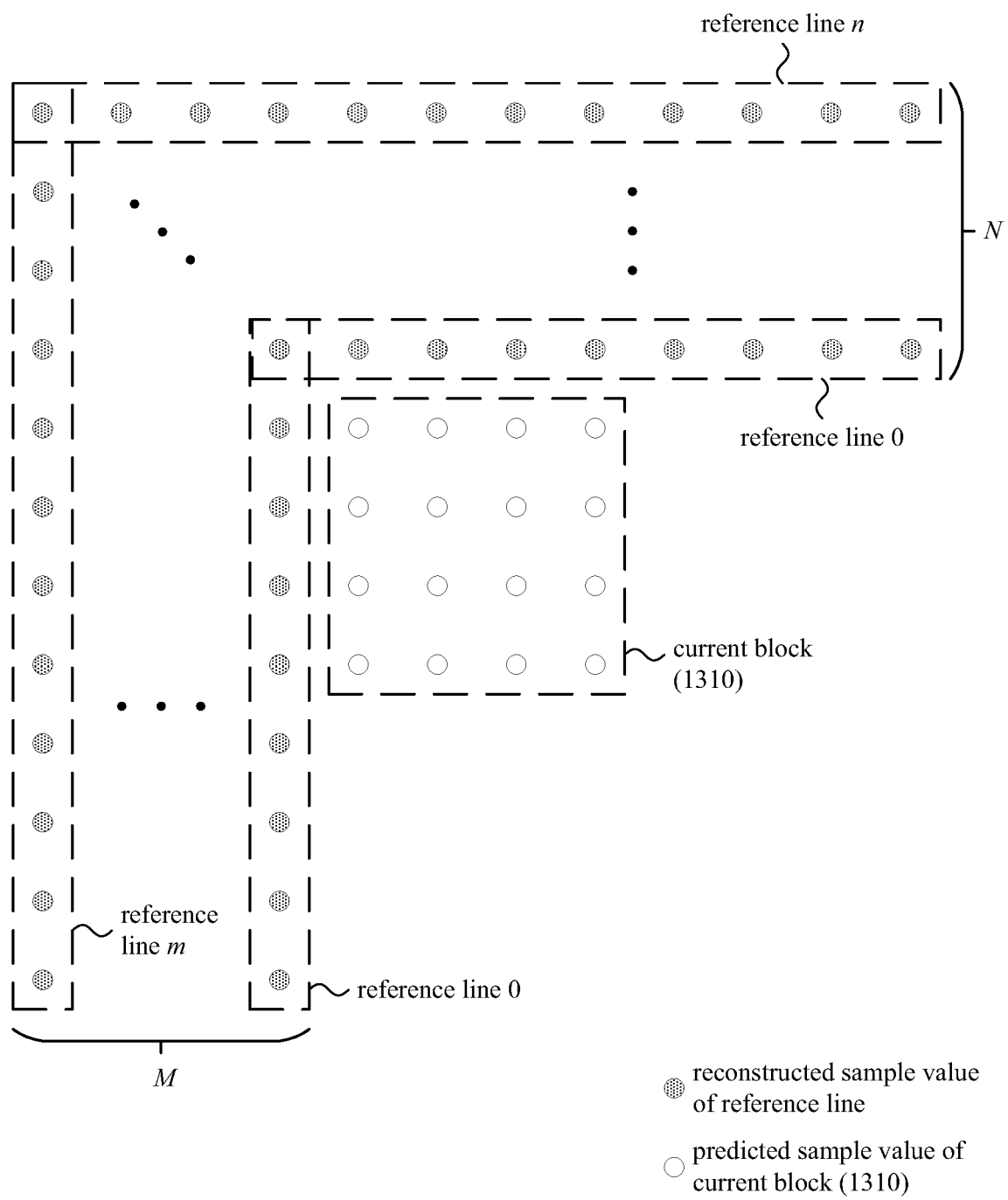

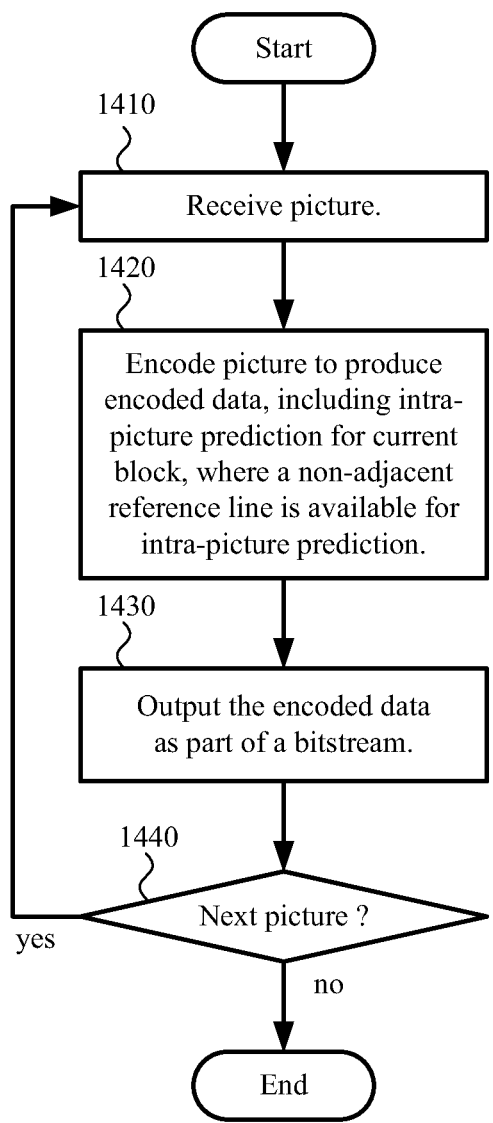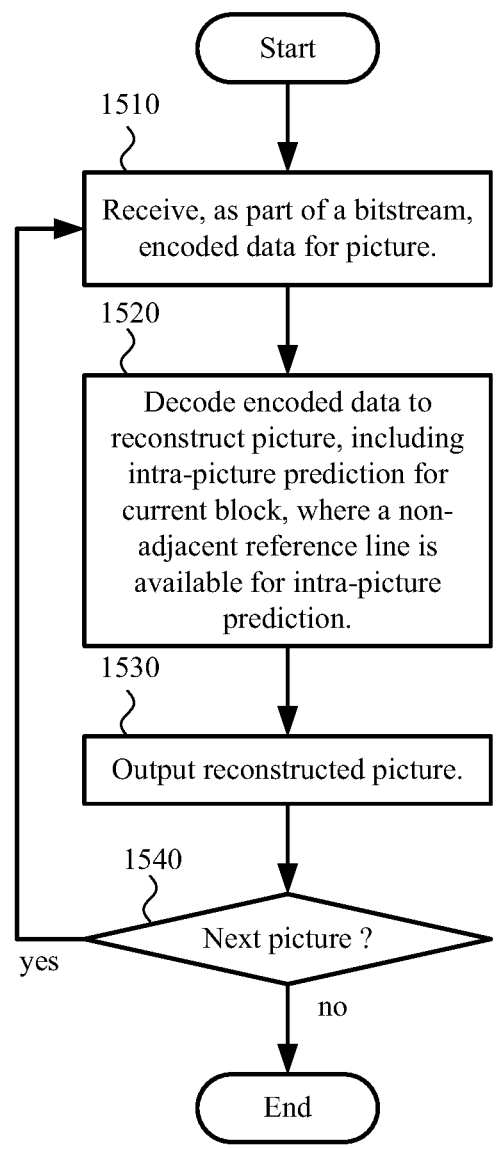

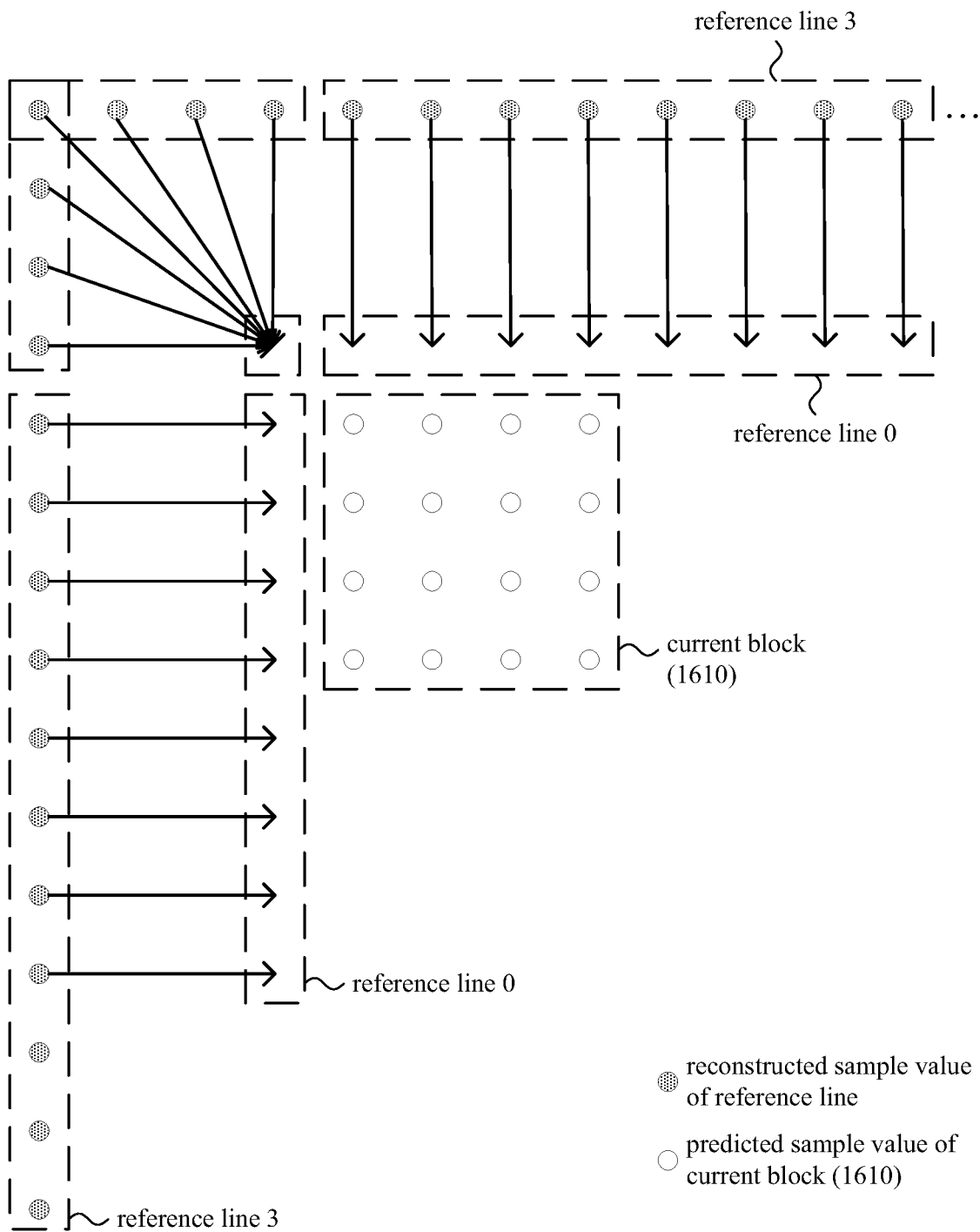
FIG. 16a 1601 sample values copied from non-adjacent reference line to adjacent reference line

FIG. 16b 1602 sample values copied from non-adjacent reference line to adjacent reference line
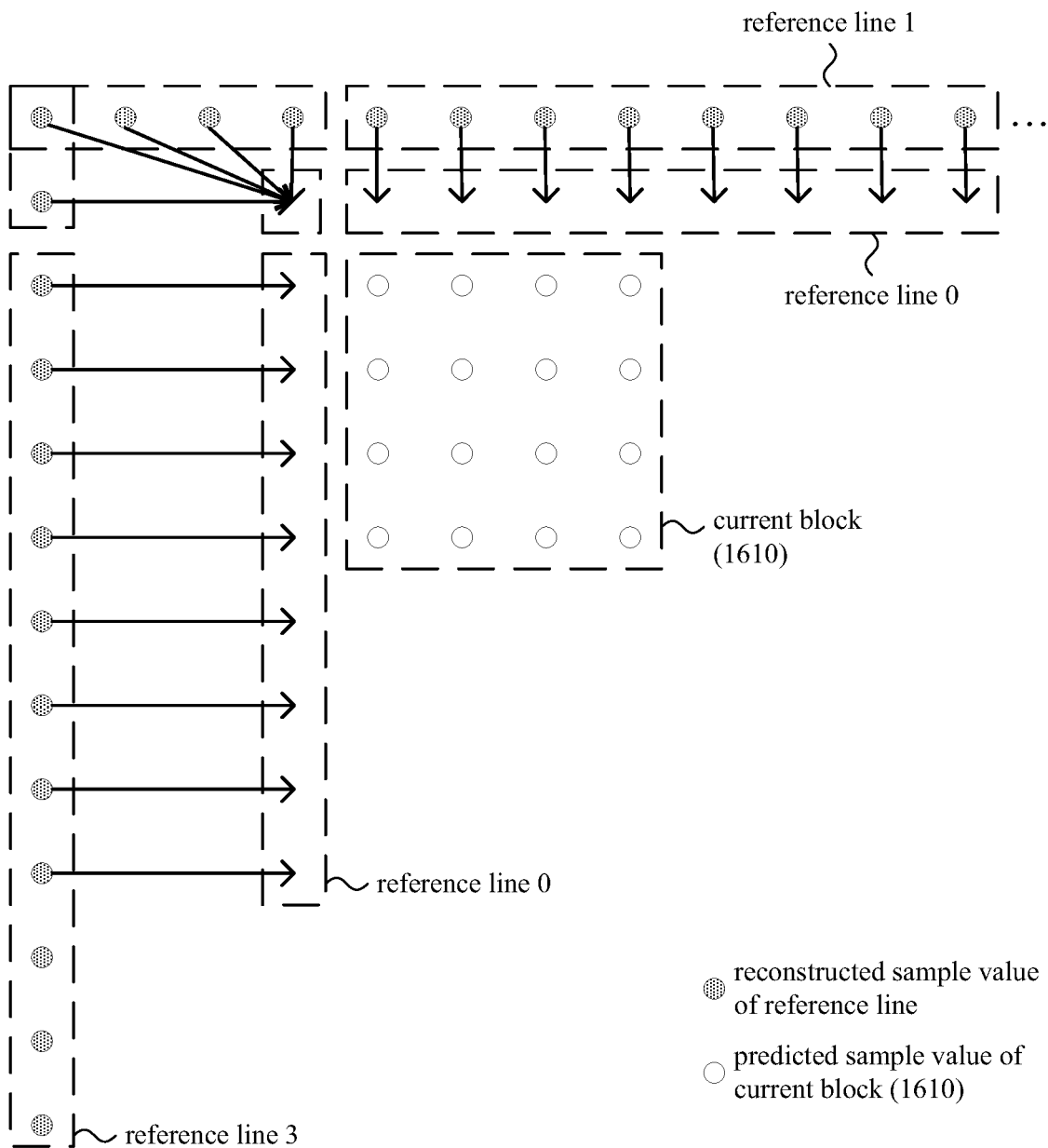

FIG. 17a 1701  intra-picture prediction with sample values of non-adjacent reference line crossing over offset region (1721)
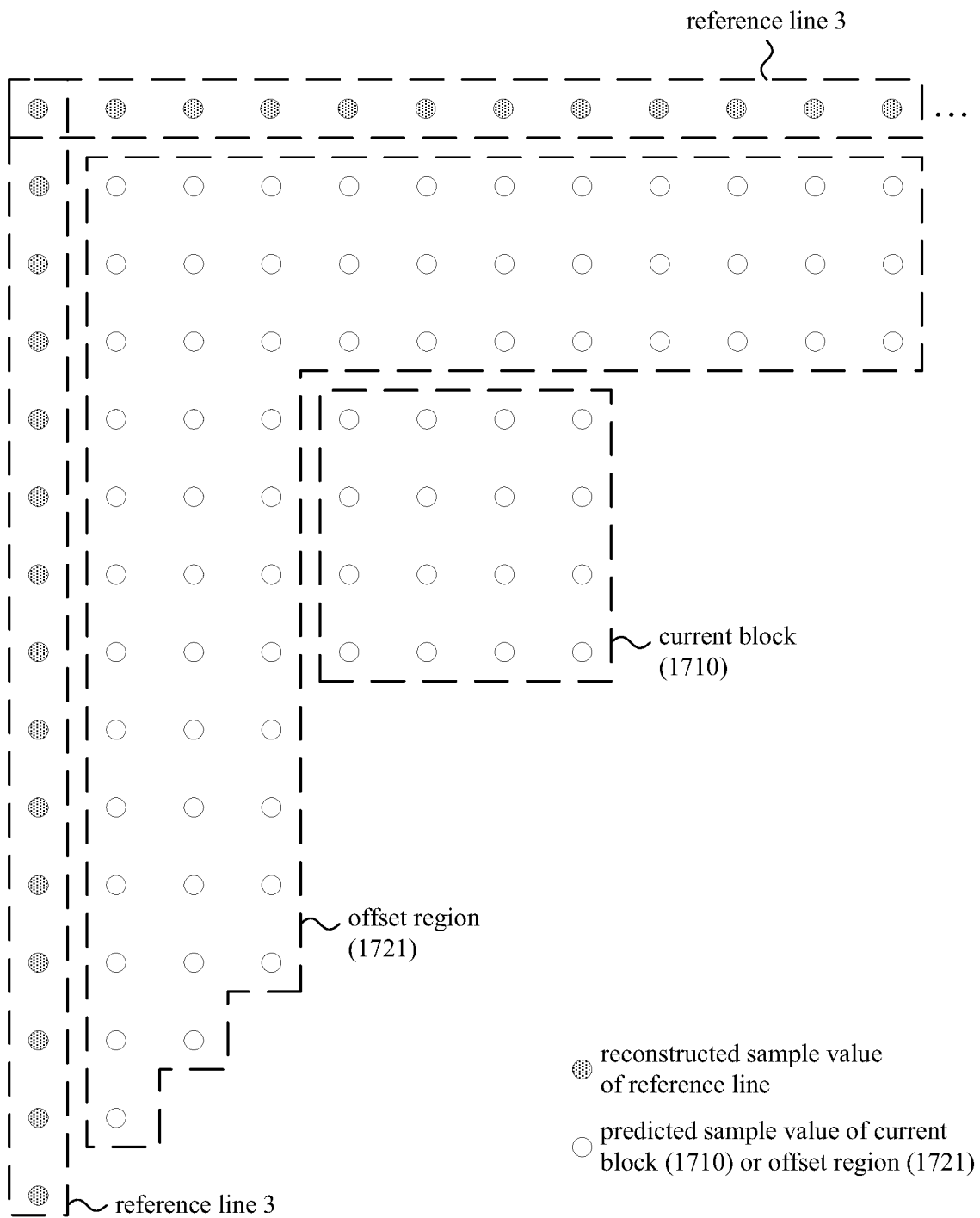

FIG. 18a 1801  filtering sample values of non-adjacent reference line with 1D filter: [1 2 1] / 4
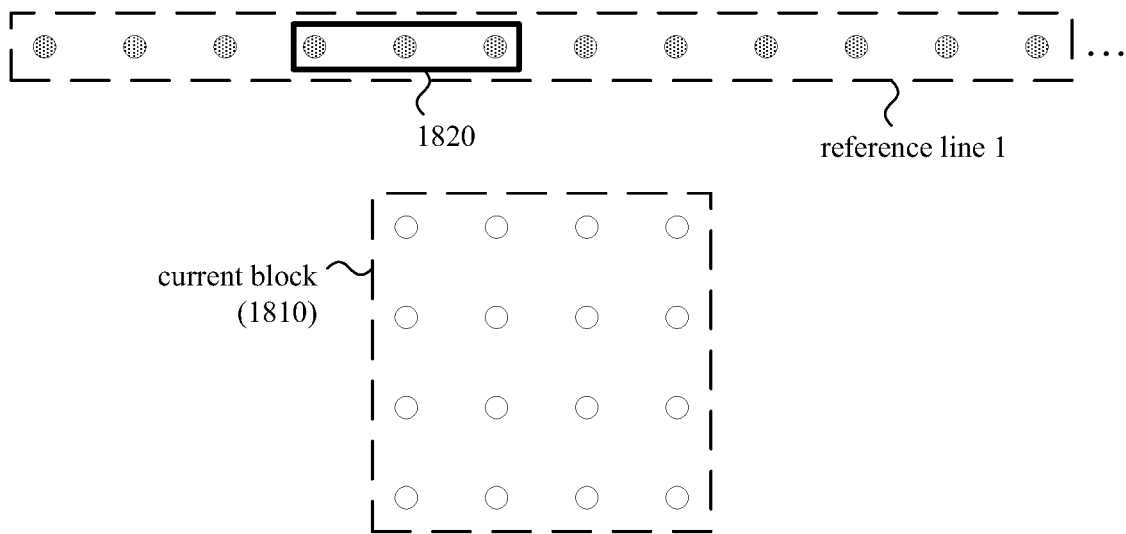
FIG. 18b 1802  filtering sample values of non-adjacent reference line with 2D cross filter having center tap of 4, other taps of 1, and a normalization factor of 8
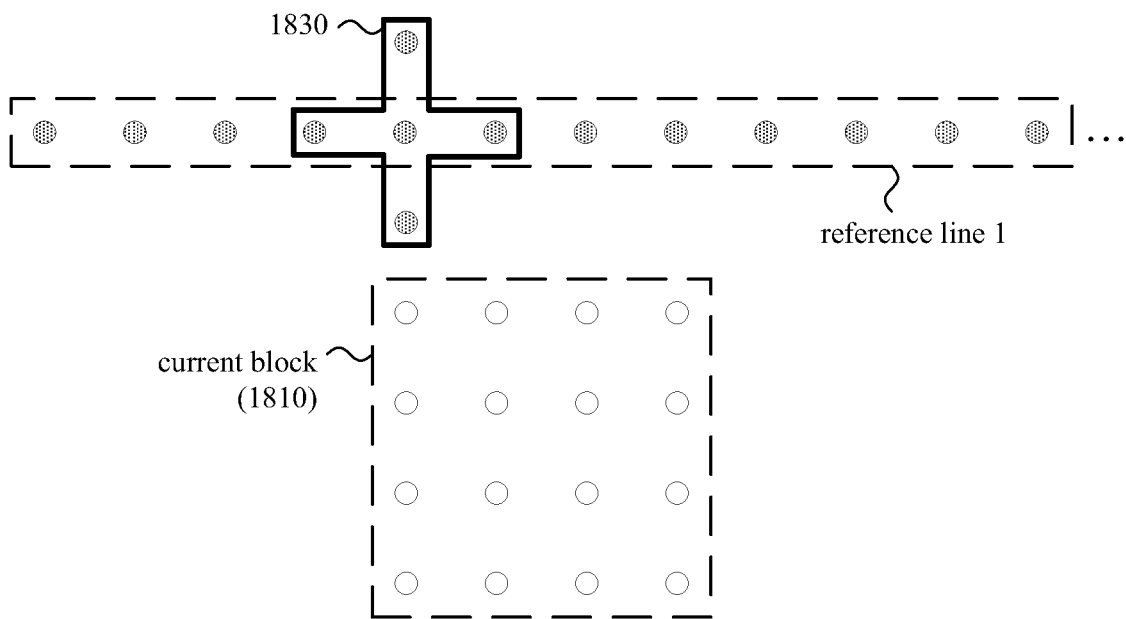

operations as part of intra-picture prediction during encoding (1420) or decoding (1520)

FIG. 20a 2001   Approach 1: vertical intra-picture prediction
with horizontal residue compensation $$pred_B = pred_B + weight \times (ref_A - pred_A)$$

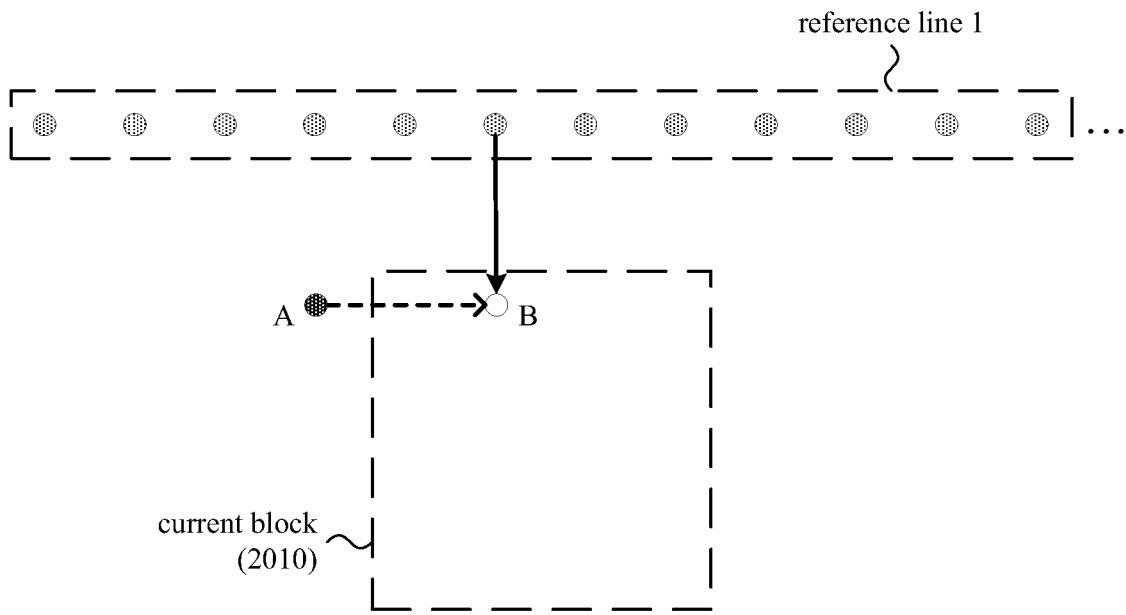

→ direction of intra-picture prediction

--→ direction of residue compensation (orthogonal to prediction direction)

⊙ reconstructed sample value of reference line

○ predicted sample value of current block (2010)

● difference between ref sample value and pred sample value

2003

Approach 1: DC or planar intra-picture prediction with residue compensation $$pred_B = pred_B + weight \times (ref_A - pred_A)$$
$$pred_{B'} = pred_{B'} + weight \times (ref_{A'} - pred_{A'})$$

FIG. 20d 2004    Approach 2: DC or planar intra-picture prediction with residue compensation
$$pred_B = pred_B + weight \times (ref_A - pred_A)$$
$$pred_{B'} = pred_{B'} + weight \times (ref_{A'} - pred_{A'})$$
$$pred_{B''} = pred_{B''} + weight_H \times (ref_{A''} - pred_{A''}) + weight_V \times (ref_{A'''} - pred_{A'''})$$
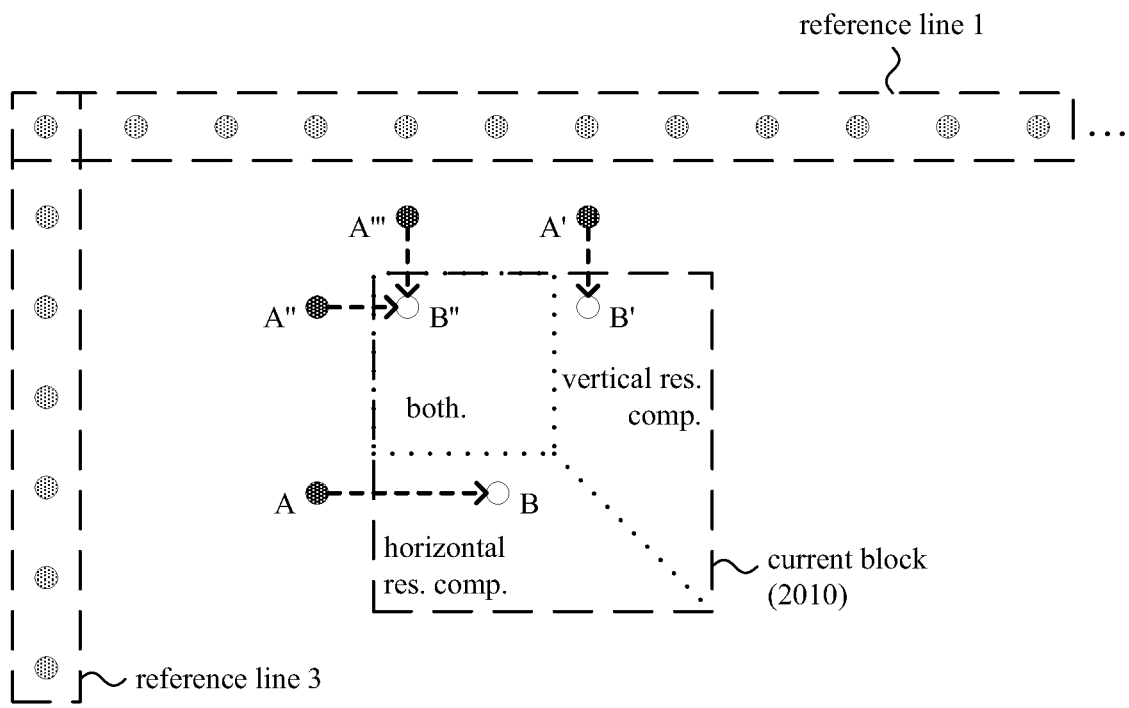

FIG. 20e  2005

Approach 2: intra-picture prediction modes 2-17 with residue compensation $$pred_B = pred_B + weight \times (ref_A - pred_A)$$

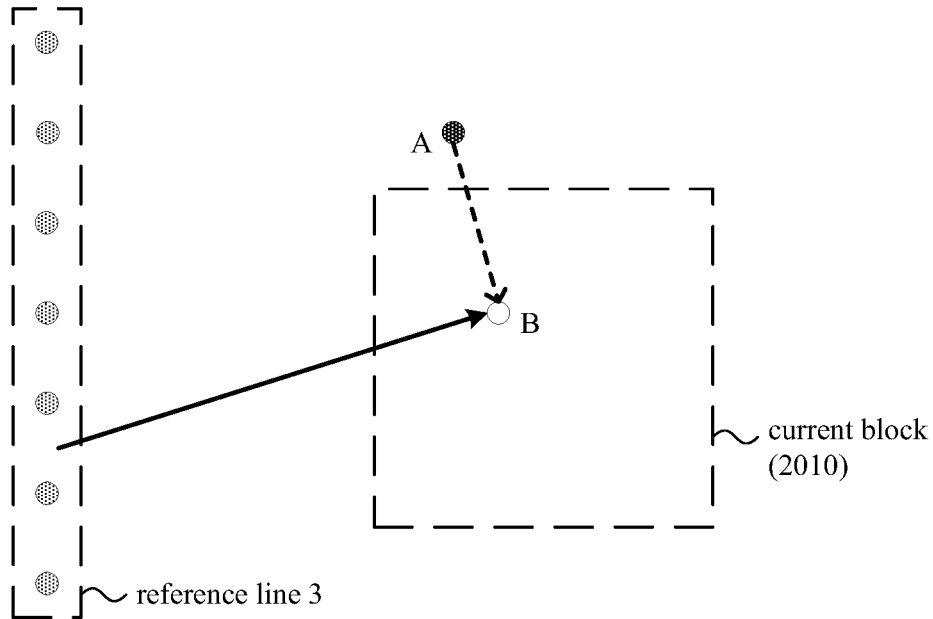

current block (2010)

reference line 3

→ direction of intra-picture prediction (mode *dir_mode*)

--→ direction of residue compensation (orthogonal to prediction direction)

⊙ reconstructed sample value of reference line

○ predicted sample value of current block (2010)

● difference between ref sample value and pred sample value

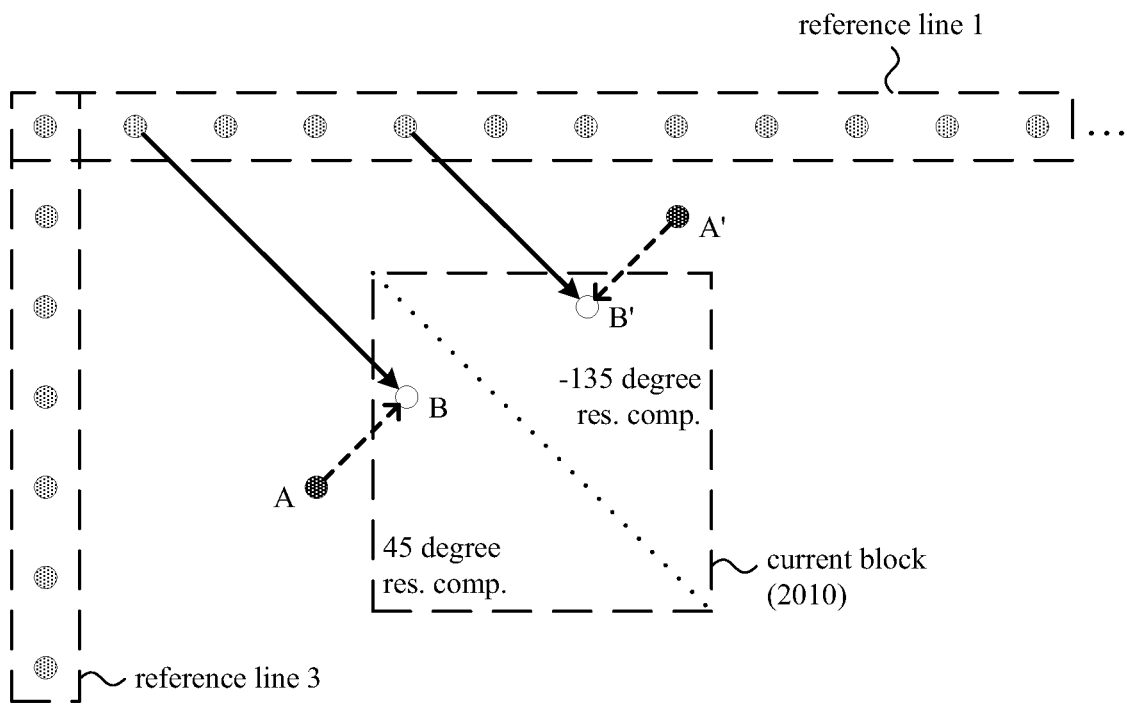
FIG. 20f 2006 Approach 2: intra-picture prediction mode 18 with residue compensation
$$pred_B = pred_B + weight \times (ref_A - pred_A)$$
$$pred_{B'} = pred_{B'} + weight \times (ref_{A'} - pred_{A'})$$

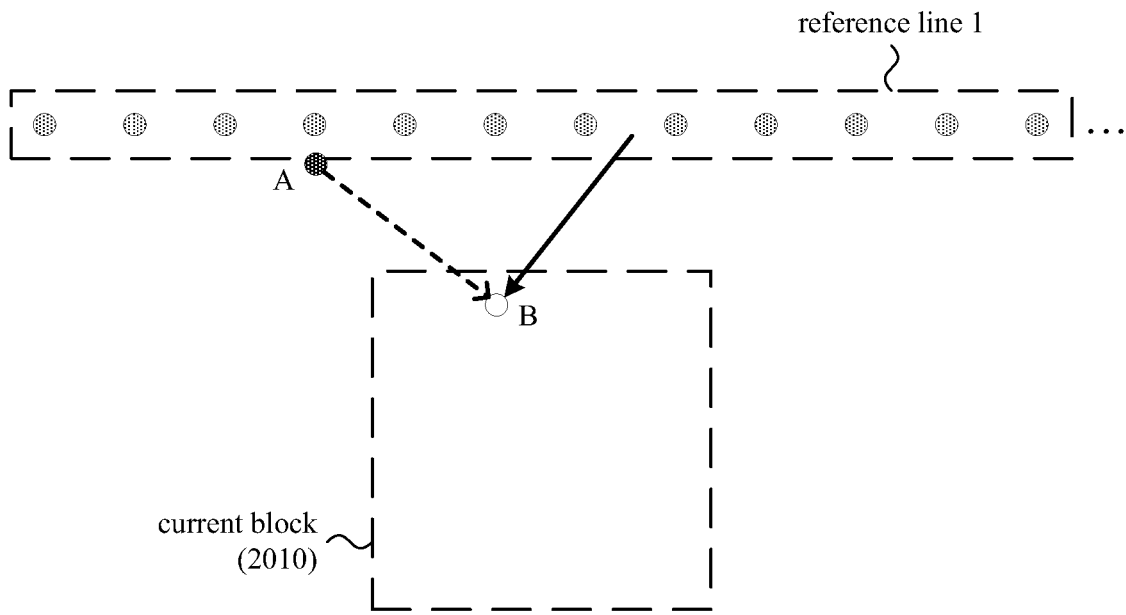

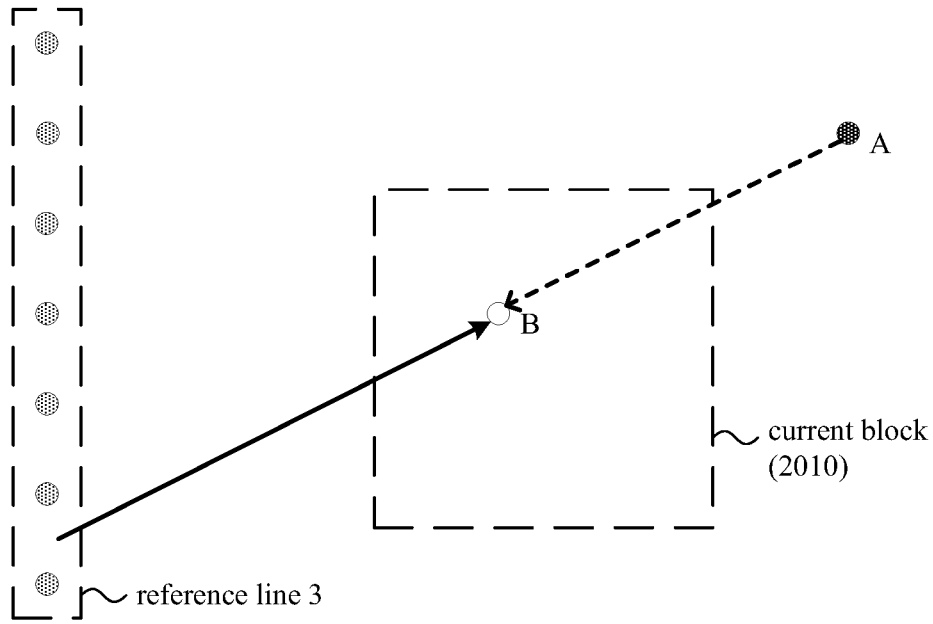
FIG. 20h — Approach 3: intra-picture prediction modes 2-6 with residue compensation
$$pred_B = pred_B + weight \times (ref_A - pred_A)$$

FIG. 20j

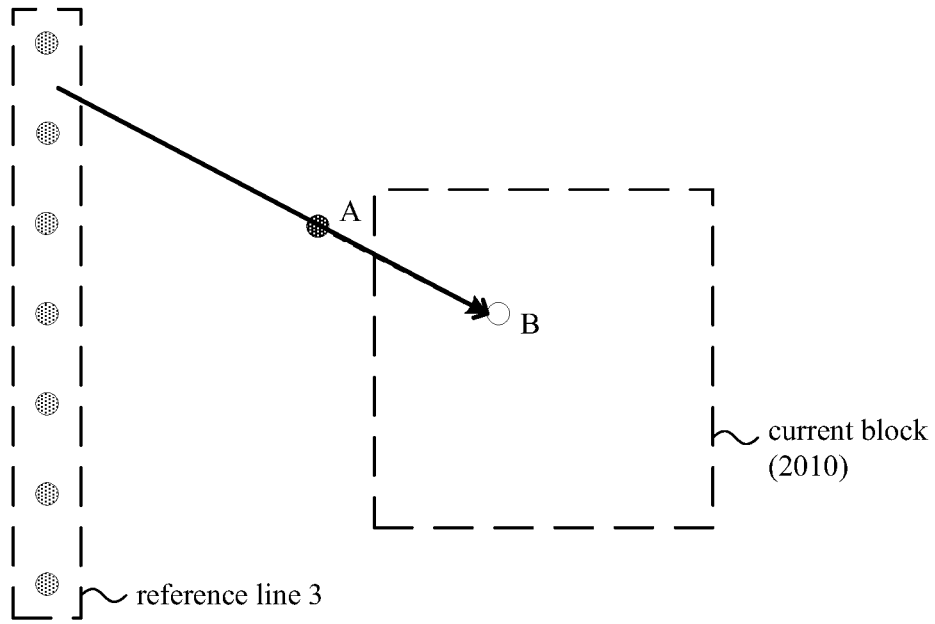

Approach 3: intra-picture prediction modes 14-22 with residue compensation $$pred_B = pred_B + weight \times (ref_A - pred_A)$$

→ direction of intra-picture prediction (mode *dir_mode*)

--→ direction of residue compensation (parallel to prediction direction)

⊙ reconstructed sample value of reference line

○ predicted sample value of current block (2010)

● difference between ref sample value and pred sample value

FIG. 20k 2011 Approach 3: intra-picture prediction modes 23-29 with residue compensation
$$pred_B = pred_B + weight \times (ref_A - pred_A)$$
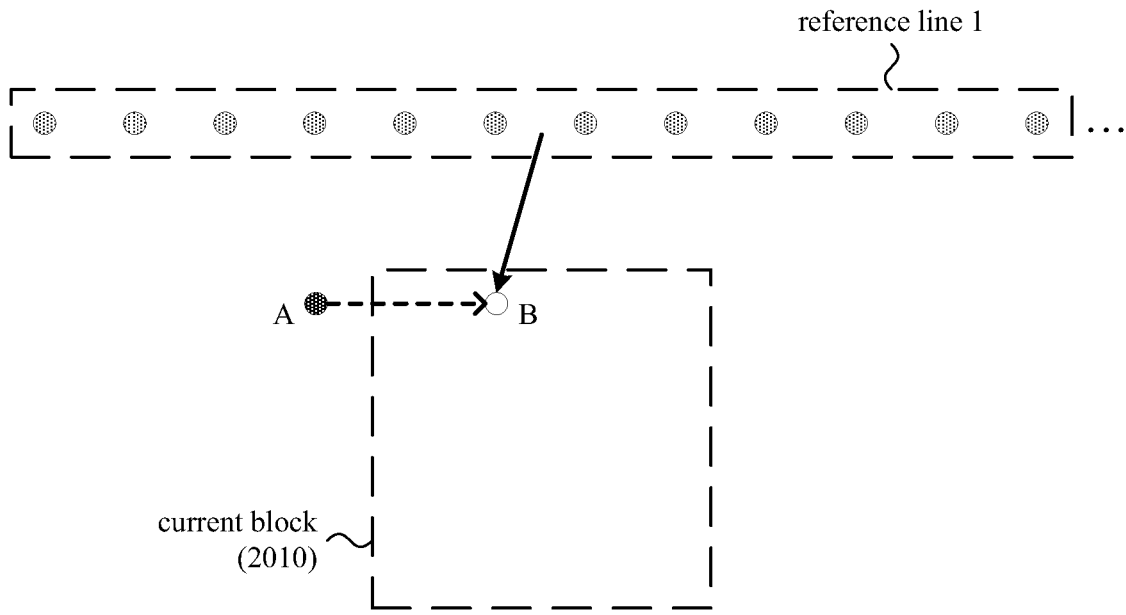

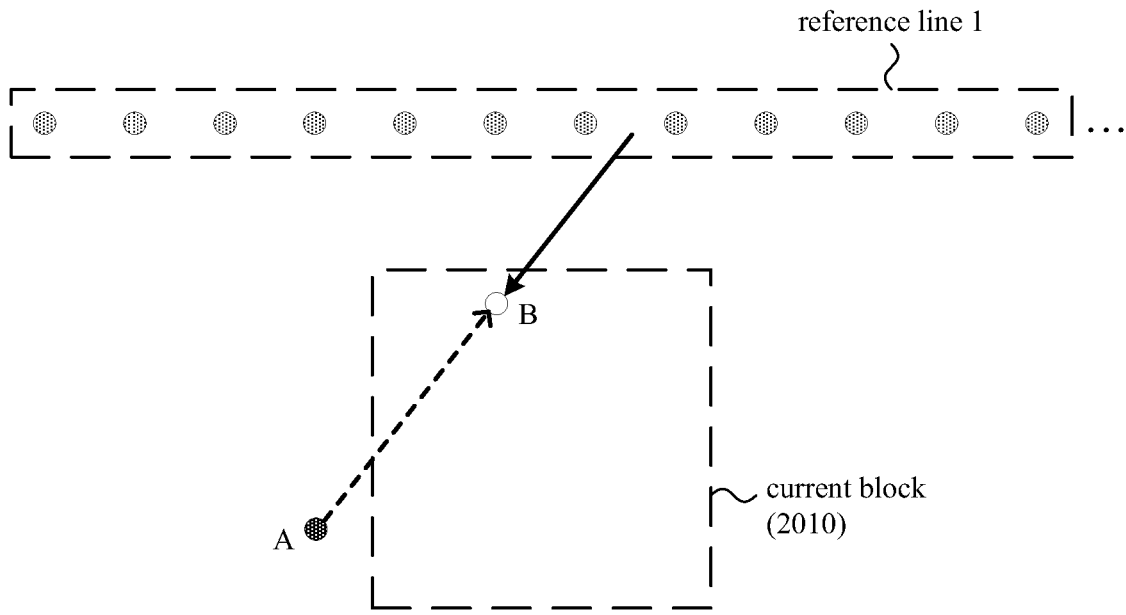
FIG. 201 — Approach 3: intra-picture prediction modes 30-34 with residue compensation
$$pred_B = pred_B + weight \times (ref_A - pred_A)$$

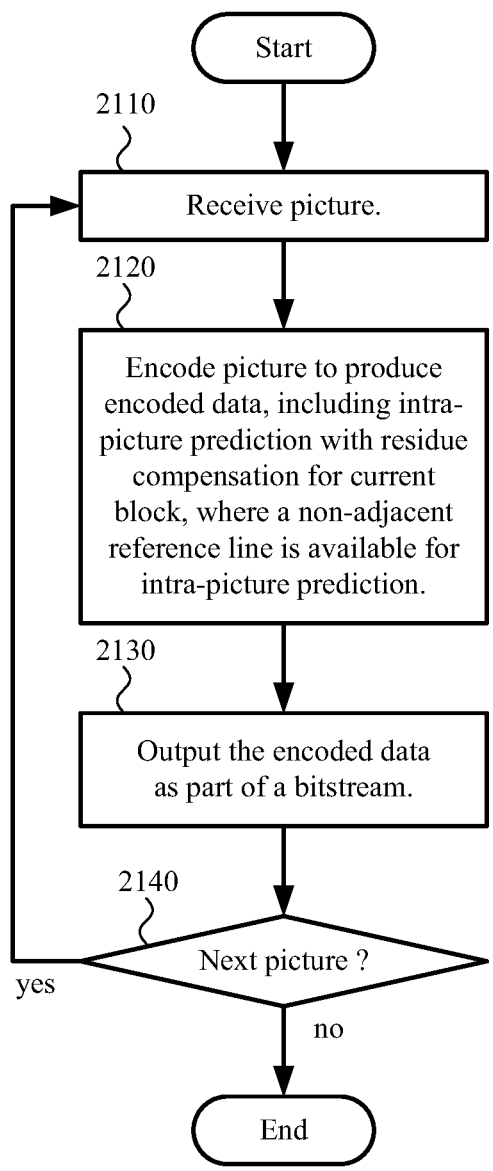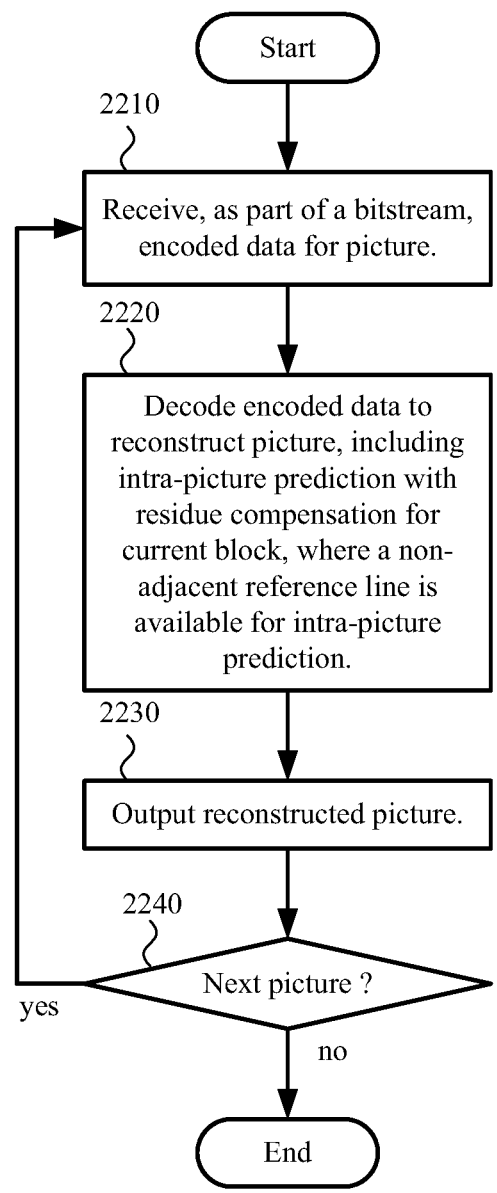

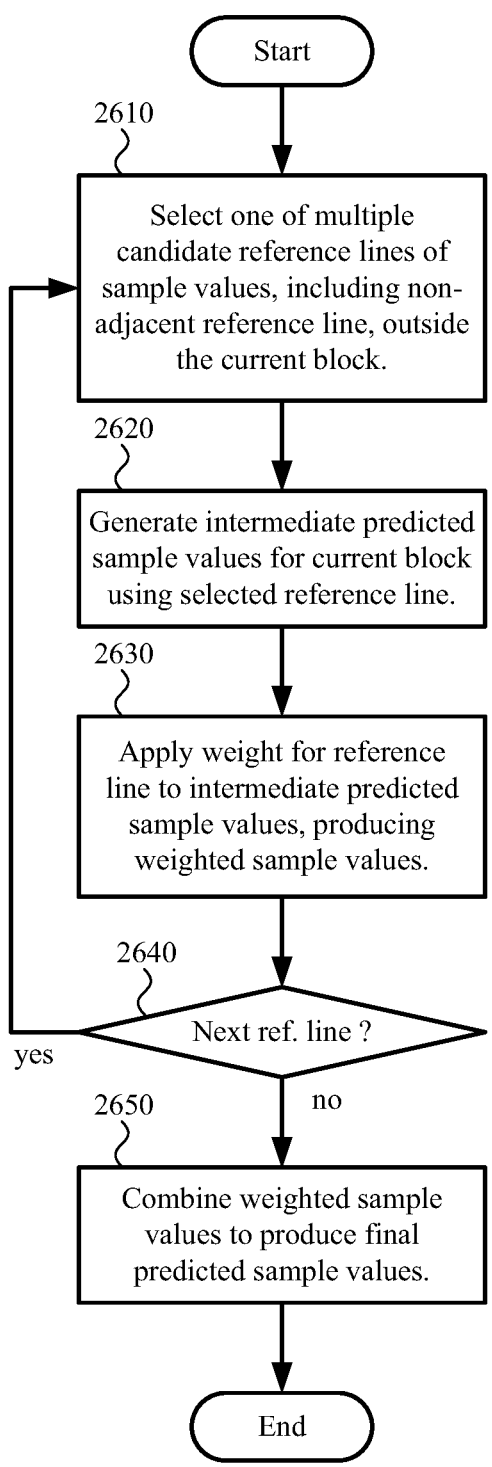
FIG. 26  2600  operations as part of weighted prediction during encoding (2420) or decoding (2520)

FIG. 27 2700

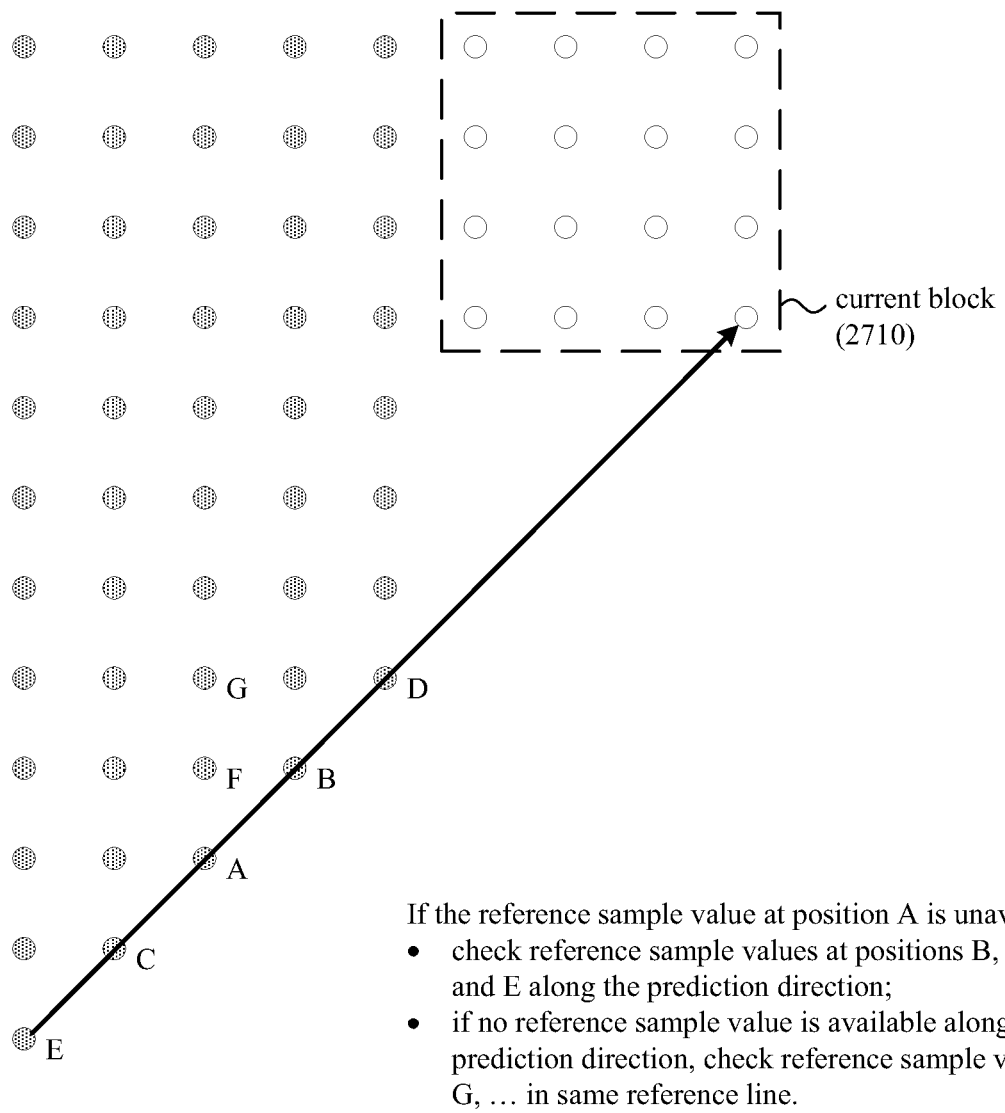

If the reference sample value at position A is unavailable:
- check reference sample values at positions B, C, D, and E along the prediction direction;
- if no reference sample value is available along the prediction direction, check reference sample values F, G, ... in same reference line.

→ direction of intra-picture prediction

◉ reconstructed sample value of reference line

○ predicted sample value of current block (2710)

FIG. 28  2800

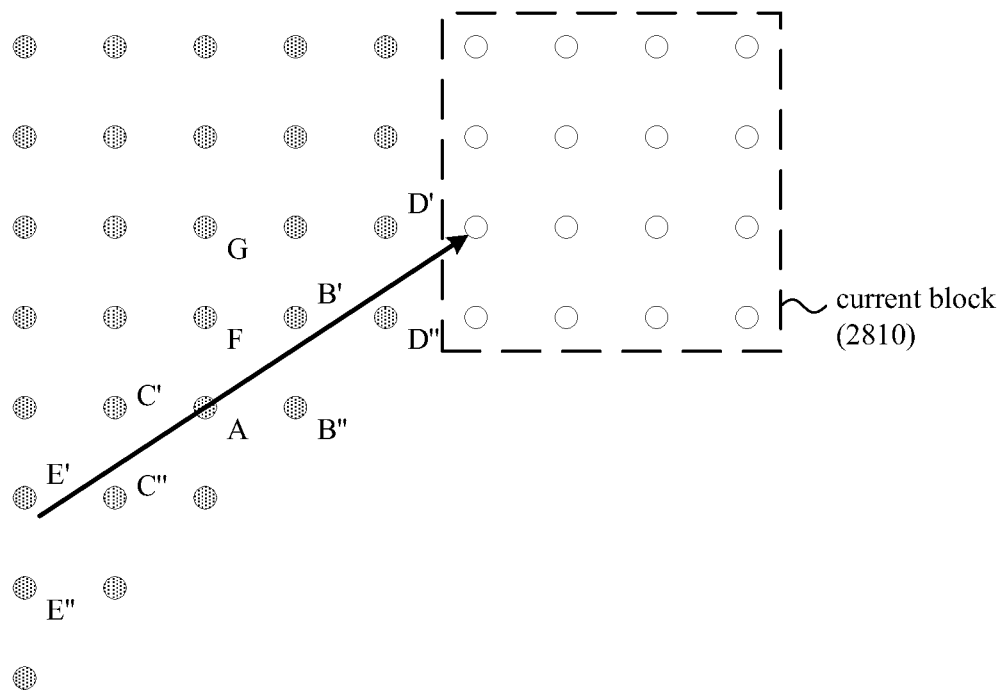

If the reference sample value at position A is unavailable:
- check interpolated sample values along the prediction direction (at positions between B' and B", C' and C", D' and D", E' and E");
- if no sample value is available along the prediction direction, check reference sample values F, G, ... in same reference line.

→ direction of intra-picture prediction

⊛ reconstructed sample value of reference line

○ predicted sample value of current block (2810)

Approach 1: select reference line(s) and intra-picture prediction mode(s) for unit (*e.g.*, coding unit, prediction unit)

Approach 2: select reference line(s) and intra-picture prediction mode(s) for unit (*e.g.*, coding unit, prediction unit)

Approach 3: select reference line(s) for transform unit post-filtering of predicted sample values of current block (3810) after horizontal intra-picture prediction:

$$pred_A = pred_A + (ref_B - ref_C)/x + (ref_B - ref_D)/y + (ref_F - ref_E)/z$$

post-filtering of predicted sample values of current block (3910) after DC intra-picture prediction:

$$pred_A = (x \times pred_A + y \times ref_B + z \times ref_C)/(x+y+z)$$

Filter reference sample value at position D depending on reference sample values at positions along the prediction direction (A, B, C, and D).

Filter reference sample value at position D depending on reference sample values at positions along the prediction direction (position between A' and A", B, position between C' and C", D).

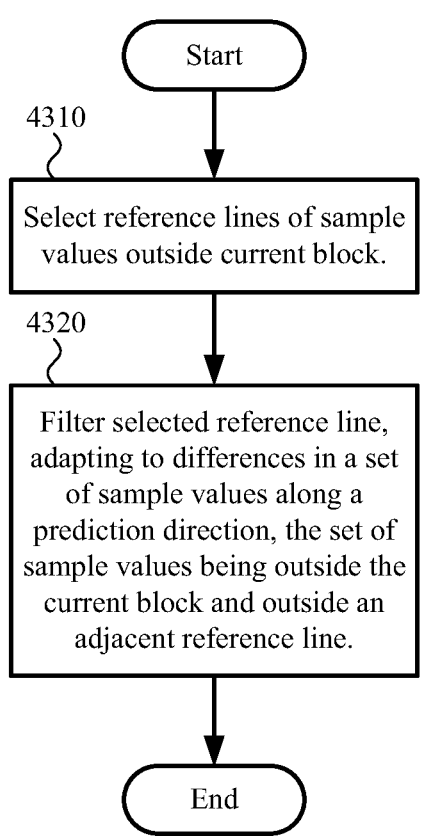
FIG. 43 — 4300: operations as part of intra-picture prediction during encoding (1420) or decoding (1520)

INTRA-PICTURE PREDICTION USING NON-ADJACENT REFERENCE LINES OF SAMPLE VALUES

CROSS REFERENCE TO RELATED APPLICATIONS

This application is a continuation of U.S. patent application Ser. No. 16/942,628, filed Jul. 29, 2020, which is a continuation of U.S. patent application Ser. No. 16/099,077, filed Nov. 5, 2018, now U.S. Pat. No. 10,764,576, which is a U.S. National Stage of International Application No. PCT/CN2016/080966, filed May 4, 2016, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

Some codec standards and formats use intra-picture prediction when compressing a picture. In general, for intra-picture prediction, the sample values of a current block are predicted using the neighboring sample values. The neighboring sample values, which are called reference sample values, have been encoded and reconstructed (during encoding) or reconstructed (during decoding) before the current block. Conventionally, reference sample values in the nearest row (adjacent row) above the current block and reference sample values in the nearest column (adjacent column) left of the current block are available for use in intra-picture prediction of the current block. Some intra-picture prediction modes are directional, or angular, modes in which reference sample values are propagated along a prediction direction into the current block. Other intra-picture prediction modes such as DC (average) prediction mode and planar prediction mode are not directional, but instead use combinations of reference sample values to predict the sample values of the current block. During encoding, after intra-picture prediction, differences (called residual values) between the original sample values of the current block and predicted sample values of the current block can be calculated and encoded. During decoding, the residual values for the current block can be decoded and combined with the predicted sample values of the current block to reconstruct the sample values of the current block.

Conventionally, intra-picture prediction uses reference sample values in the adjacent row above the current block and/or reference sample values in the adjacent column left of the current block. In some cases, the reference sample values do not provide for effective intra-picture prediction. This might be the case, for example, when the reference sample values in the adjacent row/column include noise due to capture (i.e., capture noise) or compression (i.e., quantization error, reconstruction noise). Or, as another example, this might be the case when there is an object in the adjacent row/column that occludes an object shown in the current block. Whatever the cause, in some cases, intra-picture prediction using the reference sample values of an adjacent row/column is ineffective.

SUMMARY

In summary, the detailed description presents innovations in intra-picture prediction with multiple candidate reference lines available. For example, intra-picture prediction uses a non-adjacent row and/or column of reference sample values to predict the sample values of a current block. This can improve the effectiveness of the intra-picture prediction when the row and/or column of reference sample values adjacent the current block includes significant capture noise, significant quantization error, or significantly different sample values than the current block due to an occlusion.

According to one aspect of the innovations described herein, a video encoder or image encoder receives a picture, encodes the picture to produce encoded data, and outputs the encoded data as part of a bitstream. As part of the encoding, the encoder performs intra-picture prediction for a current block of sample values in the picture. A non-adjacent reference line (e.g., row or column) of sample values is available for the intra-picture prediction. As part of the encoding, the encoder can determine a predictor for a reference line index. The reference line index identifies a reference line (e.g., row or column) of sample values used in the intra-picture prediction for the current block. The predictor is used to encode the reference line index. Effective prediction of reference line indices can reduce the bitrate associated with signaling of the reference line indices when multiple candidate reference lines are available for intra-picture prediction.

A corresponding video decoder or image decoder receives encoded data as part of a bitstream, decodes the encoded data to reconstruct a picture, and outputs the reconstructed picture. As part of the decoding, the decoder performs intra-picture prediction for a current block of sample values in the picture. A non-adjacent reference line (e.g., row or column) of sample values is available for the intra-picture prediction. As part of the decoding, the decoder can determine a predictor for a reference line index. The predictor is used to decode the reference line index.

According to another aspect of the innovations described herein, an encoder or decoder uses residue compensation in intra-picture prediction with multiple candidate reference lines available. For example, as part of the residue compensation, for a predicted sample value at a given position in the current block, the encoder or decoder calculates a residual value and uses the residual value to adjust the predicted sample value at the given position in the current block. The residual value is based on a difference between a reconstructed sample value at a given position in an offset region, outside the current block, and a predicted sample value at the given position in the offset region. Residue compensation can improve the effectiveness of intra-picture prediction for the current block by adjusting the predicted sample values of the current block based on results of intra-picture prediction in the adjacent offset region.

According to another aspect of the innovations described herein, an encoder or decoder uses filtering of reference lines in intra-picture prediction with multiple candidate reference lines available. For example, the encoder or decoder selects one of multiple candidate reference lines of sample values outside the current block (including the non-adjacent reference line of sample values) and filters the selected reference line of sample values. Filtering of the selected reference line can improve the effectiveness of intra-picture prediction for the current block by smoothing outlier values among the sample values of the selected reference line.

According to another aspect of the innovations described herein, an encoder or decoder performs weighted prediction during intra-picture prediction with multiple candidate reference lines available. For example, for each of multiple reference lines, the encoder or decoder generates an intermediate predicted sample value at a given position in the current block, using at least one sample value of that reference line, and applies a weight to the intermediate predicted sample value. This produces a weighted sample value at the given position in the current block. The encoder or decoder combines the weighted sample values (from intra-picture prediction with the respective reference lines) at the given position to produce a final predicted sample value at the given position in the current block. Weighted prediction can improve the effectiveness of intra-picture prediction for the current block by blending predicted sample values from different reference lines, when no single reference line provides better performance.

According to another aspect of the innovations described herein, an encoder or decoder performs mode-dependent padding to replace one or more unavailable sample values during intra-picture prediction with multiple candidate reference lines available. For example, after selecting one of multiple candidate reference lines of sample values, the encoder or decoder determines that a sample value of the selected reference line is unavailable at a given position of the selected reference line. The encoder or decoder identifies a padding direction of an intra-picture prediction mode, then determines a sample value of another reference line on a projection through the given position of the selected reference line in the padding direction. The encoder or decoder sets the unavailable sample value at the given position of the selected reference line based at least in part on the determined sample value of the other reference line. Mode-dependent padding, compared to simple padding within a reference line, can yield padded sample values that provide more effective intra-picture prediction.

According to another aspect of the innovations described herein, an encoder or decoder performs intra-picture prediction, in some cases, with in-loop-filtered reference sample values. For example, when the encoder or decoder selects a non-adjacent reference line of sample values for use in intra-picture prediction for a current block, at least some of the sample values of the selected reference line may have been modified by in-loop filtering prior to use in the intra-picture prediction for the current block. So long as the reference sample values are not dependent on sample values of the current block (or another block that has not yet been reconstructed), in-loop filtering of the reference sample values can improve the effectiveness of subsequent intra-picture prediction using the reference sample values.

According to another aspect of the innovations described herein, an encoder uses any of various approaches to select one or more reference lines to use in intra-picture prediction. In a computationally efficient manner, these approaches can identify appropriate reference lines to use in the intra-picture prediction.

According to another aspect of the innovations described herein, an encoder or decoder filters predicted sample values during intra-picture prediction. For example, after selecting one or more reference lines of sample values outside a current block, the encoder or decoder predicts the sample values of the current block using at least some sample values of the one or more selected reference lines. Then, the encoder or decoder filters at least some of the predicted sample values of the current block, using at least some sample values that are outside the current block and outside an adjacent reference line. By using reference sample values outside the adjacent reference line, in some cases, the filtering yields predicted sample values that are closer to the original sample values.

According to another aspect of the innovations described herein, an encoder or decoder filters reference sample values with direction-dependent filtering during intra-picture prediction. For example, after selecting a reference line of sample values outside a current block, the encoder or decoder filters the selected reference line of sample values. The filtering adapts to differences in a set of sample values along a prediction direction for the intra-picture prediction, where at least some of the set of sample values is outside the current block and outside an adjacent reference line. In some cases, such filtering yields reference sample values that provide more effective intra-picture prediction.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 3 is a diagram illustrating an example video encoder system in conjunction with which some described embodiments can be implemented.

FIG. 5 is a diagram of an example decoder system in conjunction with which some described embodiments can be implemented.

FIGS. 8-10 are diagrams illustrating examples of operations for intra-picture prediction modes in some described embodiments.

FIG. 13 is a diagram illustrating examples of multiple candidate reference lines of sample values available for intra-picture prediction of a current block.

FIGS. 14 and 15 are flowcharts illustrating generalized techniques for encoding and decoding, respectively, using intra-picture prediction with multiple candidate reference lines available, including a non-adjacent reference line.

FIGS. 16a and 16b are diagrams illustrating examples of intra-picture prediction with copying of sample values from non-adjacent reference lines to adjacent reference lines.

FIGS. 17a and 17b are diagrams illustrating examples of intra-picture prediction with sample values of non-adjacent reference lines crossing over offset regions.

FIGS. 18a and 18b are diagrams illustrating examples of filters for sample values of reference lines.

FIGS. 20a-20l are diagrams illustrating examples of residue compensation during intra-picture prediction.

FIGS. 21 and 22 are flowcharts illustrating generalized techniques for intra-picture prediction with residue compensation during encoding and decoding, respectively.

FIG. 26 is a flowchart illustrating an example technique for weighted prediction during intra-picture prediction with multiple reference lines.

FIGS. 27 and 28 are diagrams illustrating examples of mode-dependent padding to replace unavailable sample values.

FIG. 43 is a flowchart illustrating a generalized technique for adaptive, direction-dependent filtering of reference sample values during encoding or decoding.

DETAILED DESCRIPTION

The detailed description presents innovations in intra-picture prediction with multiple candidate reference lines available. For example, intra-picture prediction uses a non-adjacent reference line of sample values to predict the sample values of a current block. This can improve the effectiveness of the intra-picture prediction when the reference line of sample values that is adjacent the current block includes significant capture noise, significant quantization error, or significantly different sample values (compared to the current block) due to an occlusion. Innovations described herein include, but are not limited to, the following: intra-picture prediction with multiple candidate reference lines available; encoding/decoding of reference line indices using prediction; filtering of reference sample values; residue compensation; weighted prediction; mode-dependent padding to replace unavailable reference sample values; using in-loop-filtered reference sample values; encoder-side decisions for selecting reference lines; and post-filtering of predicted sample values.

Some of the innovations described herein are illustrated with reference to terms specific to the H.265 standard, or extensions or variations of the H.265 standard. The innovations described herein can also be implemented for extensions or variations of other video codec standards or formats (e.g., the VP9 format, H.264 standard), including future video codec standards or formats that permit the use non-adjacent reference lines for intra-picture prediction.

In the examples described herein, identical reference numbers in different figures indicate an identical component, module, or operation. Depending on context, a given component or module may accept a different type of information as input and/or produce a different type of information as output, or be processed in a different way.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

Figure 1:
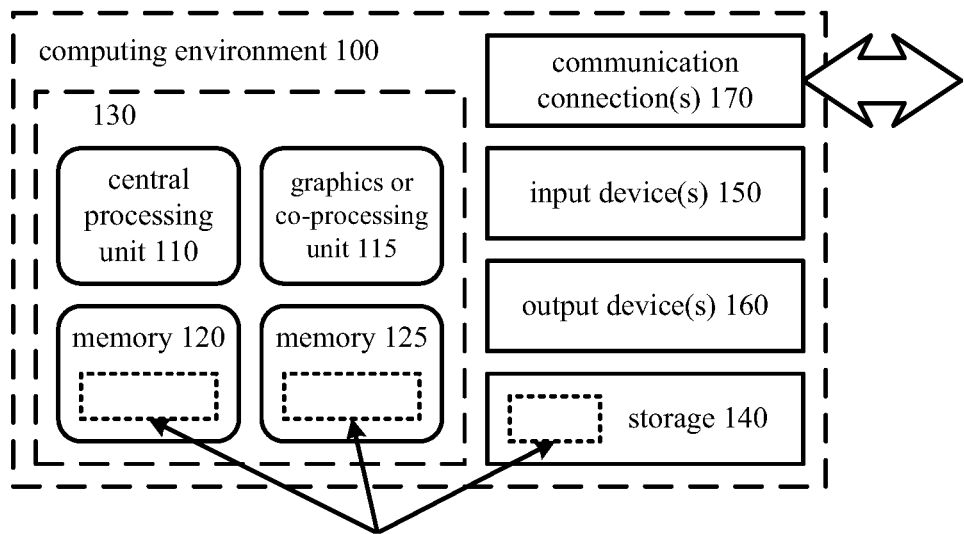
FIG. 1 is a diagram illustrating an example computer system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for intra-picture prediction with non-adjacent reference lines of sample values available, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic media such as magnetic disks, magnetic tapes or cassettes, optical media such as CD-ROMs or DVDs, or any other medium which can be used to store information and which can be accessed within the computer system (100). The storage (140) stores instructions for the software (180) implementing one or more innovations for intra-picture prediction with non-adjacent reference lines of sample values available.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or other device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. Thus, the computer-readable media can be, for example, volatile memory, non-volatile memory, optical media, or magnetic media. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computing device. In general, a computer system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "select" and "determine" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
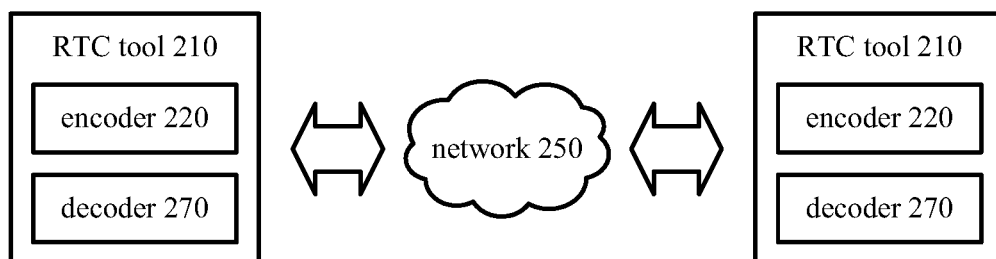
FIGS. 2*a* and 2*b* are diagrams illustrating example network environments in which some described embodiments can be implemented.
Figure 2B:
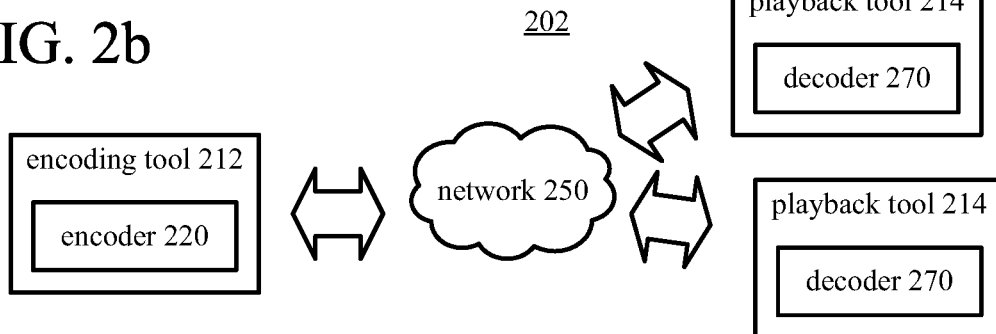

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264/AVC), another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 5 shows an example decoder system (500) that can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212). FIG. 5 shows an example decoder system (500) that can be included in the playback tool (214). Alternatively, the playback tool (214) uses another decoder system.

III. Example Encoder Systems.

FIG. 3 shows an example video encoder system (300) in conjunction with which some described embodiments may be implemented. The video encoder system (300) includes a video encoder (340) that uses intra-picture prediction with non-adjacent reference lines available for the intra-picture prediction. The encoder (340) is further detailed in FIGS. 4a and 4b.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder (340), the video encoder system (300) can include a pre-processor (not shown) that performs pre-processing (e.g., filtering) of the current picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. In general, a pixel is the set of one or more collocated sample values for a location in a picture, which may be arranged in different ways for different chroma sampling formats.

Figure 4A:
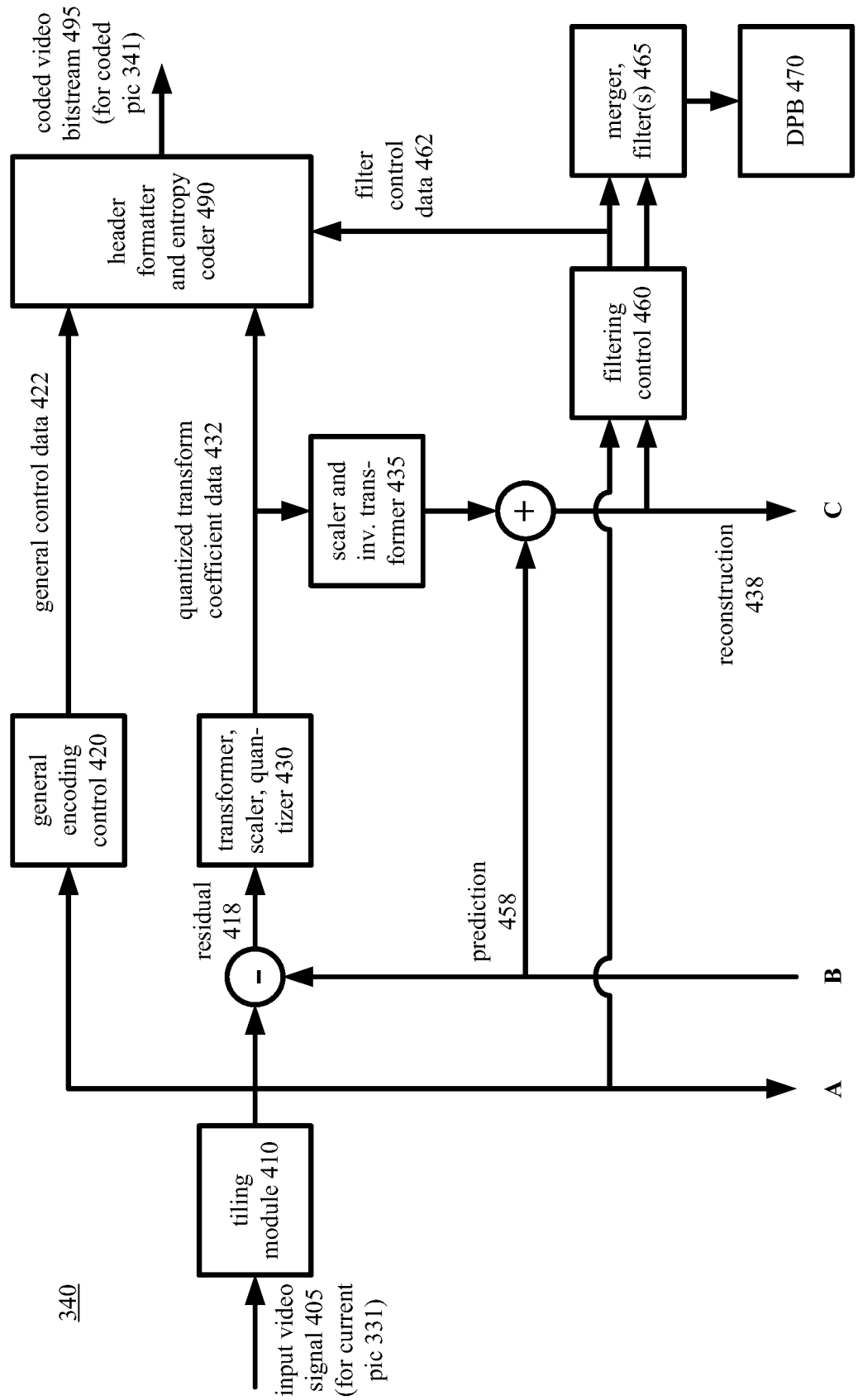
FIGS. 4*a* and 4*b* are diagrams illustrating an example video encoder in conjunction with which some described embodiments can be implemented.
Figure 4B:
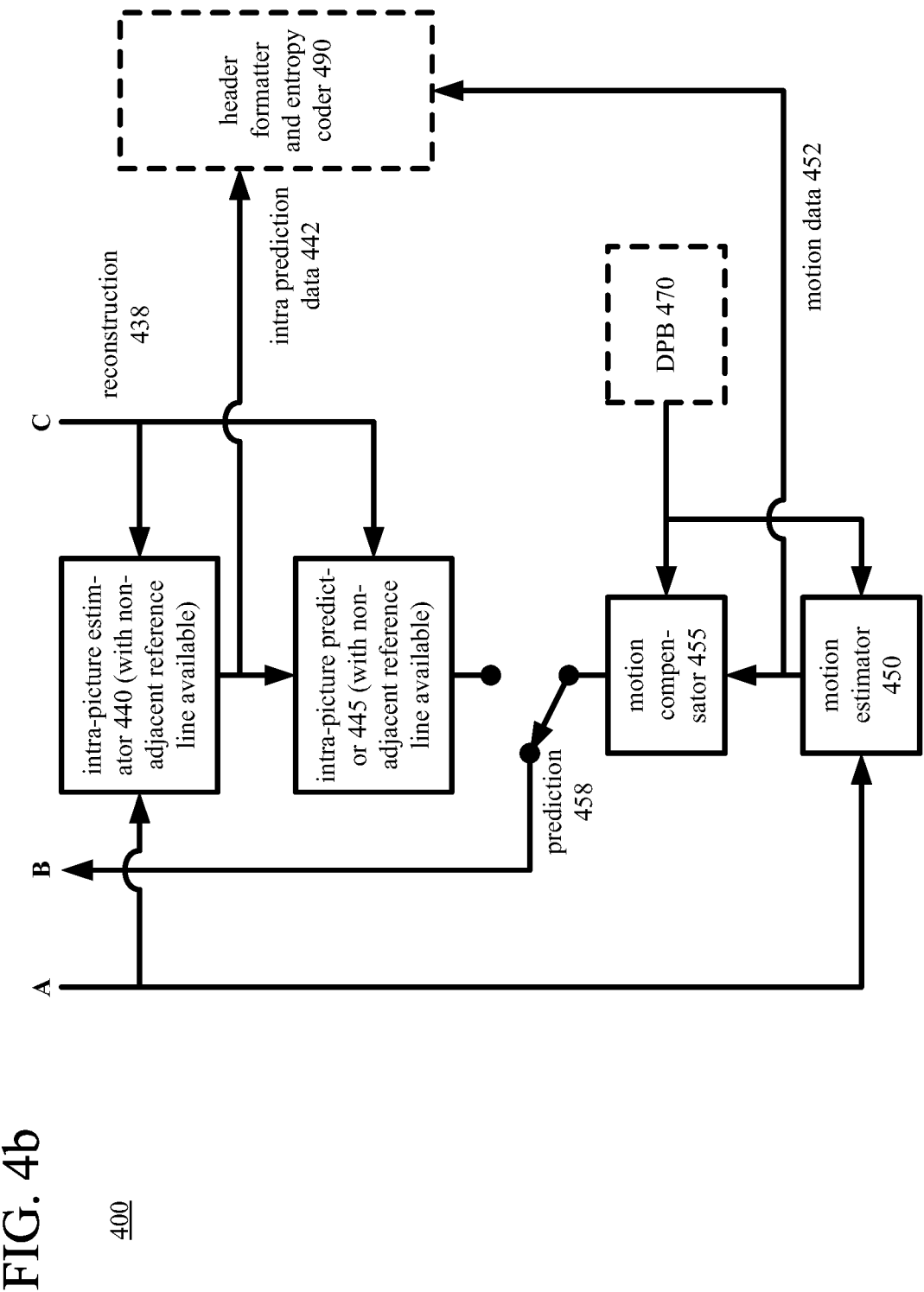

The video encoder (340) encodes the current picture (331) to produce a coded picture (341). As shown in FIGS. 4a and 4b, the video encoder (340) receives the current picture (331) as an input video signal (405) and produces encoded data for the coded picture (341) in a coded video bitstream (495) as output. As part of the encoding, the video encoder (340) in some cases uses one or more features of intra-picture prediction as described herein.

Generally, the video encoder (340) includes multiple encoding modules that perform encoding tasks such as partitioning into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions. The format of the output encoded data can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

As shown in FIG. 4a, the video encoder (340) can include a tiling module (410). With the tiling module (410), the video encoder (340) can partition a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can partition a picture into one or more slices of the same size or different sizes. The video encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to partition video into CTUs (CTBs), CUs (CBs), PUs (PBs) and TUs (TBs).

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450), and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331). If inter-picture prediction is used for a unit, in conjunction with the motion estimator (450), the general encoding control (420) decides which reference picture(s) to use for the inter-picture prediction. The general encoding control (420) determines which reference pictures to retain in a decoded picture buffer ("DPB") or other buffer. The general encoding control (420) produces general control data (422) that indicates decisions made during encoding, so that a corresponding decoder can make consistent decisions. The general control data (422) is provided to the header formatter/entropy coder (490).

With reference to FIG. 4b, if a unit of the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) potentially evaluates candidate MVs in a contextual motion mode as well as other candidate MVs. For contextual motion mode, as candidate MVs for the unit, the motion estimator (450)

evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode in the H.265/HEVC standard is an example of contextual motion mode. In some cases, a contextual motion mode can involve a competition among multiple derived MVs and selection of one of the multiple derived MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard).

The DPB (470), which is an example of decoded picture temporary memory storage area (360) as shown in FIG. 3, buffers one or more reconstructed previously coded pictures for use as reference pictures.

The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MV(s) for a block to the reconstructed reference picture(s) from the DPB (470) or other buffer. For the block, the motion compensator (455) produces a motion-compensated prediction, which is a region of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from previously reconstructed sample values of the current picture (331), e.g., selecting an intra-picture prediction mode and one or more reference lines of sample values. The intra-picture prediction estimator (440) can use, for example, one of the approaches described herein to make encoder-side decisions for intra-picture prediction, e.g., which reference lines to use. The intra-picture estimator (440) can also make other decisions for intra-picture prediction, e.g., whether to use weighted prediction, how to perform filtering of reference sample values and/or predicted sample values. Thus, the intra-picture estimator (440) can use one or more of the features of intra-picture prediction described below, e.g., intra-picture prediction with multiple candidate reference lines available, determining predictors of reference line indices, weighted prediction, residue compensation, mode-dependent padding to replace unavailable sample values, filtering of reference sample values and/or predicted sample values. Or, for intra block copy mode, the intra-picture prediction estimator (440) determines how to predict sample values of a block of the current picture (331) using an offset (sometimes called a block vector) that indicates a previously encoded/decoded portion of the current picture (331). Intra block copy mode can be implemented as a special case of inter-picture prediction in which the reference picture is the current picture (331), and only previously encoded/decoded sample values of the current picture (331) can be used for prediction. As side information, the intra-picture prediction estimator (440) produces intra prediction data (442), such as the prediction mode/direction used, reference line indices that identify reference lines of sample values used, and other decisions. The intra prediction data (442) is provided to the header formatter/entropy coder (490) as well as the intra-picture predictor (445).

According to the intra prediction data (442), the intra-picture predictor (445) spatially predicts sample values of a block of the current picture (331) from previously reconstructed sample values of the current picture (331), producing intra-picture predicted sample values for the block. In doing so, the intra-picture predictor (445) can use one or more of the features of intra-picture prediction described below, e.g., intra-picture prediction with multiple candidate reference lines available, weighted prediction, residue compensation, mode-dependent padding to replace unavailable sample values, filtering of reference sample values and/or predicted sample values. Or, the intra-picture predictor (445) predicts sample values of the block using intra block copy prediction, using an offset (block vector) for the block.

As shown in FIG. 4b, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values.

With reference to FIG. 4a, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU). In H.265/HEVC implementations, the frequency transform can be skipped. In this case, values of the residual (418) can be quantized and entropy coded.

With reference to FIG. 4a, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. When quantizing transform coefficients, the video encoder (340) can use rate-distortion-optimized quantization ("RDOQ"), which is very time-consuming, or apply simpler quantization rules. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

As shown in FIGS. 4a and 4b, the header formatter/entropy coder (490) formats and/or entropy codes the general control data (422), quantized transform coefficient data (432), intra prediction data (442), motion data (452), and filter control data (462). The entropy coder of the video encoder (340) compresses quantized transform coefficient values as well as certain side information (e.g., MV information, QP values, mode decisions, reference line indices, parameter choices, filter parameters). Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Exponential-Golomb coding or Golomb-Rice coding as binarization for CABAC), and can choose from among multiple code tables within a particular coding technique. Reference line indices for intra-picture prediction can be predictively encoded using predictors, as described below.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), VPx format, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a network abstraction layer ("NAL") unit is a syntax structure that contains (1) an indication of the type of data to follow and (2) a series of zero or more bytes of the data. For example, a NAL unit can contain encoded data for a slice (coded slice). The size of the NAL unit (in bytes) is indicated outside the NAL unit. Coded slice NAL units and certain other defined types of NAL units are termed video coding layer ("VCL") NAL units. An access unit is a set of one or more NAL units, in consecutive bitstream order, containing the encoded data for the slice(s) of a picture, and possibly containing other associated data such as metadata.

For syntax according to the H.264/AVC standard or H.265/HEVC standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area such as the DPB (470) in FIGS. 4a and 4b.

With reference to FIG. 3, the coded picture (341) and MMCO/RPS information (342) (or information equivalent to the MMCO/RPS information (342), since the dependencies and ordering structures for pictures are already known at the video encoder (340)) are processed by a decoding process emulator (350). The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored (and possibly modified), the decoding process emulator (350) models the decoding process that would be conducted by a video decoder that receives the coded picture (341) and produces a corresponding decoded picture (351). In doing so, when the video encoder (340) has used decoded picture(s) (369) that have been stored in the decoded picture storage area (360), the decoding process emulator (350) also uses the decoded picture(s) (369) from the storage area (360) as part of the decoding process.

The decoding process emulator (350) may be implemented as part of the video encoder (340). For example, the decoding process emulator (350) includes certain modules and logic as shown in FIGS. 4a and 4b. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

With reference to FIG. 4a, to reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

With reference to FIGS. 4a and 4b, for intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). For example, the filtering control (460) can determine how to perform in-loop filtering of reference sample values of non-adjacent reference lines prior to subsequent intra-picture prediction, as described below. The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). The video encoder (340) can also perform in-loop filtering (e.g., deblock filtering and/or SAO filtering) during intra-picture coding, to filter reference sample values of non-adjacent reference lines prior to subsequent intra-picture prediction for a current block, as described below. Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4a and 4b, the DPB (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity. In general, a given module of the video encoder system (300) or video encoder (340) can be implemented by software executable on a CPU, by software controlling special-purpose hardware (e.g., graphics hardware for video acceleration), or by special-purpose hardware (e.g., in an ASIC).

IV. Example Decoder Systems.

FIG. 5 is a block diagram of an example video decoder system (500) in conjunction with which some described embodiments may be implemented. The video decoder system (500) includes a video decoder (550), which is further detailed in FIG. 6.

The video decoder system (500) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (500) can be implemented as part of an operating system module, as part of an application library, as part of a standalone application or using special-purpose hardware. Overall, the video decoder system (500) receives coded data from a channel (510) and produces reconstructed pictures as output for an output destination (590). The received encoded data can include content encoded using one or more of the innovations described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexer data that has been organized for transmission or storage as a media stream (e.g., according to a media program stream or transport stream format such as ITU-T H.222.0|ISO/IEC 13818-1 or an Internet real-time transport protocol format such as IETF RFC 3550), in which case the channel decoder (520) can parse syntax elements added as part of the syntax of the media transmission stream. Or, the channel decoder (520) separates coded video data that has been organized for storage as a file (e.g., according to a media container format such as ISO/IEC 14496-12), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures. The coded data (521) in the coded data area (530) can also include media metadata relating to the encoded video data (e.g., as one or more parameters in one or more SEI messages or VUI messages).

In general, the coded data area (530) temporarily stores coded data (521) until such coded data (521) is used by the video decoder (550). At that point, coded data for a coded picture (531) and MMCO/RPS information (532) are transferred from the coded data area (530) to the video decoder (550). As decoding continues, new coded data is added to the coded data area (530) and the oldest coded data remaining in the coded data area (530) is transferred to the video decoder (550).

Figure 6:
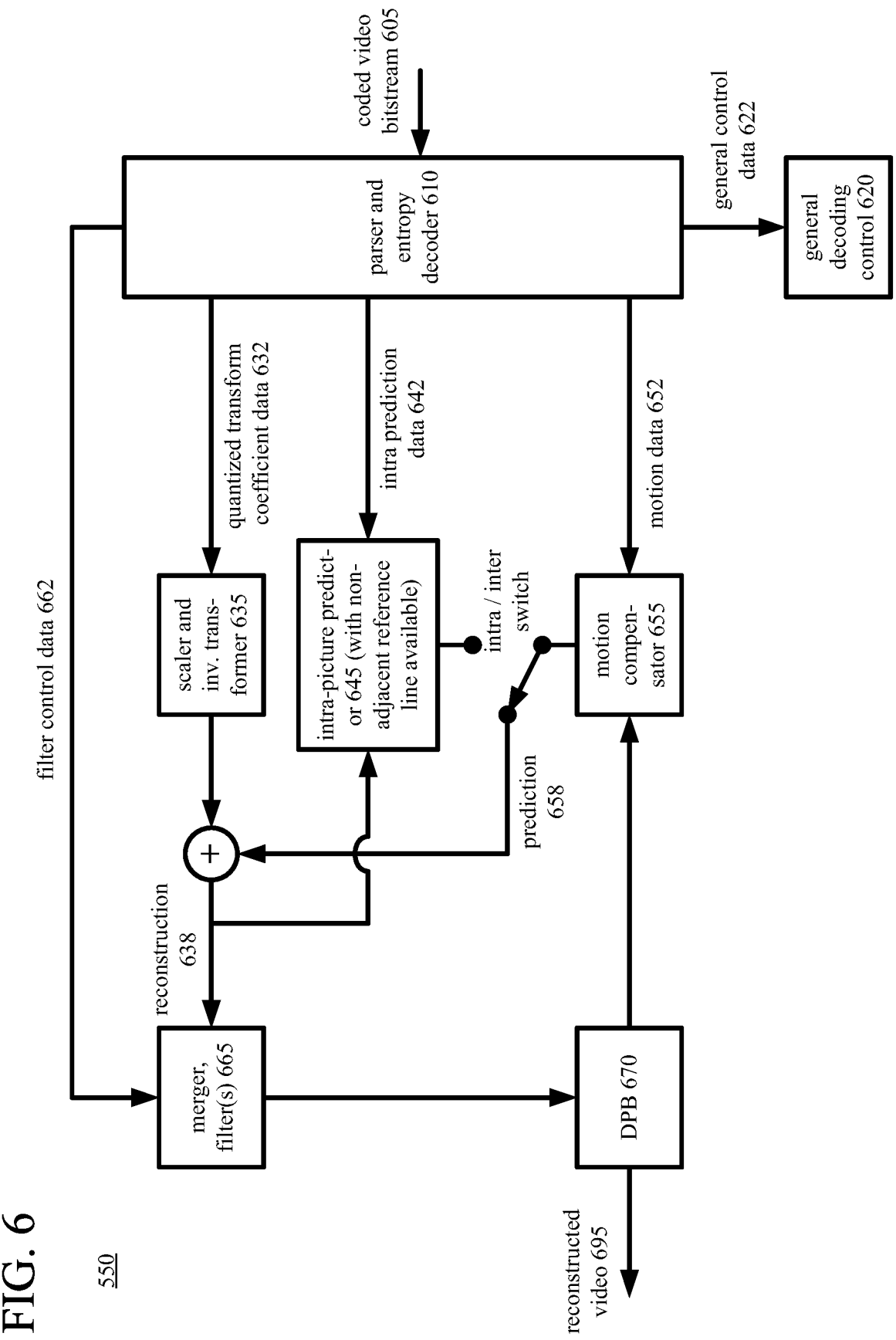
FIG. 6 is a diagram illustrating an example video decoder in conjunction with which some described embodiments can be implemented.

The video decoder (550) decodes a coded picture (531) to produce a corresponding decoded picture (551). As shown in FIG. 6, the video decoder (550) receives the coded picture (531) as input as part of a coded video bitstream (605), and the video decoder (550) produces the corresponding decoded picture (551) as output as reconstructed video (695). As part of the decoding, the video decoder (550) in some cases uses one or more features of intra-picture prediction as described herein.

Generally, the video decoder (550) includes multiple decoding modules that perform decoding tasks such as entropy decoding, inverse quantization, inverse frequency transforms, motion compensation, intra-picture prediction, and filtering. Many of the components of the decoder (550) are used for both intra-picture decoding and inter-picture decoding. The exact operations performed by those components can vary depending on the type of information being decompressed. The format of the coded video bitstream (605) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into macroblocks and blocks. In implementations of decoding for the H.265/HEVC standard, for example, a picture is partitioned into CTUs (CTBs), CUs (CBs), PUs (PBs) and TUs (TBs).

With reference to FIG. 6, a buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (340) (e.g., context-adaptive binary arithmetic decoding with binarization using Exponential-Golomb or Golomb-Rice). As a result of parsing and entropy decoding, the parser/entropy decoder (610) produces general control data (622), quantized transform coefficient data (632), intra prediction data (642) (e.g., intra-picture prediction modes, reference line indices), motion data (652), and filter control data (662). Reference line indices for intra-picture prediction can be decoded using predictors, as described below.

The general decoding control (620) receives the general control data (622). The general decoding control (620) provides control signals (not shown) to other modules (such as the scaler/inverse transformer (635), intra-picture predictor (645), motion compensator (655), and intra/inter switch) to set and change decoding parameters during decoding.

With reference to FIG. 5, as appropriate, when performing its decoding process, the video decoder (550) may use one or more previously decoded pictures (569) as reference pictures for inter-picture prediction. The video decoder (550) reads such previously decoded pictures (569) from a decoded picture temporary memory storage area (560), which is, for example, DPB (670).

With reference to FIG. 6, if the current picture is predicted using inter-picture prediction, a motion compensator (655) receives the motion data (652), such as MV data, reference picture selection data and merge mode index values. The motion compensator (655) applies MVs to the reconstructed reference picture(s) from the DPB (670). The motion compensator (655) produces motion-compensated predictions for inter-coded blocks of the current picture.

In a separate path within the video decoder (550), the intra-picture predictor (645) receives the intra prediction data (642), such as information indicating the prediction mode/direction used and reference line indices. For intra spatial prediction, using values of a reconstruction (638) of the current picture, according to the prediction mode/direction and one or more reference line indices, the intra-picture predictor (645) spatially predicts sample values of a current block of the current picture from previously reconstructed sample values of the current picture. In doing so, the intra-picture predictor (645) can use one or more of the features of intra-picture prediction described below, e.g., intra-picture prediction with multiple candidate reference lines available, weighted prediction, residue compensation, mode-dependent padding to replace unavailable sample values, filtering of reference sample values and/or predicted sample values. Or, for intra block copy mode, the intra-picture predictor (645) predicts the sample values of a current block using previously reconstructed sample values of a reference block, which is indicated by an offset (block vector) for the current block.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (550) combines the prediction (658) with reconstructed residual values to produce the reconstruction (638) of the content from the video signal. When residual values have not been encoded/signaled, the video decoder (550) uses the values of the prediction (658) as the reconstruction (638).

The video decoder (550) also reconstructs prediction residual values. To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. The scaler/inverse transformer (635) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (550) combines reconstructed prediction residual values with prediction values of the prediction (658), producing values of the reconstruction (638).

For intra-picture prediction, the values of the reconstruction (638) can be fed back to the intra-picture predictor (645). For inter-picture prediction (and, in some cases, intra-picture prediction with non-adjacent reference lines), the values of the reconstruction (638) can be further filtered. In the merger/filter(s) (665), the video decoder (550) merges content from different tiles into a reconstructed version of the picture. The video decoder (550) selectively performs deblock filtering and SAO filtering according to the filter control data (662) and rules for filter adaptation, so as to adaptively smooth discontinuities across boundaries in the pictures. For example, the video decoder (550) can perform in-loop filtering of reference sample values of non-adjacent reference lines prior to subsequent intra-picture prediction, as described below. Other filtering (such as de-ringing filtering or ALF; not shown) can alternatively or additionally be applied. Tile boundaries can be selectively filtered or not filtered at all, depending on settings of the video decoder (550) or a syntax element within the encoded bitstream data. The DPB (670) buffers the reconstructed current picture for use as a reference picture in subsequent motion-compensated prediction.

The video decoder (550) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop (or, in some cases, an intra-picture prediction loop), and hence affects sample values of reference pictures, the post-processing filter is applied to reconstructed sample values outside of the motion compensation loop and intra-picture prediction loop, before output for display.

With reference to FIG. 5, the decoded picture temporary memory storage area (560) includes multiple picture buffer storage areas (561, 562, . . . , 56*n*). The decoded picture storage area (560) is, for example, the DPB (670). The decoder (550) uses the MMCO/RPS information (532) to identify a picture buffer (561, 562, etc.) in which it can store a decoded picture (551). The decoder (550) stores the decoded picture (551) in that picture buffer. In a manner consistent with the MMCO/RPS information (532), the decoder (550) also determines whether to remove any reference pictures from the multiple picture buffer storage areas (561, 562, . . . , 56*n*).

An output sequencer (580) identifies when the next picture to be produced in display order (also called output order) is available in the decoded picture storage area (560). When the next picture (581) to be produced in display order is available in the decoded picture storage area (560), it is read by the output sequencer (580) and output to the output destination (590) (e.g., display). In general, the order in which pictures are output from the decoded picture storage area (560) by the output sequencer (580) (display order) may differ from the order in which the pictures are decoded by the decoder (550) (bitstream order).

Depending on implementation and the type of decompression desired, modules of the video decoder system (500) and/or video decoder (550) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (500). Specific embodiments of video decoders typically use a variation or supplemented version of the video decoder (550). The relationships shown between modules within the video decoder system (500) and video decoder (550) indicate general flows of information in the video decoder system (500) and video decoder (550), respectively; other relationships are not shown for the sake of simplicity. In general, a given module of the video decoder system (500) or video decoder (550) can be implemented by software executable on a CPU, by software controlling special-purpose hardware (e.g., graphics hardware for video acceleration), or by special-purpose hardware (e.g., in an ASIC).

V. Innovations in Intra-Picture Prediction.

This section describes various innovations in intra-picture prediction. For example, intra-picture prediction uses a non-adjacent reference line of sample values to predict the sample values of a current block, which can improve the effectiveness of the intra-picture prediction. Innovations described in this section include, but are not limited to: intra-picture prediction with multiple candidate reference lines available; encoding/decoding of reference line indices using prediction; filtering of reference sample values used in intra-picture prediction; residue compensation during intra-picture prediction; weighted prediction during intra-picture prediction; mode-dependent padding to replace unavailable reference sample values for intra-picture prediction; using in-loop-filtered reference sample values in intra-picture prediction; encoder-side decisions for selecting reference lines for intra-picture prediction; and post-filtering of predicted sample values after intra-picture prediction.

A. Introduction to Intra-Picture Prediction.

Intra-picture prediction exploits correlations between sample values in a region to set up effective compression of the sample values in the region. Intra-picture prediction can provide efficient compression for a region that depicts a uniform object or regular pattern (e.g., stripes or other straight lines).

The H.264 standard defines nine intra-picture prediction modes. One of the intra-picture prediction modes (DC prediction mode) predicts the sample values of a current block using an average value of certain reference sample values adjacent to the current block. The other eight intra-picture prediction modes are directional prediction modes, also called angular prediction modes. According to a directional prediction mode in the H.264 standard, selected reference sample values (adjacent to the current block) are projected into the current block in order to predict the sample values of the current block. This provides effective compression when visual content follows the direction of propagation.

The H.265 standard defines 35 intra-picture prediction modes, including a DC prediction mode, planar prediction mode, and 33 angular prediction modes. By adding a non-directional prediction mode (planar prediction mode) and fine-grained angular prediction modes, intra-picture prediction for the H.265 standard tends to be more effective than intra-picture prediction for the H.264 standard.

Figure 7:
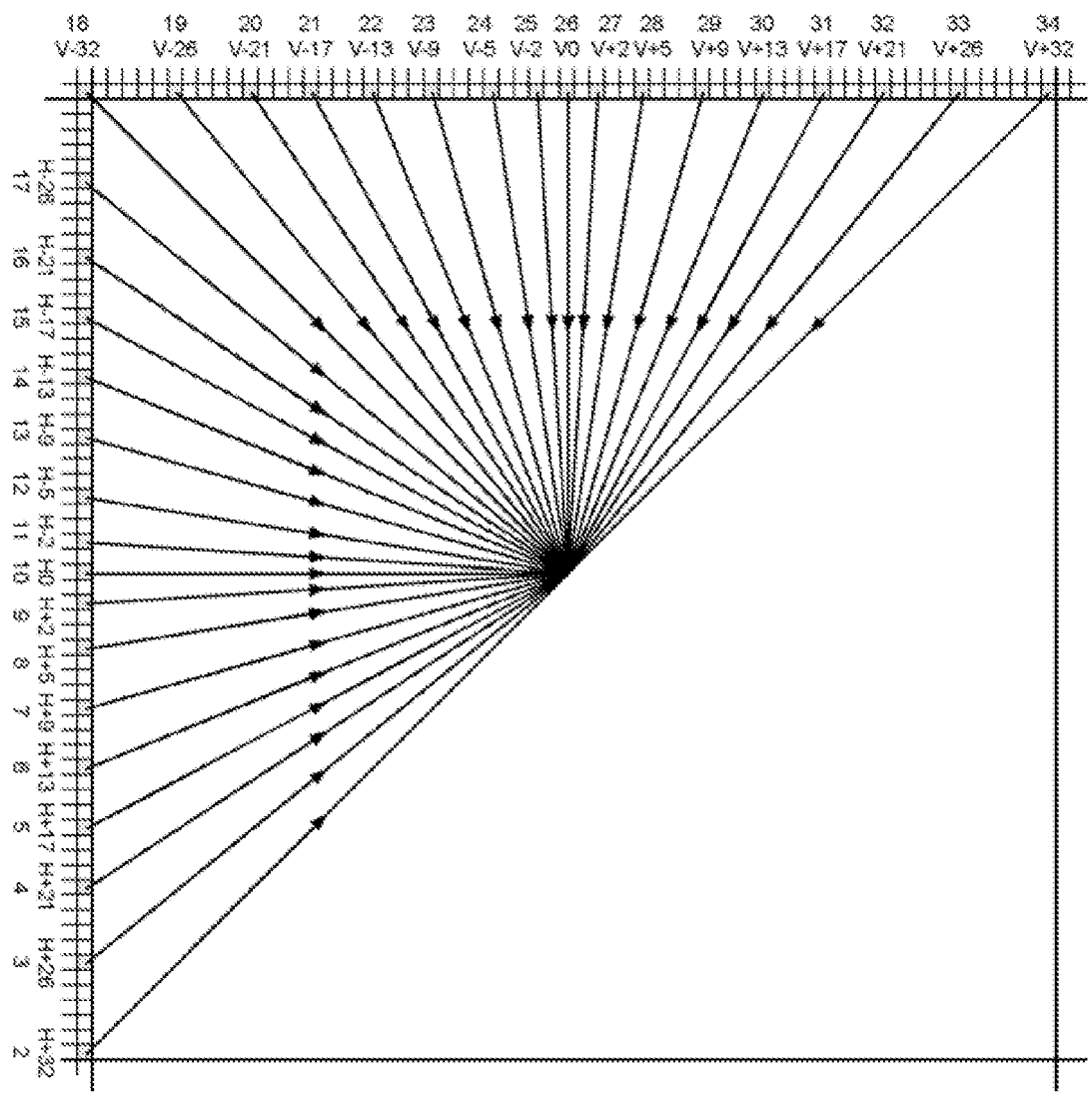
FIG. 7 is a diagram illustrating examples of angular intra-picture prediction modes in some described embodiments.

FIG. 7 shows examples of 33 angular intra-picture prediction modes (700) that can be used for intra-picture prediction. The 33 angular intra-picture modes (700) shown in FIG. 7 are defined in the H.265 standard (for prediction using adjacent reference sample values), but can also be used in conjunction with one or more of the innovations described herein, e.g., intra-picture prediction using sample values of a non-adjacent reference line. Mode 26 has a vertical direction, and mode 10 has a horizontal direction. The other modes have various diagonal directions.

Figure 8:
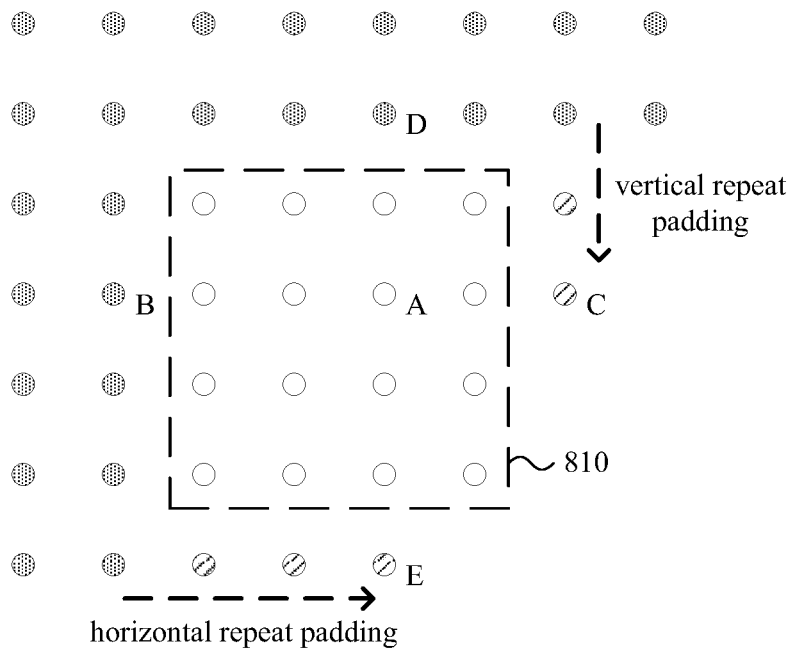

FIG. 8 shows an example (800) of operations for a planar prediction mode, which is designed to predict sample values in a region with gradual change. For the planar prediction mode, a predicted sample value at a given position can be calculated as the average of a horizontally interpolated value and a vertically interpolated value. In the example (800) of FIG. 8, a predicted sample value $pred_A$ is calculated at position A of the current block (810) as the weighted average of the reference sample values at positions B, C, D, and E. The weights depend on the location of position A in the current block (810). FIG. 8 shows reconstructed sample values of reference lines left of the current block (810) and reference lines above the current block (810), including reference sample values $ref_B$ and $ref_D$ at positions B and D, respectively. FIG. 8 also shows padded sample values below the current block (810) and right of the current block (810), including padded sample values $ref_C$ and $ref_E$ at positions C and E, respectively. The padded sample value $ref_C$ is derived by horizontal repeat padding, since the line below the current block (810) has not yet been reconstructed. The padded sample value $ref_E$ is derived by vertical repeat padding, since the line to the right of the current block (810) has not yet been reconstructed. Position A is at coordinates (x, y) of the current block (810). The predicted sample value $pred_A$ at position A of the current block (810) is calculated as:

$$pred_A = [x \times ref_C + (\text{block\_size} - x) \times ref_B + y \times ref_E + (\text{block\_size} - y) \times ref_D]/(2 \times \text{block\_size}),$$

where block_size is the size of the current block (810), which is square. Although FIG. 8 shows prediction from reference sample values of an adjacent reference line, the planar prediction mode can instead use reference sample values from a non-adjacent line (row and/or column). (For simplicity, padded sample values can still be calculated for adjacent reference lines.)

FIG. 9 shows an example (900) of operations for a DC prediction mode, which is designed to predict sample values of homogeneous regions. For the DC prediction mode, a predicted sample value at any position of a current block is calculated as the average of certain reference sample values in selected reference lines. In FIG. 9, the predicted sample values at positions of the current block (910) are calculated as the average of the indicated reference sample values (920, 930) of adjacent (boundary) reference lines. Although FIG. 9 shows prediction from reference sample values of adjacent reference lines, the DC prediction mode can instead use reference sample values from a non-adjacent line (row and/or column).

FIG. 10 shows an example (1000) of operations for an angular prediction mode. The angular prediction mode shown in FIG. 10 corresponds to mode 33 in FIG. 7. In general, for an angular prediction mode, reference sample values in a reference line are propagated along a prediction direction. In FIG. 10, for a given position A of the current block (1010), a predicted sample value $pred_A$ is calculated along the prediction direction (1020) for the angular prediction mode, using linear interpolation between reference sample values $ref_B$ and $ref_C$ at positions B and C, respectively. Specifically, the predicted sample value $pred_A$ is calculated as $pred_A = (m \times ref_C + n \times ref_B)/(m+n)$, where m and n indicate fractional offsets between positions B and C for the predicted sample value $pred_A$ at position A of the current block (1010). For example, if $m=\frac{5}{6}$ and $n=\frac{1}{6}$, then the interpolated value is closer to position C, and $pred_A=((\frac{5}{6})\times ref_C+(\frac{1}{6})\times ref_B)/((\frac{5}{6})+(\frac{1}{6}))$. On the other hand, if $m=\frac{1}{4}$ and $n=\frac{3}{4}$, then the interpolated value is closer to position B, and $pred_A=((\frac{1}{4})\times ref_C+(\frac{3}{4})\times ref_B)/((\frac{1}{4})+(\frac{3}{4}))$. The fractional offsets are distances between a position along the prediction direction (1020), where it crosses the reference line, and the two nearest reference sample values of the reference line (at positions B and C). Although FIG. 10 shows prediction from reference sample values of an adjacent reference line, an angular prediction mode can instead use reference sample values from a non-adjacent line (row or column).

Figure 11:
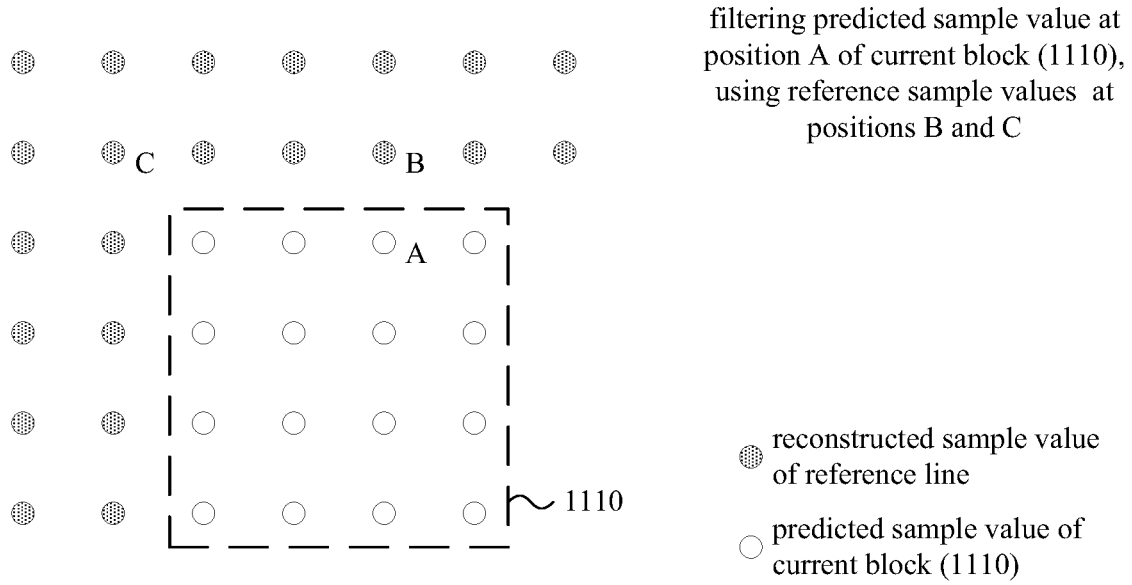
FIG. 11 is a diagram illustrating an example of filtering of predicted sample values.

Predicted sample values can be filtered after intra-picture prediction, at least for some intra-picture prediction modes. In the H.265 standard, for example, predicted sample values of the topmost row of the current block can be filtered after horizontal prediction if the size of the current block is 16×16 or smaller, and predicted sample values of the leftmost column of the current block can be filtered after vertical prediction if the size of the current block is 16×16 or smaller. FIG. 11 shows an example (1100) of filtering of predicted sample values of a current block (1110) after horizontal intra-picture prediction. The predicted sample value $pred_A$ is filtered using the reference sample values $ref_B$ and $ref_C$ at positions B and C, respectively: $pred_A=pred_A+(ref_B-ref_C)/2$. After vertical intra-picture prediction, predicted sample values of the leftmost column of the current block (1110) could similarly be filtered using the reference sample value $ref_C$ at position C and a reference sample value in the same row as the to-be-filtered predicted sample value of the current block (1110). After DC prediction, predicted sample values of the topmost row and leftmost column of the current block (1110) could be filtered using a filter [1, 3]/4 and the nearest reference sample value. Although FIG. 11 shows filtering of predicted sample values using reference sample values of an adjacent reference line, filtering of predicted sample values can also use reference sample values from a non-adjacent reference line, as described below.

Figure 12:
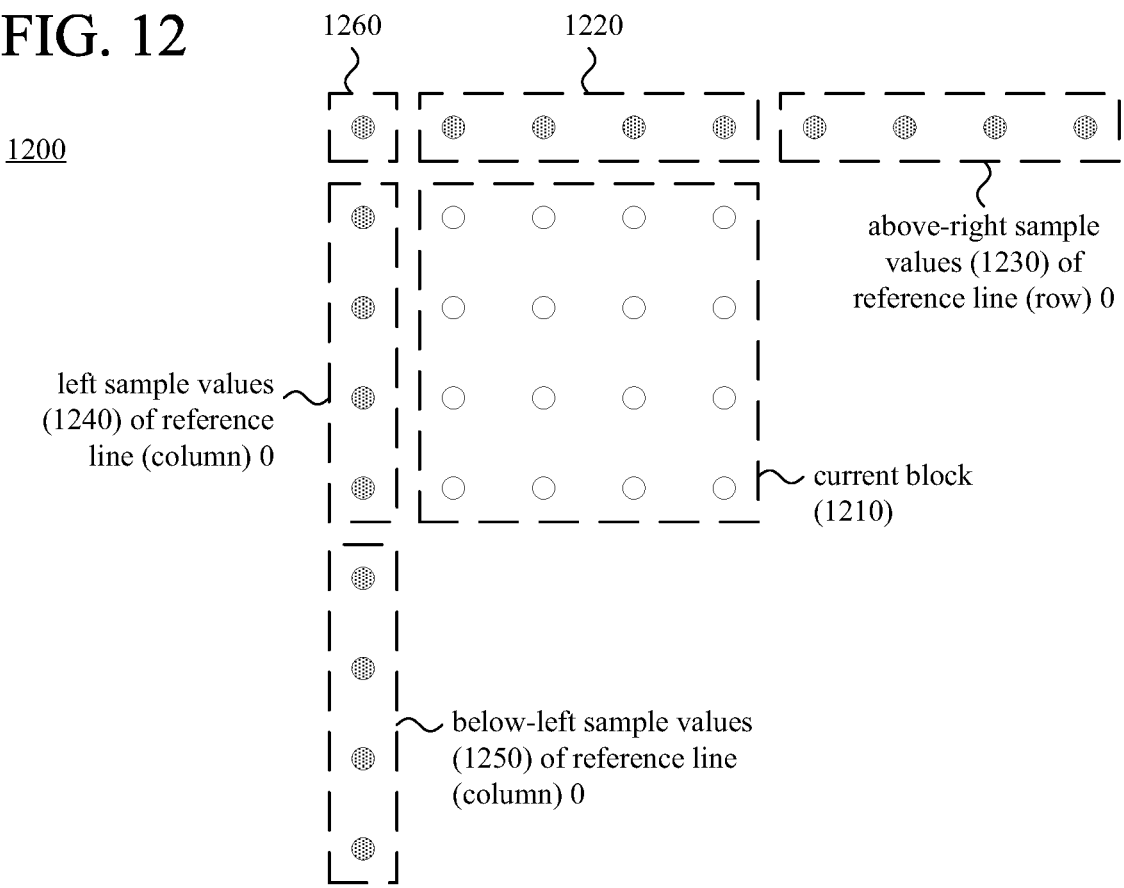
FIG. 12 is a diagram illustrating examples of sample values of adjacent reference lines.

In FIGS. 8-11, intra-picture prediction uses reference sample values of adjacent reference lines. FIG. 12 shows examples (1200) of reference sample values of adjacent reference lines. In configurations in which reference lines are assigned reference line indices, the nearest reference line can be designated reference line 0. In FIG. 12, the reference sample values of adjacent reference lines include "above" sample values (1220) of reference line (row) 0, "above-right" sample values (1230) of reference line (row) 0, "left" sample values (1240) of reference line (column) 0, "below-left" sample values (1250) of reference line (column) 0, and a "top-left" sample value (1260) of reference line 0. Examples of intra-picture prediction using reference sample values of non-adjacent reference lines are described below.

B. Examples of Intra-Picture Prediction with Multiple Candidate Reference Lines Available.

In prior video codec standards and formats, intra-picture prediction for a current block uses only reference sample values of an adjacent reference line (e.g., nearest row above the current block and/or nearest column left of the current block). This reflects an assumption that correlation between the reference sample values and sample values of the current block is higher when the distance between reference lines and the current block is shorter. According to this assumption, the effectiveness of intra-picture prediction should improve (that is, prediction error should decrease) when the nearest reference sample values are used for intra-picture prediction. While that assumption may hold true in many cases, in other cases the reference sample values of the adjacent reference line may exhibit noise due to capture (i.e., capture noise) or compression (i.e., quantization error, reconstruction noise). In particular, for a given intra-picture-predicted block, reconstruction noise may increase in magnitude further away from the prediction edge (e.g., reconstruction noise may have higher magnitude at the bottom edge or right edge of the given block). In this case, when used as a reference line for intra-picture prediction of sample values of a later block, the far edge of the given block may be less suitable than an earlier line of the given block. Or, as another example, an object depicted in an adjacent reference line may, by coincidence, occlude an object shown in the current block, such that the reference sample values are very different from the sample values of the current block. Whatever the cause, in some cases, intra-picture prediction using reference sample values of an adjacent reference line is ineffective.

This section describes variations of intra-picture prediction in which multiple reference lines, including non-adjacent reference lines, are available for use in the intra-picture prediction. These variations can improve the effectiveness of intra-picture prediction, such that the quality level of encoded video is improved for a given bitrate or such that bitrate of encoded video is reduced for a given quality level.

FIG. 13 shows examples (1300) of multiple candidate reference lines of sample values available for intra-picture prediction of a current block (1310). In general, the sample values of the current block (1310) are logically organized as multiple columns and multiple rows.

In FIG. 13, reference lines are assigned reference line indices, which increase for reference lines further from the current block (1310) to represent further offsets from the current block (1310). The nearest reference line is designated reference line 0. When the reference line index is greater than 0 for the current block (1310), indicating a non-adjacent reference line, there is an offset between the reference sample values and the current block (1310).

FIG. 13 shows N reference lines (rows) above the current block (1310), which are numbered 0 . . . n. FIG. 13 shows M reference lines (columns) to the left of the current block (1310), which are numbered 0 . . . m. The values of M and N depend on implementation. For example, M=N=8. Or, M=N=4. Or, M=N=16. Or, M and N depend on block size. For example, M and N are equal to the size of the current block or equal to the size of the current block divided by 2. In some example implementations, M and N can also have different values for the current block (1310). The multiple candidate reference lines shown in FIG. 13 include reference lines not adjacent to the current block (1310) (i.e., any reference line having a reference line index>0 in FIG. 13). More generally, a non-adjacent reference line of sample values can be (a) a non-adjacent column of sample values separated, by one or more other columns of sample values outside the current block (1310), from the multiple columns of the current block (1310), or (b) a non-adjacent row of sample values separated, by one or more other rows of sample values outside the current block (1310), from the multiple rows of the current block (1310).

FIG. 14 shows a generalized technique (1400) for encoding that includes intra-picture prediction with multiple candidate reference lines available, including a non-adjacent reference line. An encoder such as the video encoder (340) of FIG. 3, another video encoder, or an image encoder can perform the technique (1400).

The encoder receives (1410) a picture, encodes (1420) the picture to produce encoded data, and outputs (1430) the encoded data as part of a bitstream. During the encoding (1420), the encoder performs intra-picture prediction for a current block of sample values in the picture. A non-adjacent reference line of sample values is available for the intra-picture prediction.

The encoding (1420) can include determining a predictor for a reference line index, where the reference line index identifies a reference line of sample values used in the intra-picture prediction for the current block. In this case, the predictor is used to encode the reference line index, and the reference line index is signaled as part of the encoded data (e.g., using a predictor flag, as a differential). Variations of prediction of reference line indices are described below.

The encoding (1420) can also incorporate one or more of the intra-picture prediction features described below, including: filtering of reference sample values used in intra-picture prediction; residue compensation during intra-picture prediction; weighted prediction during intra-picture prediction; mode-dependent padding to replace unavailable reference sample values for intra-picture prediction; using in-loop-filtered reference sample values in intra-picture prediction; encoder-side decisions for selecting reference lines for intra-picture prediction; and post-filtering of predicted sample values after intra-picture prediction.

The encoder checks (1440) whether to continue with the next picture. If so, the encoder receives (1410) and encodes (1420) the next picture.

FIG. 15 shows a generalized technique (1500) for corresponding decoding that includes intra-picture prediction with multiple candidate reference lines available, including a non-adjacent reference line. A decoder such as the video decoder (550) of FIG. 5, another video decoder, or an image decoder can perform the technique (1500).

The decoder receives (1510) encoded data as part of a bitstream, decodes (1520) the encoded data to reconstruct a picture, and outputs (1530) the reconstructed picture. During the decoding (1520), the decoder performs intra-picture prediction for a current block of sample values in the picture. A non-adjacent reference line of sample values is available for the intra-picture prediction.

The decoding (1520) can include determining a predictor for a reference line index, where the reference line index identifies a reference line of sample values used in the intra-picture prediction for the current block. In this case, the predictor is used to decode the reference line index, and the reference line index is signaled as part of the encoded data (e.g., using a predictor flag, as a differential). Variations of prediction of reference line indices are described below.

The decoding (1520) can also incorporate one or more of the intra-picture prediction features described below, including: filtering of reference sample values used in intra-picture prediction; residue compensation during intra-picture prediction; weighted prediction during intra-picture prediction; mode-dependent padding to replace unavailable reference sample values for intra-picture prediction; using in-loop-filtered reference sample values in intra-picture prediction; and post-filtering of predicted sample values after intra-picture prediction.

The decoder checks (1540) whether to continue with the next picture. If so, the decoder receives (1510) encoded data for the next picture and decodes (1520) the next picture.

As part of the intra-picture prediction (during the encoding (1420) or decoding (1520), the encoder or decoder selects one or more of multiple candidate reference lines of sample values outside the current block, where the multiple candidate reference lines include at least one non-adjacent reference line of sample values. After selecting the reference line(s), the encoder or decoder predicts the sample values of the current block using at least some sample values of the selected reference line(s). The current block of sample values can be a luma block (including luma sample values) or chroma block (including chroma sample values). There are several approaches to performing operations for the intra-picture prediction using a non-adjacent reference line. Values of reference line indices can be signaled in various ways.

1. Examples of Selecting Reference Lines.

During encoding (1420), the encoder selects reference lines to use in intra-picture prediction based on evaluation of the results of intra-picture prediction using different reference lines. Examples of approaches to deciding, during encoding, which reference lines to use for intra-picture prediction are presented below. During decoding (1520), the decoder selects reference lines to use in intra-picture prediction based on reference line indices that are signaled as part of encoded data. Examples of approaches to signaling reference line indices are presented below.

Candidate reference lines can be rows or columns, and they can be identified with reference line indices. Candidate reference lines can include multiple reference rows above the current block and/or multiple reference columns left of the current block. In some cases, the encoder/decoder selects a single reference line to use in intra-picture prediction for the current block. A reference line index for the selected reference line can be signaled as part of the bitstream. In other cases, the encoder/decoder selects multiple reference lines to use in intra-picture prediction for the current block, and reference line indices for the selected reference lines, respectively, can be signaled as part of the bitstream. When the encoder/decoder selects a reference row above the current block and a reference column left of the current block, the reference row and reference column can have the same reference line index (e.g., both reference line index 1, or both reference line index 2, with a single reference line index signaled), or they can have different reference line indices (e.g., reference line indices 1 and 2 for two reference lines, or reference line indices 3 and 0 for two reference lines, with multiple reference line indices signaled).

2. First Approach to Performing Intra-Picture Prediction Operations for a Non-Adjacent Reference Line.

In a first approach to performing operations of intra-picture prediction, sample values are copied from non-adjacent reference lines to adjacent reference lines. After selecting a non-adjacent reference line of sample values for use in intra-picture prediction for the current block, the encoder/decoder replaces, by logical or physical copying operations, sample values of an adjacent reference line with at least some of the sample values of the non-adjacent reference line. The logical or physical copying operations shift some of the sample values of the non-adjacent reference line vertically or horizontally towards the current block. A sample value at a top-left position outside the current block can be calculated by aggregating multiple sample values (including at least one of the sample values of the non-adjacent reference line). Then, using at least some of the replaced sample values of the adjacent reference line, the encoder/decoder predicts the sample values of the current block.

FIGS. 16a and 16b illustrate examples (1601, 1602) of the first approach to performing operations of intra-picture prediction. In the example (1601) of FIG. 16a, sample values of reference line 3 are shifted towards the current block (1610) and used to replace sample values of reference line 0. The "above" and "above-right" sample values of reference line 0 are replaced by copying sample values of reference line 3 down, and the "left" and "below-left" sample values of reference line 0 are replaced by copying sample values of reference line 3 to the right. The "top-left" sample value of reference line 0 is calculated by aggregating (e.g., averaging, weighted interpolation) sample values in the top-left section of reference line 3.

In the example (1601) of FIG. 16a, the selected reference line (reference line index 3) provides a reference row and reference column. In the example (1602) of FIG. 16b, the reference row and reference column come from different reference lines. The "above" and "above-right" sample values of reference line 0 are replaced by copying sample values of reference line 1 down, and the "left" and "below-left" sample values of reference line 0 are replaced by copying sample values of reference line 3 to the right. The "top-left" sample value of reference line 0 is calculated by aggregating (e.g., averaging, weighted interpolation) sample values in the top-left section of reference line (column) 3 and reference line (row) 1.

For the sake of illustration, FIGS. 16a and 16b each show a non-adjacent reference column and non-adjacent reference row. Depending on the intra-picture prediction mode that is used, intra-picture prediction operations may use a single reference line (i.e., row or column) or multiple reference lines. Each reference line can be adjacent or non-adjacent to the current block (1610).

The first approach is relatively simple to harmonize with existing approaches that perform intra-picture prediction operations from adjacent reference lines. The adjacent reference line is, in effect, directly replaced by the non-adjacent reference line. After the replacement, intra-picture prediction operations are the same as for adjacent reference lines. Also, reference sample values can be filtered after the replacement process.

On the other hand, using the first approach can harm the efficiency of coding intra-picture prediction mode information. In particular, the angle of prediction can change as non-adjacent reference lines shift towards the current block, which may change the intra-picture prediction mode selected for the current block. In typical intra-picture prediction, the direction of prediction tends to be uniform from block to block. This enables efficient coding of intra-picture prediction mode using the most probable mode. Having the prediction direction change for the current block compared to its neighboring blocks can make coding of intra-picture prediction modes less efficient. Another problem with the first approach is that certain features such as residue compensation from sample values in an offset region cannot be used.

3. Second Approach to Performing Intra-Picture Prediction Operations for a Non-Adjacent Reference Line.

In a second approach to performing operations of intra-picture prediction, non-adjacent reference lines are not shifted towards a current block. Instead, after selecting a non-adjacent reference line of sample values for use in intra-picture prediction for a current block, the encoder/decoder predicts the sample values of the current block using at least some of the sample values of the non-adjacent reference line. The intra-picture prediction crosses an offset region between the non-adjacent reference line and the current block. According to the second approach, intra-picture prediction can also include predicting at least some sample values of the offset region using sample values of the non-adjacent reference line. The predicted sample values of the offset region can be used for residue compensation, as described below.

Figure 17B:
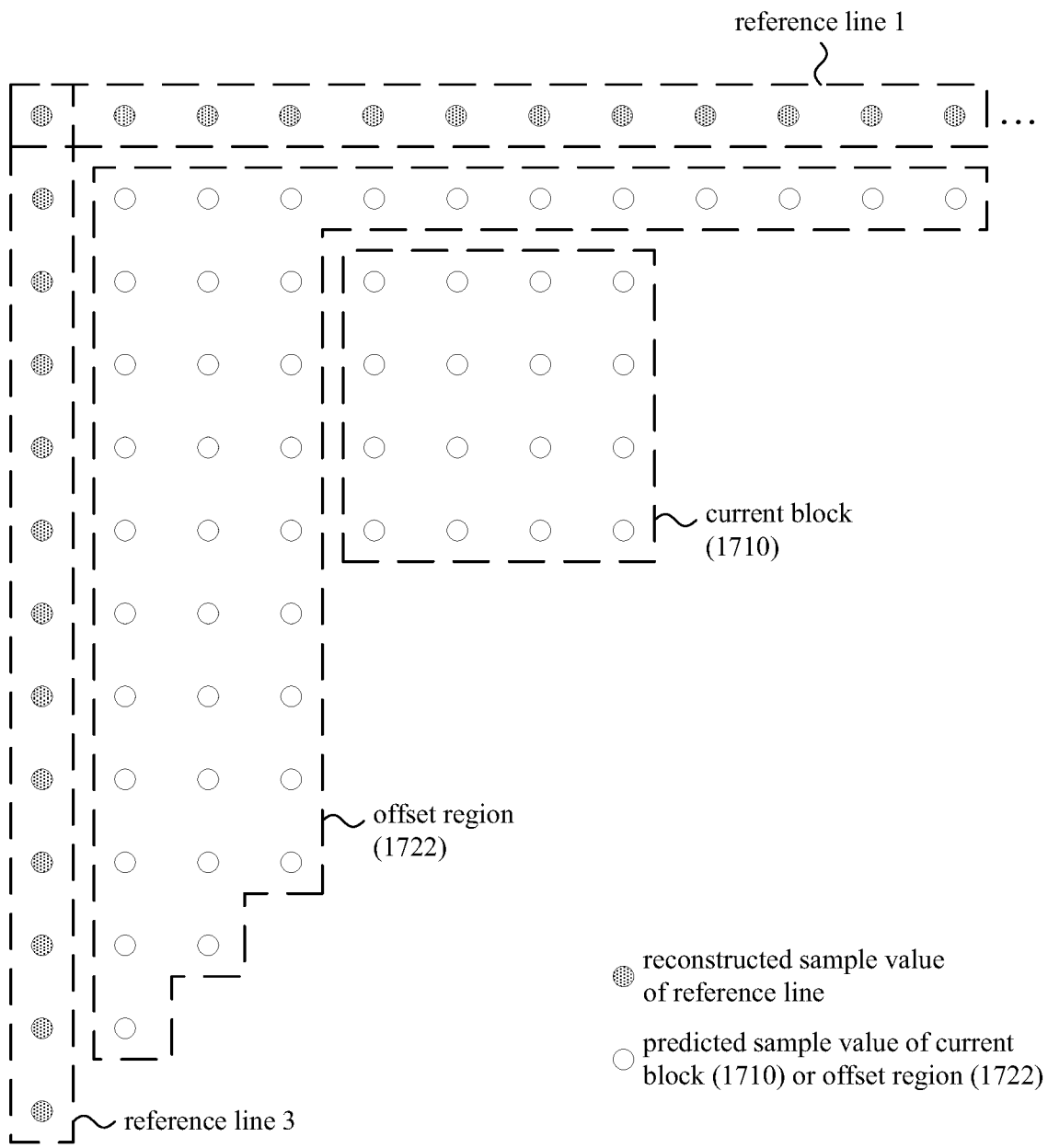

FIGS. 17a and 17b illustrate examples (1701, 1702) of intra-picture prediction with sample values of non-adjacent reference lines crossing over offset regions. In the example (1701) of FIG. 17a, sample values of reference line 3 are used to predict the sample values of the current block (1710), crossing over the offset region (1721) between reference line 3 and the current block (1710). The offset region (1721) includes reconstructed sample values of reference lines 0, 1, and 2. For residue compensation, predicted sample values of the offset region (1721) can be calculated and compared to corresponding reconstructed sample values. In the example (1701) of FIG. 17a, the selected reference line (reference line index 3) provides a reference row and reference column. In the example (1702) of FIG. 17b, the reference row and reference column come from different reference lines. As such, the offset region (1722) in FIG. 17b has a different shape than the offset region (1721) in FIG. 17a. The offset region (1722) still includes reconstructed sample values, which can be compared to corresponding predicted sample values in the offset region (1722) for residue compensation. Alternatively, the calculation of predicted sample values of an offset region can be skipped (e.g., if residue compensation is not used).

In some example implementations, the encoder or decoder predicts sample values of a prediction region that includes the current block as well as the offset region. The prediction region can be rectangular (or square), with a width equal to the width of the current block plus the offset (if any) between the current block and reference column, and with a height equal to the height of the current block plus the offset (if any) between the current block and reference row. For example, suppose the current block is a 4×4 block. If reference line 0 (adjacent reference column) is used to the left of the current block, and reference line 0 (adjacent reference row) is used above the current block, the prediction region is a 4×4 block. If reference line 1 is used to the left of the current block, and reference line 1 is used above the current block, the prediction region is a 5×5 block. If reference line 3 is used to the left of the current block, and reference line 1 is used above the current block, the prediction region is a 7×5 block. In any case, the predicted sample values outside the current block can be used in residue compensation. To isolate the predicted sample values of the current block, the encoder or decoder can clip the prediction region.

In the second approach, when an area of uniform intra-picture prediction includes multiple blocks, a most probable intra-picture prediction mode remains consistent within the area despite differences in reference lines used for the multiple blocks. This preserves efficient coding of intra-picture prediction mode information, since the intra-picture prediction mode does not change from block-to-block.

For the sake of illustration, FIGS. 17a and 17b each show a non-adjacent reference column and non-adjacent reference row. Depending on the intra-picture prediction mode that is used, intra-picture prediction operations may use a single reference line (i.e., row or column) or multiple reference lines. Each reference line can be adjacent or non-adjacent to the current block (1710).

4. Examples of Prediction and Signaling of Reference Line Indices.

When multiple candidate reference lines are available for intra-picture prediction of a current block, the one or more reference lines that are actually used for intra-picture prediction can be signaled as part of encoded data in the bitstream. The number of reference line indices that are signaled can depend on which intra-picture prediction mode is used, the syntax level at which reference line indices are signaled, and whether other features of intra-picture prediction are used.

When different reference line indices are signaled for a reference row and reference column, signaling of a reference line index can be skipped for some intra-picture prediction modes. For example, for angular prediction modes 2-9 in FIG. 7, only a reference column of sample values is used for intra-picture prediction, and signaling of a reference line index for a reference row can be skipped. For angular prediction modes 27-34 in FIG. 7, only a reference row of sample values is used for intra-picture prediction, and signaling of a reference line index for a reference column can be skipped. For non-directional prediction modes such as DC prediction mode and planar prediction mode, however, or for angular prediction modes 10-26 in FIG. 7, a reference row and a reference column of sample values are used for intra-picture prediction, and reference line indices are signaled for both. Alternatively, in implementations in which reference row and reference column necessarily use the same reference line index, that reference line index is signaled regardless of intra-picture prediction mode.

Depending on implementation, a reference line index can be signaled for a coding unit, prediction unit, transform unit, or other unit. In that case, the reference line index applies for all blocks of the unit. For example, a reference line index is signaled for a unit that includes a luma block and chroma blocks, and the reference line index applies for all blocks of the unit, with chroma blocks reusing the reference line index of their collocated luma block. In other implementations, separate reference line indices can be signaled for different blocks of a given unit (e.g., luma and chroma blocks each having their own reference line index). In this case, a reference line index can be signaled for a coding block, prediction block, transform block, or other block of a given unit. Alternatively, a reference line index is only signaled for a luma block, and corresponding chroma blocks use a default reference line (e.g., reference line index 0, indicating adjacent reference sample values).

When weighted prediction is used for intra-picture prediction with multiple reference lines, predicted sample values generated using different reference lines are blended to compute the predicted sample values of a current block. In this case, reference line indices can be signaled for multiple reference lines. Or, use of one or more of the multiple reference lines (e.g., reference line 0) in the weighted prediction can be assumed, such that signaling of reference line indices for the assumed reference line(s) is skipped.

When a reference line index is signaled as part of encoded data, the reference line index can be entropy coded by the encoder and entropy decoded by the decoder. For example, the reference line index can be encoded using CABAC after binarization, with corresponding entropy decoding performed during decoding. Or, the reference line index can be entropy coded/decoded in some other way.

A reference line index can be directly, explicitly signaled as part of encoded data. For example, the syntax element used to represent a reference line index can be coded like a reference picture index in the H.264 standard or H.265 standard. The binary sequence 0 can be used to indicate reference line 0, the binary sequence 10 can be used to indicate reference line 1, the binary sequence 110 can be used to indicate reference line 2, and so on. Generally, for reference index x, the binary sequence includes x ones followed by a zero. Alternatively, the binary sequence includes x zeros followed by a one. Such binary sequences can be entropy coded using CABAC or another form of entropy coding, with corresponding entropy decoding performed by a decoder.

Or, when signaling a reference line index as part of encoded data, the reference line index can be predicted. In this case, the encoder determines a predictor for the reference line index. The predictor can be the reference line index of a neighboring block or unit (e.g., left, above, above-left). For example, the reference column index of a current block/unit is predicted using the reference column index of the above block/unit, and the reference row index of the current block/unit is predicted using the reference row index of the left block/unit. Alternatively, the encoder can calculate a given predictor based on multiple reference line indices for multiple neighboring blocks or units, respectively. For example, the predictor is the median of reference line indices of multiple neighboring blocks/units (e.g., left, above, above-right or above-left). Alternatively, the predictor is a default reference line index (e.g., reference line index of 0). Alternatively, the predictor is determined in some other way. During decoding, the corresponding decoder determines the predictor in the same way as the encoder.

However the predictor is determined, the reference line index can be signaled in the encoded data using a predictor flag that indicates whether the reference line index equals the predictor. The syntax element for the predictor flag can be entropy coded/decoded, e.g., using CABAC and corresponding decoding. During encoding, the encoder sets the value of the predictor flag depending on whether the predictor is used for intra-picture prediction. During decoding, if the predictor flag indicates the reference line index equals the predictor, the decoder uses the predictor for intra-picture prediction. If the predictor is not used for intra-picture prediction, another value is signaled as part of the encoded data to indicate the reference line index. The other value can be entropy coded/decoded. The other value can be a direct, explicit indication of the reference line index, or it can be a differential value.

However the predictor is determined, the reference line index can be signaled in the encoded data using a differential value that indicates a difference between the reference line index and the predictor. The syntax element for the differential value can be entropy coded/decoded, e.g., using CABAC after binarization and corresponding decoding. During encoding, the encoder sets the differential value based on the difference between the reference line index and the predictor. During decoding, the decoder recovers the reference line index by combining the differential value and the predictor.

As an alternative to separate signaling of a syntax element (e.g., direct value, predictor flag, differential value) for an individual reference line index, a syntax element can jointly indicate the reference line index and other information (e.g., an intra-picture prediction mode, a weight for weighted prediction, a filter decision). In particular, when weighted prediction is used, a non-zero weight for a reference line can implicitly indicate that the reference line is used for intra-picture prediction. Or, a single syntax element can jointly indicate multiple reference line indices (e.g., a combination of two or three reference lines selected from among the multiple candidate reference lines that are available).

In some example implementations, a table includes a weight for each of multiple candidate reference lines. For a given candidate reference line, a weight of 0 implicitly indicates the reference line is not used for intra-picture prediction. A non-zero weight implicitly indicates the reference line is used for intra-picture prediction. The table of weights can be explicitly signaled as part of encoded data, and the table can be entropy coded/decoded. Or, when multiple tables are defined at the encoder and decoder (e.g., predefined or defined through earlier operations or signaling), a table index can be explicitly signaled as part of encoded data. The table index can be entropy coded/decoded. Prediction can make signaling of table indices more effective (e.g., determining a predictor for table index, and using a predictor flag or differential value for the table index).

C. Reference Line Filtering.

This section describes examples of filtering of sample values of reference lines used for intra-picture prediction. Filtering of reference sample values can improve the effectiveness of intra-picture prediction for a current block by smoothing outlier values, which may be caused by capture noise or reconstruction noise.

Filtering of reference sample values can be used in combination with one or more other innovations described herein. For example, reference sample values can be filtered as described in this section before weighted prediction and/or residue compensation. As another example, reference sample values filtered as described in this section may have been subjected to previous in-loop filtering.

1. Examples of Filters.

In general, an encoder or decoder filters sample values of a reference line before intra-picture prediction using the sample values of the reference line. The shape of the filter depends on implementation. FIGS. 18*a* and 18*b* show examples (1801, 1802) of filters for sample values of reference lines.

In the example (1801) of FIG. 18*a*, sample values of a non-adjacent reference line (reference line 1) are filtered using a symmetric one-dimensional ("1D") filter (1820). The 1D filter (1820) is a low-pass filter having three taps 1, 2, and 1, and a normalization factor of 4. The filtered reference sample values are then used in intra-picture prediction for the current block (1810). The 1D filter (1820) is aligned with the reference line, changes sample values within the reference line, and uses only sample values within the reference line. For filtering of a reference column, the kernel of the 1D filter (1820) is vertically oriented, in alignment with the reference column. Alternatively, another 1D filter (such as [1 2 10 2 1]/16) can be used. Also, instead of aligning with a reference line to be filtered, a 1D filter can intersect the reference line to be filtered, using reference sample values of nearby reference lines.

In the example (1802) of FIG. 18*b*, sample values of a non-adjacent reference line (reference line 1) are filtered using a symmetric two-dimensional ("2D") filter (1830). The filtered reference sample values are then used in intra-picture prediction for the current block (1810). The 2D filter (1830) has five taps. For example, the 2D filter (1830) is a low-pass filter having a center tap of 4, four other taps of 1, and a normalization factor of 8. Alternatively, the taps and normalization factor have other values. Or, the 2D filter has another shape of kernel. For example, the 2D filter has a 3×3 kernel with nine taps (e.g., center tap of 8, other taps of 1, and normalization factor or 16; or, center tap of 4, corner taps of 1, side taps of 2, and normalization factor of 16). The 2D filter (1830) is aligned with the reference line and only changes sample values within the reference line, but the 2D filter (1830) uses reference sample values outside the reference line. In FIG. 18*b*, the 2D filter (1830) uses reference sample values in the two nearby reference lines.

More generally, the filter used to filter reference sample values can have a 1D kernel or 2D kernel. The shape of the 2D kernel can be a cross, a 3×3 window, or other shape. Typically, the center tap has the highest weight value. The filter can have filter taps that make it asymmetric or symmetric. For example, outside of the center tap, an asymmetric filter has higher filter taps closer to the current block. Or, filter taps can vary depending on which reference line is filtered (e.g., filtering some reference lines more aggressively than other reference lines). Or, filter taps can vary depending on information signaled in encoded data.

2. Example of Filtering Rules.

In some example implementations, filtering of reference sample values is performed automatically for all reference sample values.

Alternatively, filtering of reference sample values is applied selectively by rule. For example, filtering of reference sample values is applied for some prediction directions, but not applied for other prediction directions. Or, filtering of reference sample values is applied for some block sizes, but not applied for other block sizes. Or, filtering of reference sample value can depend on a combination of factors including prediction direction and block size.

Alternatively, filtering of reference sample values is applied selectively in a manner consistent with decision information signaled as part of encoded data. For example, an encoder evaluates results when sample values of a reference line are filtered and evaluates results when the sample values of the reference line are not filtered. The encoder signals decision information indicating whether the decoder should filter the reference line. For example, the decision information can be signaled jointly with a reference line index or signaled with a separate syntax element. A corresponding decoder performs filtering of reference sample values, or skips such filtering, as indicated by the decision information. In addition to signaling an on/off decision for filtering, the encoder can signal parameters specifying the filter to use (e.g., kernel shape, filter taps).

Depending on implementation, the filtered reference line can replace the unfiltered reference line or provide an alternative to the unfiltered reference line. If it provides an alternative, the filtered reference line can be identified with a different reference line index than the unfiltered reference line. Or, the filtered reference line can be designated with a flag, signaled in the bitstream, that indicates whether a given reference line is filtered.

3. Examples of Filtering During Encoding or Decoding.

Figure 19:
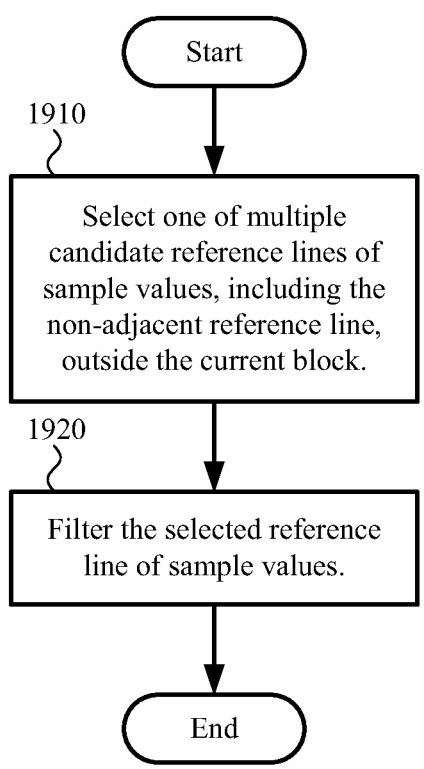
FIG. 19 is a flowchart illustrating a generalized technique for filtering sample values of a reference line.

FIG. 19 illustrates a generalized technique (1900) for filtering sample values of a reference line during encoding or decoding for a current block. An encoder such as the video encoder (340) of FIG. 3, another video encoder, or an image encoder can perform the technique (1900), for example, during the encoding (1420) described with reference to FIG. 14. Or, a decoder such as the video decoder (550) of FIG. 5, another video decoder, or an image decoder can perform the technique (1900), for example, during the decoding (1520) described with reference to FIG. 15.

The encoder or decoder selects (1910) one of multiple candidate reference lines of sample values outside a current block. The multiple candidate reference lines include at least one non-adjacent reference line of sample values. The selected reference line can be an adjacent reference line or non-adjacent reference line.

The encoder or decoder filters (1920) the selected reference line of sample values. The filtering can use a 1D filter having a kernel that covers multiple sample values within the selected reference line or a 1D filter having a kernel that crosses the selected reference line. The 1D filter can have three taps, five taps, or some other number of taps. Or, the filtering can use a 2D filter having a kernel that covers multiple sample values of the selected reference line and one or more sample values of each of one or more reference lines next to the selected reference line. The 2D filter can have a cross-shaped kernel, square kernel, or some other shape. The 2D filter can have five taps, nine taps, or some other number of taps. If any positions covered by the kernel are part of the current block, the filtering can ignore such positions and change the normalization factor accordingly.

The encoder or decoder can repeat the technique (1900) for any other reference lines to be used in intra-picture prediction for the current block.

Encoded data in the bitstream can include a filtering flag that indicates whether or not to perform the filtering (e.g., for the current block, for a unit that includes the current block, for a given reference line). The encoder can set the filtering flag. The decoder, based at least in part of the filtering flag, can decide whether or not to perform the filtering of the selected reference line. The filtering flag can be signaled in the bitstream at the syntax level of a sequence (e.g., in an SPS), picture (e.g., in a PPS), slice (e.g., in a slice header), coding unit, coding block, prediction unit, prediction block, transform unit, or transform block, or at some other syntax level. The filtering flag can be signaled with a separate syntax element, or it can be jointly signaled with other information (e.g., a reference line index).

The encoder and decoder can also decide to perform filtering based at least in part on one or more factors. The factor(s) can include intra-picture prediction mode for the current block and block size of the current block. For example, reference sample values may be filtered if the current block is below a certain size (e.g., 16×16 or smaller) and the prediction direction is vertical or horizontal.

In some prior codec standards and formats, sample values of an adjacent reference line can be filtered. For example, for some prediction directions and block sizes, a low-pass filter [1 2 1]/4 can be applied to sample values of an adjacent reference line. In contrast, according to the preceding approaches described in this section, sample values of non-adjacent reference lines can be filtered. Also, filtering of reference sample values, even in an adjacent reference line, can use non-adjacent reference sample values.

D. Residue Compensation.

This section describes examples of residue compensation performed in conjunction with intra-picture prediction. As part of residue compensation, for a predicted sample value at a given position of a current block, the encoder or decoder calculates a residual value and uses the residual value to adjust the predicted sample value at the given position in the current block. The residual value is based on a difference between a reconstructed sample value and predicted sample value at a given position in an offset region, outside the current block. Residue compensation can improve the effectiveness of intra-picture prediction for the current block by adjusting the predicted sample values of the current block based on results of intra-picture prediction in the adjacent offset region.

Residue compensation can be used in combination with one or more other innovations described herein. For example, weighted prediction can be performed after residue compensation, or weighted prediction can be performed before residue compensation. Residue compensation can use filtered reference sample values. Residue compensation can use reference sample values that have been in-loop filtered. The reference sample values used for residue compensation may include padded sample values derived using mode-dependent padding. Post-filtering may be applied to predicted sample values after residue compensation.

1. Examples of Residue Compensation Operations.

FIGS. 17*a* and 17*b* show examples (1701, 1702) of intra-picture prediction operations in which sample values can be predicted in an offset region (1721, 1722) between a non-adjacent reference line and a current block (1710). The offset region (1721, 1722) also includes previously reconstructed sample values of other reference lines, assuming the current block (1710) is not at the boundary of the picture. The differences between reconstructed sample values and corresponding predicted sample values, along a prediction direction, in the offset region tend to indicate appropriate corrections to the predicted sample values of the current block along that prediction direction. Residue compensation uses the differences, or residual values, from the offset region to adjust the predicted sample values of the current block.

FIGS. 20*a*-20*l* illustrate examples of residue compensation during intra-picture prediction. In addition to predicted sample values of a current block (2010) and reference sample values of one or more reference lines, FIGS. 20*a*-20*l* show residual values between reference sample values and corresponding predicted sample values of an offset region. In the examples of FIGS. 20*a*-20*l*, a predicted sample value at position B of the current block (2010) is calculated as: $pred_B = pred_B + weight \times (ref_A - pred_A)$, where the factor $weight \times (ref_A - pred_A)$ is due to residue compensation. The residual value ("difference") at position A in the offset region represents the difference between the reconstructed reference sample value $ref_A$ at position A and the predicted sample value $pred_A$ at position A. The weight applied to the residual value is different in different approaches, but generally depends on factors including the location of position B in the current block (2010), the intra-picture prediction direction, and the block size of the current block (2010). In general, the weight is larger for positions of the current block (2010) that are closer to the reference line used for residue compensation, and the weight is smaller for positions of the current block (2010) that are farther from the reference line used for residue compensation. Also, the number of positions adjusted by residue compensation is larger for larger blocks. In some example implementations, weights are stronger for prediction directions closer to pure horizontal prediction or pure vertical prediction, and weaker for prediction directions closer to pure diagonal prediction (e.g., 45 degrees).

a. First Approach to Residue Compensation.

FIG. 20*a* shows an example (2001) of horizontal residue compensation when vertical intra-picture prediction is performed for the predicted sample values of the current block (2010), according to a first approach. As FIG. 20*a* shows, the direction of intra-picture prediction (vertical) is orthogonal to the direction of residue compensation (horizontal). The weight applied for residue compensation in the example (2001) of FIG. 20*a* depends on position in the current block (2010) and size of the current block (2010). Typically, the weights decrease from the left of the current block (2010) to the right of the current block (2010). For example, as a 4×4 block, the weight for positions of the left column of the current block (2010) is ¾, the weight for positions of the second column is ½, the weight for positions of the third column is ¼, and the weight for positions of the right column of the current block (2010) is 0. Alternatively, the weights can have other values (e.g., 1, ¾, ½, and ¼ for the respective columns) For a larger block (e.g., 8×8, 16×16), the weights can similarly decrease column-by-column in uniform increments (e.g., ⅛ for an 8×8 block, ¹⁄₁₆ for an 16×16 block).

Figure 20B:
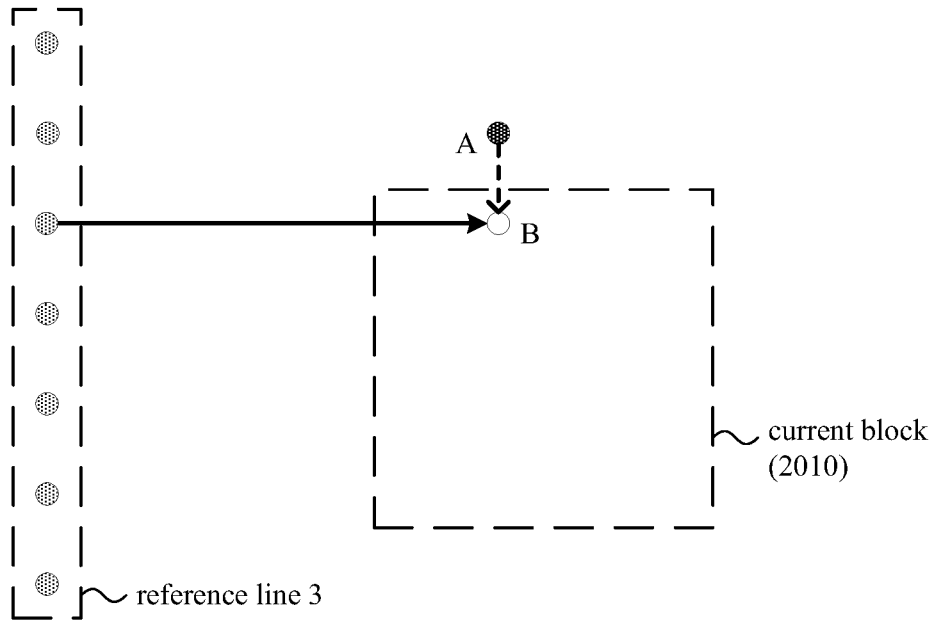

Similarly, FIG. 20b shows an example (2002) of vertical residue compensation when horizontal intra-picture prediction is performed for the predicted sample values of the current block (2010), according to the first approach. As FIG. 20b shows, the direction of intra-picture prediction (horizontal) is orthogonal to the direction of residue compensation (vertical). The weight applied for residue compensation in the example (2002) of FIG. 20b depends on position in the current block (2010) and size of the current block (2010). Typically, the weights decrease from the top of the current block (2010) to the bottom of the current block (2010). For example, as a 4×4 block, the weight for positions of the top row of the current block (2010) is ¾, the weight for positions of the second row is ½, the weight for positions of the third row is ¼, and the weight for the positions of the bottom row of the current block (2010) is 0. Alternatively, the weights can have other values (e.g., 1, ¾. ½, and ¼ for the respective rows). For a larger block (e.g., 8×8, 16×16), the weights can similarly decrease row-by-row in uniform increments (e.g., ⅛ for an 8×8 block, ¹⁄₁₆ for an 16×16 block).

Figure 20C:
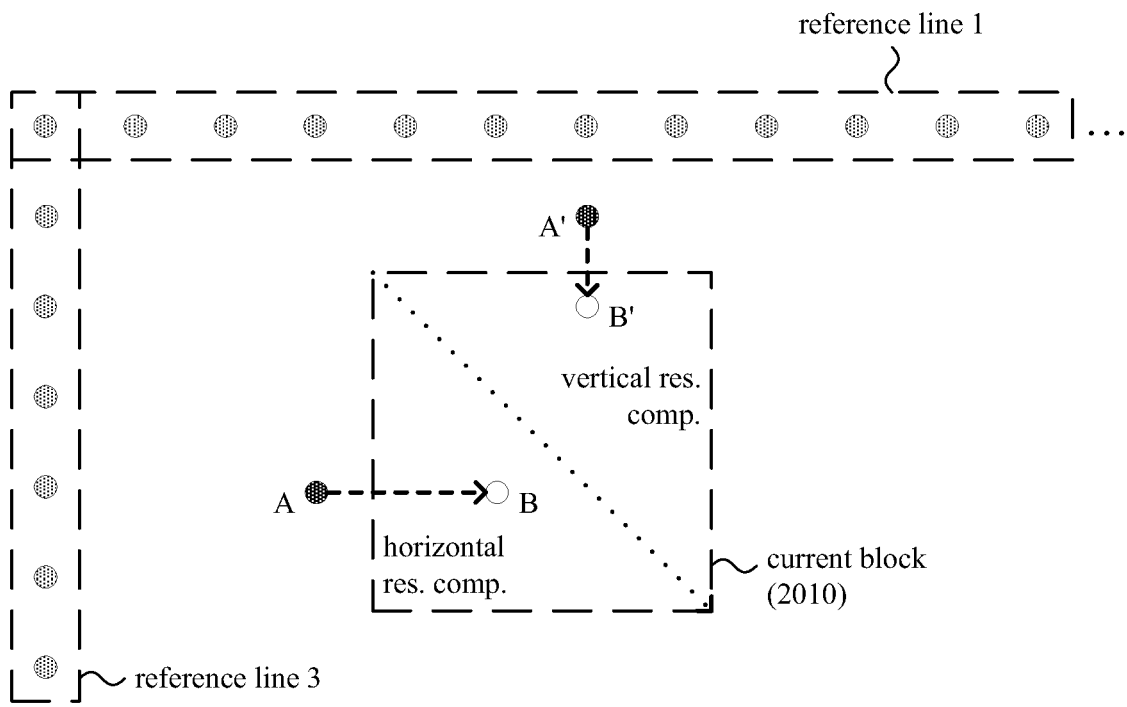

FIG. 20c shows an example (2003) of residue compensation when DC or planar intra-picture prediction is performed for the predicted sample values of the current block (2010), according to the first approach. As shown in FIG. 20c, horizontal residue compensation is performed for positions below a diagonal line through the current block (2010), running from the top-left corner to the bottom-right corner. For a position B below the diagonal line of the current block (2010), the predicted sample value $pred_B$ is calculated as: $pred_B = pred_B + weight \times (ref_A - pred_A)$. Vertical residue compensation is performed for positions above the diagonal line through the current block (2010). For a position B' above the diagonal line of the current block (2010), the predicted sample value $pred_{B'}$ is calculated as: $pred_{B'} = pred_B + weight \times (ref_{A'} - pred_{A'})$. For all positions of the current block (2010), the weight is weight=(num_filtered−k)/num_lines, where k represents the column index of the position in the current block (2010) for horizontal residue compensation or row index of the position in the current block (2010) for vertical residue compensation, num_filtered is the number of lines of the current block (2010) that are adjusted by residue compensation, and num_lines is the number of lines of the current block (2010). For example, for a 4×4 block, num_filtered is 3, and num_lines is 4. Or, for an 8×8 block, num_fltered is 7, and num_lines is 8. The value of k ranges from 0 to num_filtered. Thus, the weight is highest for the leftmost column (column 0, when k=0) or topmost row (row 0, when k=0). The weight decreases as k increases, moving positions to the right or down in the current block (2010). Alternatively, the weights can have other values.

In the first approach (FIGS. 20a-20c), residue compensation is not used for other prediction modes.

b. Second Approach to Residue Compensation.

FIG. 20d shows an example (2004) of residue compensation when DC or planar intra-picture prediction is performed for the predicted sample values of the current block (2010), according to a second approach. The example (2004) of FIG. 20d is the same as the example (2003) of FIG. 20c except for positions at the top-left of the current block (2010). As shown in FIG. 20d, horizontal residue compensation and vertical residue compensation are performed for positions in the top-left quarter of the current block (2010). For a position B" in the top-left quarter of the current block (2010), the predicted sample value $pred_{B''}$ is: $pred_{B''} = pred_{B''} + weight_H \times (ref_{A''} - pred_{A''}) + weight_W \times (ref_{A'''} - pred_{A'''})$. The weights $weight_H$ and $weight_W$ can be the same as the weights defined in the example (2003) of FIG. 20c, or they can be half of the weights defined in the example (2003) of FIG. 20c. Alternatively, the weights can have other values.

FIG. 20e shows an example (2005) of residue compensation when angular intra-picture prediction for one of modes 2-17 (from FIG. 7) is performed for the predicted sample values of the current block (2010), according to the second approach. The prediction directions for modes 2-17 are, at least generally, horizontal. The residue compensation is, at least generally, vertical. As FIG. 20e shows, the direction of intra-picture prediction is orthogonal to the direction of residue compensation. The weight applied for residue compensation in the example (2005) of FIG. 20e depends on position in the current block (2010) and size of the current block (2010). In particular, the weight is calculated as: weight=(13−abs(dir_mode−HOR_IDX))×(num_filtered−k)/64, where k represents the row index of the position in the current block (2010), and num_filtered is the number of lines of the current block (2010) that are adjusted by residue compensation. For example, the value of num_filtered is 2 or 3 for a 4×4 block. The value of num_filtered can be larger if the current block (2010) is larger, with proportional increases to the denominator (64). The value of k ranges from 0 to num_filtered. The value dir_mode indicates the mode of intra-picture prediction (in the range of 2 . . . 17 for FIG. 20e), and the value HOR_IDX is the mode of horizontal prediction (10 in FIG. 7). The factor (13−abs(dir_mode−HOR_IDX)) makes the weight higher for horizontal prediction and lower for prediction directions further from horizontal prediction. Alternatively, the weights can have other values.

The position A can be located at an integer-sample offset, but may also be located at a fractional sample offset horizontally. In this case, the predicted sample value and reconstructed reference sample value at position A are each interpolated. For example, the reference sample value at position A is interpolated using bilinear filtering between the two nearest sample values of a reference row that includes position A, and the predicted sample value at position A is interpolated using bilinear filtering between appropriate sample values of the reference column used for the intra-picture prediction (that is, between the two reference sample values nearest to where a projection of the prediction direction through position A intersects the reference column). (In some cases, position A may be "behind" the reference column used for intra-picture prediction, but a predicted sample value and reference sample value can still be determined for position A.)

FIG. 20f shows an example (2006) of residue compensation when angular intra-picture prediction for mode 18 (from FIG. 7) is performed for the predicted sample values of the current block (2010), according to the second approach. In the example (2006) of FIG. 20f, for positions of the current block (2010) that are above a diagonal line through the current block (2010), running from the top-left corner to the bottom-right corner, vertical residue compensation is performed as in the example (2005) of FIG. 20e. For positions of the current block (2010) that are below the diagonal line through the current block (2010), horizontal residue compensation is performed as in the example (2007) of FIG. 20g.

FIG. 20g shows an example (2007) of residue compensation when angular intra-picture prediction for one of modes 19-34 (from FIG. 7) is performed for the predicted sample values of the current block (2010), according to the second approach. The prediction directions for modes 19-34 are, at least generally, vertical. The residue compensation is, at least generally, horizontal. As FIG. 20g shows, the direction of intra-picture prediction is orthogonal to the direction of residue compensation. The weight applied for residue compensation in the example (2007) of FIG. 20g depends on position in the current block (2010) and size of the current block (2010). In particular, the weight is calculated as: weight=(13−abs(dir_mode−VER_IDX))×(num_filtered−k)/64, where k represents the column index of the position in the current block (2010), and num_filtered is the number of lines of the current block (2010) that are adjusted by residue compensation. For example, the value of num_filtered is 2 or 3 for a 4×4 block. The value of num_filtered can be larger if the current block (2010) is larger, with proportional increases to the denominator (64). The value of k ranges from 0 to num_filtered. The value dir_mode indicates the mode of intra-picture prediction (in the range of 19 . . . 34 for FIG. 20g), and the value VER_IDX is the mode of vertical prediction (26 in FIG. 7). The factor (13−abs(dir_mode−VER_IDX)) makes the weight higher for vertical prediction and lower for prediction directions further from vertical prediction. Alternatively, the weights can have other values.

The position A can be located at an integer-sample offset, but may also be located at a fractional sample offset vertically. In this case, the predicted sample value and reconstructed reference sample value at position A are each interpolated. For example, the reference sample value at position A is interpolated using bilinear filtering between the two nearest sample values of a reference column that includes position A, and the predicted sample value at position A is interpolated using bilinear filtering between appropriate sample values of the reference row used for the intra-picture prediction (that is, between the two reference sample values nearest to where a projection of the prediction direction through position A intersects the reference row). (In some cases, position A may be above the reference row used for intra-picture prediction, but a predicted sample value and reference sample value can still be determined for position A.)

c. Third Approach to Residue Compensation.

FIGS. 20h-20l show residue compensation according to a third approach. In the third approach, residue compensation for DC prediction mode or planar prediction mode is the same as in the second approach. For many intra-picture prediction modes, however, the direction of residue compensation is no longer orthogonal to the prediction direction. Instead, the direction of residue compensation is pure horizontal or vertical, or is parallel to the prediction direction.

FIG. 20h shows an example (2008) of residue compensation when angular intra-picture prediction for one of modes 2-6 (from FIG. 7) is performed for the predicted sample values of the current block (2010), according to the third approach. As FIG. 20h shows, the direction of intra-picture prediction is parallel to the direction of residue compensation, but in the opposite direction (inverse). The weight applied for residue compensation in the example (2008) of FIG. 20h depends on position in the current block (2010) and size of the current block (2010). In particular, the weight is calculated as: weight=(8−dir_mode)×(num_filtered−k)/32, where k represents the row index of the position in the current block (2010), and num_filtered is the number of lines of the current block (2010) that are adjusted by residue compensation. For example, the value of num_filtered is 2 or 3 for a 4×4 block. The value of num_filtered can be larger if the current block (2010) is larger, with proportional increases to the denominator (32). The value of k ranges from 0 to num_filtered. The value dir_mode indicates the mode of intra-picture prediction (in the range of 2 . . . 6 for FIG. 20h). The factor (8−dir_mode) makes the weight higher for prediction that is closer to horizontal prediction and lower for prediction that is further from horizontal prediction. Alternatively, the weights can have other values.

The position A can be located at an integer-sample offset, but may also be located at a fractional sample offset horizontally. In this case, the predicted sample value and reconstructed reference sample value at position A are each interpolated. For example, the reference sample value at position A is interpolated using bilinear filtering between the two nearest sample values of a reference row that includes position A, and the predicted sample value at position A is interpolated using bilinear filtering between appropriate sample values of the reference column used for the intra-picture prediction (that is, between the two reference sample values nearest to where a projection of the prediction direction through position A intersects the reference column).

Figure 20I:
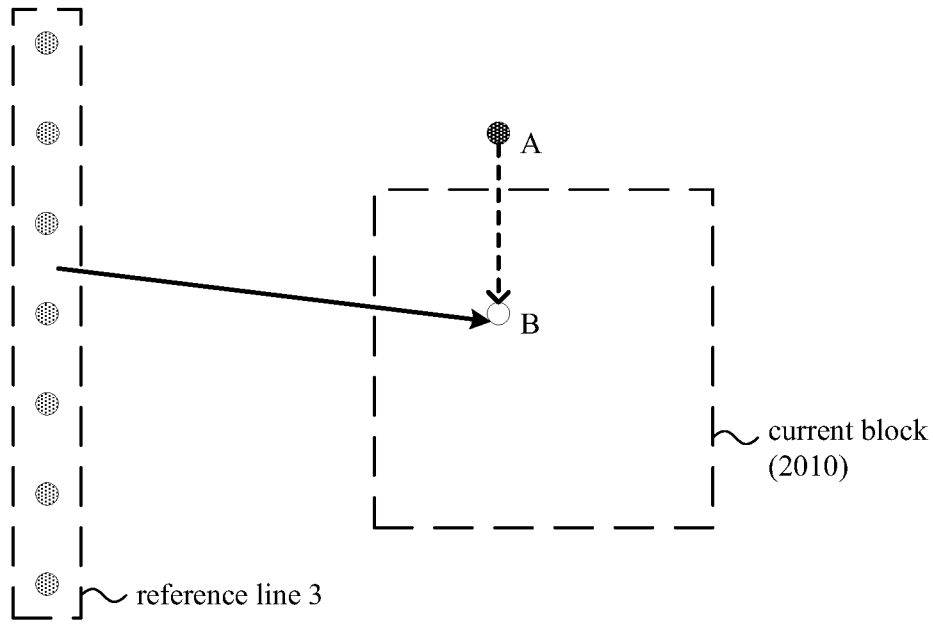

FIG. 20i shows an example (2009) of residue compensation when angular intra-picture prediction for one of modes 7-13 (from FIG. 7) is performed for the predicted sample values of the current block (2010), according to the third approach. As FIG. 20i shows, the direction of intra-picture prediction is, at least generally, horizontal, and the direction of residue compensation "snaps" to pure vertical prediction. The weight applied for residue compensation in the example (2009) of FIG. 20i is the same as the weight applied in the example (2005) of FIG. 20e.

FIG. 20j shows an example (2010) of residue compensation when angular intra-picture prediction for one of modes 14-22 (from FIG. 7) is performed for the predicted sample values of the current block (2010), according to the third approach. As FIG. 20j shows, the direction of intra-picture prediction is parallel to the direction of residue compensation, and in the same direction. The weight applied for residue compensation in the example (2010) of FIG. 20h depends on position in the current block (2010) and size of the current block (2010). In particular, the weight is calculated as:

weight=(num_filtered−k)/4, where k represents the lower index between the column index and row index of the position in the current block (2010), and num_filtered is the number of lines of the current block (2010) that are adjusted by residue compensation. For example, the value of num_filtered is 2 or 3 for a 4×4 block. The value of num_filtered can be larger if the current block (2010) is larger, with proportional increases to the denominator (4). The value of k ranges from 0 to num_filtered. Alternatively, the weights can have other values.

The position A can be located at an integer-sample offset, but may also be located at a fractional sample offset vertically (or horizontally). In this case, the predicted sample value and reconstructed reference sample value at position A are each interpolated. For example, the reference sample value at position A is interpolated using bilinear filtering between the two nearest sample values of a reference column that includes position A, and the predicted sample value at position A is interpolated using bilinear filtering between appropriate sample values of the reference column used for the intra-picture prediction (that is, between the two reference sample values nearest to where the prediction direction intersects the reference column). Or, the reference sample value at position A is interpolated using bilinear filtering between the two nearest sample values of a reference row that includes position A, and the predicted sample value at position A is interpolated using bilinear filtering between appropriate sample values of the reference row used for the intra-picture prediction (that is, between the two reference sample values nearest to where a projection of the prediction direction through position A intersects the reference row).

FIG. 20k shows an example (2011) of residue compensation when angular intra-picture prediction for one of modes 23-29 (from FIG. 7) is performed for the predicted sample values of the current block (2010), according to the third approach. As FIG. 20k shows, the direction of intra-picture prediction is, at least generally, vertical, and the direction of residue compensation "snaps" to pure horizontal prediction. The weight applied for residue compensation in the example (2011) of FIG. 20k is the same as the weight applied in the example (2007) of FIG. 20g.

FIG. 20l shows an example (2012) of residue compensation when angular intra-picture prediction for one of modes 30-34 (from FIG. 7) is performed for the predicted sample values of the current block (2010), according to the third approach. As FIG. 20l shows, the direction of intra-picture prediction is parallel to the direction of residue compensation, but in the opposite direction (inverse). The weight applied for residue compensation in the example (2012) of FIG. 20l depends on position in the current block (2010) and size of the current block (2010). In particular, the weight is calculated as: weight=(dir_mode−28)×(num_filtered−k)/32, where k represents the column index of the position in the current block (2010), and num_filtered is the number of lines of the current block (2010) that are adjusted by residue compensation. For example, the value of num_filtered is 2 or 3 for a 4×4 block. The value of num_filtered can be larger if the current block (2010) is larger, with proportional increases to the denominator (32). The value of k ranges from 0 to num_filtered. The value dir_mode indicates the mode of intra-picture prediction (in the range of 30 . . . 34 for FIG. 20l). The factor (dir_mode−28) makes the weight higher for prediction that is closer to vertical prediction and lower for prediction that is further from vertical prediction. Alternatively, the weights can have other values.

The position A can be located at an integer-sample offset, but may also be located at a fractional sample offset vertically. In this case, the predicted sample value and reconstructed reference sample value at position A are each interpolated. For example, the reference sample value at position A is interpolated using bilinear filtering between the two nearest sample values of a reference column that includes position A, and the predicted sample value at position A is interpolated using bilinear filtering between appropriate sample values of the reference row used for the intra-picture prediction (that is, between the two reference sample values nearest to where a projection of the prediction direction through position A intersects the reference row).

In the examples of FIGS. 20a-20l, the position A (or A', A", or A''') for the residual value is in an adjacent reference line (reference line 0). Alternatively, the position A (or A', A", or A''') for the residual value can be in a non-adjacent reference line (but still be along the appropriate direction of residue compensation). For example, the position A (or A', A", or A''') for the residual value can be in the reference line that is closest to the reference line used for intra-picture prediction. Or, the position A (or A', A", or A''') for the residual value can be in the reference line that is closest to halfway between the current block (2010) and the reference line used for intra-picture prediction. Alternatively, position A (or A', A", or A''') can be located somewhere else along the direction of residue compensation. As needed, a reference sample value and interpolated sample value at position A (or A', A", or A''') can be calculated using bilinear interpolation horizontally and/or vertically between adjacent reference sample values at integer-sample offsets. Also, residue compensation can use multiple residual values at different positions in the offset region, with different residual values getting different weights or identical weights.

2. Examples of Residue Compensation During Encoding or Decoding.

FIG. 21 shows a generalized technique (2100) for encoding that includes intra-picture prediction with residue compensation. An encoder such as the video encoder (340) of FIG. 3, another video encoder, or an image encoder can perform the technique (2100).

The encoder receives (2110) a picture, encodes (2120) the picture to produce encoded data, and outputs (2130) the encoded data as part of a bitstream. As part of the encoding (2120), the encoder performs intra-picture prediction for a current block of sample values in the picture. A non-adjacent reference line of sample values is available for the intra-picture prediction. When it performs intra-picture prediction for the current block, the encoder performs residue compensation.

The encoder checks (2140) whether to continue with the next picture. If so, the encoder receives (2110) and encodes (2120) the next picture.

FIG. 22 shows a generalized technique (2200) for decoding that includes intra-picture prediction with residue compensation. A decoder such as the video decoder (550) of FIG. 5, another video decoder, or an image decoder can perform the technique (2200).

The decoder receives (2210) encoded data as part of a bitstream, decodes (2220) the encoded data to reconstruct a picture, and outputs (2230) the reconstructed picture. As part of the decoding, the decoder performs intra-picture prediction for a current block of sample values in the picture. A non-adjacent reference line of sample values is available for the intra-picture prediction. When it performs intra-picture prediction for the current block, the decoder performs residue compensation.

The decoder checks (2240) whether to continue with the next picture. If so, the decoder receives (2210) encoded data for the next picture and decodes (2220) the encoded data for the next picture.

The residue compensation performed during the encoding (2120) or decoding (2220) can include various operations. For example, for a predicted sample value at a given position in the current block, the encoder or decoder calculates a residual value at a given position in an offset region (outside the current block). The residual value is based on a difference between a predicted sample value at the given position in the offset region and a reconstructed sample value at the given position in the offset region. Examples of positions in offset regions are shown in FIGS. 20a-20l.

The given position in the offset region can have an integer-sample offset horizontally and integer-sample offset vertically. In this case, the predicted sample value and reconstructed sample value at the given position in the offset region are previous sample values. Or, the given position in the offset region can have a fractional-sample offset horizontally and/or vertically. In this case, the predicted sample value and reconstructed sample value at the given position in the offset region are interpolated values.

The encoder/decoder uses the residual value to adjust the predicted sample value at the given position in the current block. The encoder/decoder can apply a weight to the residual value, producing a weighted residual value that is used to adjust the predicted sample value at the given position in the current block. The weight that is applied can depend on factors such as the given position in the current block, the number of lines of sample values of the current block that are processed with the residue compensation, and prediction direction of the intra-picture prediction for the current block, as explained with reference to the examples of FIGS. 20a-20l. Alternatively, the weight depends on other and/or additional factors.

For a directional prediction mode, intra-picture prediction for a predicted sample value at a given position in the current block follows a prediction direction. Residue compensation follows a residue compensation direction from the given position in the offset region to the given position in the current block. In some cases, the residue compensation direction is orthogonal to the prediction direction (see, e.g., FIGS. 20a, 20b, 20e-20g). In other cases, the residue compensation direction is opposite the prediction direction (see, e.g., FIGS. 20h, 20l). In still other cases, the residue compensation direction is aligned with the prediction direction (see, e.g., FIG. 20j), or the residue compensation direction "snaps" to a pure horizontal or pure vertical direction that is close to orthogonal to the prediction direction (see, e.g., FIGS. 20i, 20k).

For a non-directional prediction mode, the residue compensation can include different operations. For example, for a predicted sample value at a given position of a current block, the encoder/decoder calculates a first residual value at a first position in an offset region (outside the current block). The first residual value is based on a difference between a predicted sample value and reconstructed sample value at the first position in the offset region. The encoder/decoder also calculates a second residual value at a second position in the offset region. The second residual value is based on a difference between a predicted sample value and reconstructed sample value at the second position in the offset region. The encoder/decoder uses the first and second residual values to adjust the predicted sample value at the given position in the current block (see, e.g., FIG. 20d).

D. Weighted Prediction.

This section describes examples of weighted prediction during intra-picture prediction with multiple reference lines. Weighted prediction can improve the effectiveness of intra-picture prediction for a current block by blending predicted sample values generated using different reference lines.

Weighted prediction can be used in combination with one or more other innovations described herein. For example, weighted prediction can be performed after residue compensation (e.g., residue compensation performed for intermediate predicted sample values), or weighted prediction can be performed before residue compensation (e.g., residue compensation performed for final weighted sample values). Weighted prediction can use filtered reference sample values. Weighted prediction can use reference sample values that have been in-loop filtered. The reference sample values used for weighted prediction may include padded sample values derived using mode-dependent padding. Post-filtering may be applied to intermediate predicted sample values, to weighted sample values (before combination), and/or to final weighted sample values.

1. Examples of Weighted Prediction.

Figure 23:
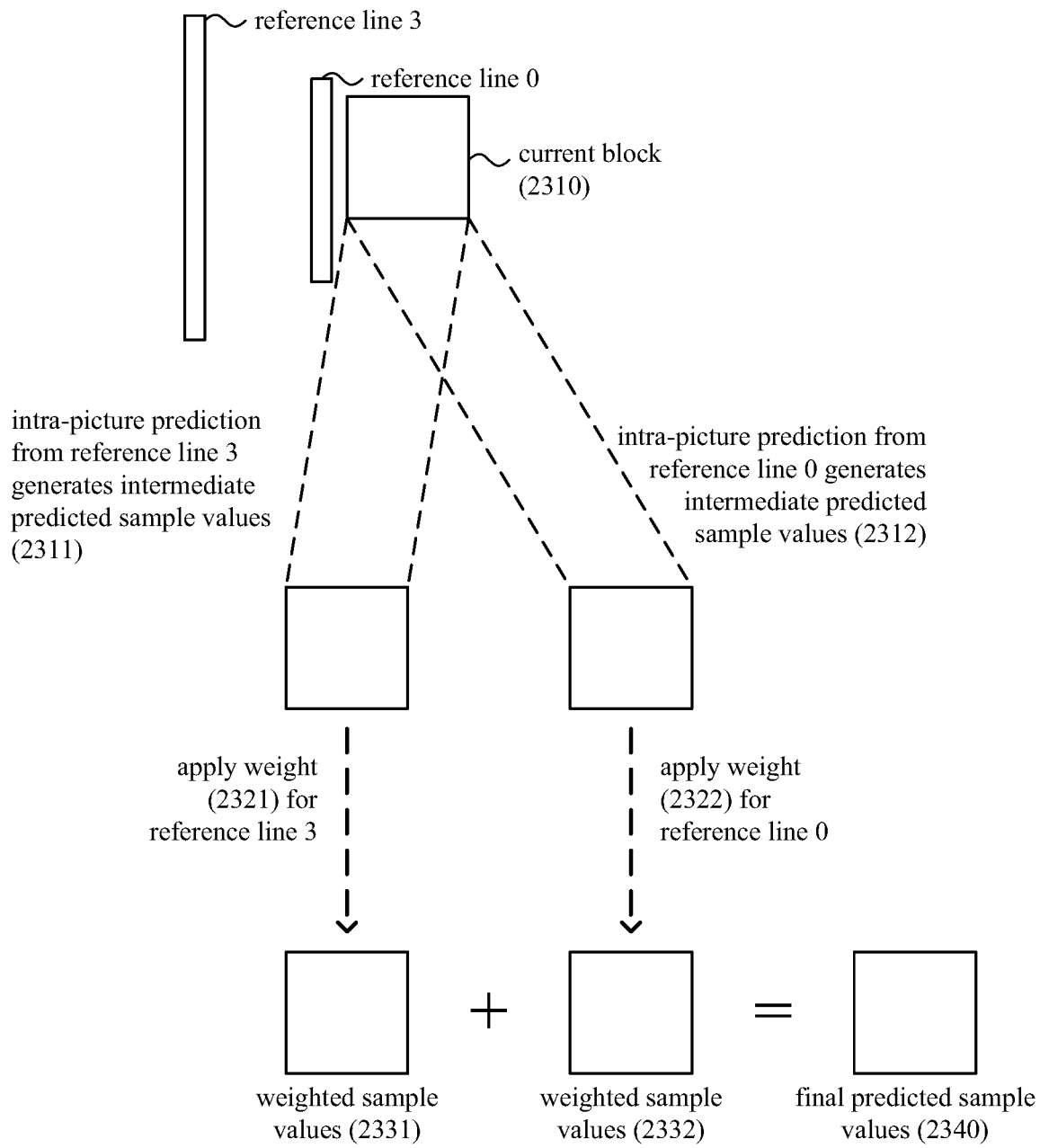
FIG. 23 is a diagram illustrating an example of weighted prediction during intra-picture prediction with multiple reference lines.

FIG. 23 shows an example (2300) of weighted prediction during intra-picture prediction with multiple reference lines. In FIG. 23, reference sample values from the adjacent reference column and a non-adjacent reference column are used to predict the sample values of a current block (2310). Intra-picture prediction using the reference sample values of the non-adjacent column (reference line 3) generates a first set of intermediate predicted sample values (2311). Intra-picture prediction using the reference sample values of the adjacent column (reference line 0) generates a second set of intermediate predicted sample values (2312). The intra-picture prediction from the different reference lines can have the same prediction mode (e.g., same prediction direction, or same non-directional prediction mode) or different prediction modes (e.g., different prediction directions, or different non-directional prediction modes, or a mix of different directional and non-directional prediction modes).

A weight (2321) is applied to the first set of intermediate predicted sample values (2311), which produces a first set of weighted sample values (2331). Another weight (2322) is applied to the second set of intermediate predicted sample values (2312), which produces a second set of weighted sample values (2332). Weights for the respective reference lines can be specified in various ways, as explained below.

The different sets of weighted sample values are combined to produce final predicted sample values (2340) for the current block (2310). For example, the weighted sample values are added on a position-by-position basis for the respective positions in the current block (2310).

Although FIG. 23 shows two reference lines used for weighted prediction, weighted prediction can use more reference lines (e.g., 3, 4, 5). Also, although FIG. 23 shows weighted prediction that uses multiple reference columns, weighted prediction can instead use multiple reference rows or a mix of reference columns and rows. For some intra-prediction modes, predicted sample values are generated using reference sample values from a reference column and reference sample values from a reference row to generate a single set of intermediate predicted sample values. Weighted prediction, in contrast, involves weighting and combining different sets of intermediate predicted sample values.

2. Examples of Signaling of Weights.

The different reference lines used in weighted prediction can be identified with reference line indices signaled as part of encoded data in the bitstream. Alternatively, one or more of the reference lines used in weighted prediction can be pre-defined. For example, weighted prediction can use two reference lines: a non-adjacent reference line (identified by a reference line index signaled in the bitstream) and the adjacent reference line (which is always used, and hence not identified with a reference line index). Alternatively, weighted prediction can use some other pre-defined reference line in addition to one or more signaled reference lines, or weighted prediction can use multiple pre-defined reference lines.

In one approach to specifying weights for weighted prediction, the weights used in the weighted prediction are fixed (and hence not signaled as part of encoded data in the bitstream). For example, the weighted prediction always uses two reference lines with fixed weights: a non-adjacent reference line with a weight of ¾ and the adjacent reference line with a weight of ¼. Alternatively, the weighted prediction uses different, pre-defined weights for the two reference lines or uses more reference lines with pre-defined weights. The pre-defined weights can depend on a rule (e.g., distance between a non-adjacent reference line and the current block).

In another approach to specifying weights for weighted prediction, the weights used in the weighted prediction are signaled as part of encoded data in the bitstream. This provides flexibility for the encoder to set different weights in different situations (e.g., different non-adjacent reference lines used with the adjacent reference line, different combinations of non-adjacent reference lines). For example, one weight is signaled per reference line used in weighted prediction. Different weights can be signaled at block level or unit level, wherever reference line indices are signaled. When n weights add up to some defined amount (e.g., 1), the n weights can be signaled with n−1 values, since the last weight must be whatever remains when the n weights are combined to make the defined amount.

In some example implementations, weights for weighted prediction are specified using a table-based approach. A weight table is a set of weights for weighted prediction. A weight table includes weights for the reference lines used in weighted prediction (e.g., a non-zero weight per reference line). The weight table can be expressly signaled as part of encoded data in the bitstream (e.g., for a block or unit). Or, multiple weight tables can be stored at the encoder or decoder (e.g., pre-defined weight tables, or weight tables signaled at a higher syntax level such as sequence level in an SPS, picture level in a PPS, or slice level in a slice header or associated syntax structure). In this case, a table index signaled at block level or unit level identifies one of the weight tables for use in weighted prediction. A weight table can include a set of weights associated with a specific, defined combination of reference lines, thereby implicitly identifying the reference lines. Or, a weight table can include a set of n weights associated with any combination of n reference lines, which are identified separately. When n weights add up to some defined amount (e.g., 1), the n weights in a table can be specified with n−1 values.

For example, the encoder and decoder store four different weight tables for a combination of three reference lines. The four weight tables are: {3/4, 3/16, 1/16}, {1/4, 5/8, 1/8}, {3/16, 1/8, 11/16}, and {3/8, 5/16, 5/16}. A table index of 0, 1, 2, or 3 indicates which of the weight tables to use (e.g., for a block or unit). The table index can be entropy coded/decoded.

In the preceding examples of weight tables, a weight table includes only non-zero weights—that is, a non-zero weight per reference line used in weighted prediction. Alternatively, a weight table can include a weight per candidate reference line, including a zero weight for a candidate reference line if the candidate reference line is not used for weighted prediction.

In the preceding examples of weighted prediction, weights are specified for the reference lines of a current block. For a given reference line, the same weight is applied to all predicted sample values generated using that reference line. Alternatively, weighted prediction uses more fine-grained weights. For example, for a given reference line, different weights can be specified for different positions of the current block. The position-specific weights can be pre-defined (fixed), or signaled as part of encoded data in the bitstream (flexible or table-based). Or, the position-specific weights can be determined by rule starting from weights determined at a higher level (e.g., block level, unit level), or they can be indicated by pattern information signaled as part of encoded data in the bitstream for the current block or unit (e.g., the left half of the current block uses predicted sample values from a first reference line, and the right half of the current block uses predicted sample values from a second reference line). This flexibility allows, for example, sample values at some positions of the current block to be predicted from one reference line (or mostly one reference line), while sample values at other positions of the current block are predicted from another reference line (or mostly the other reference line).

3. Examples of Weighted Prediction During Encoding and Decoding.

Figure 24:
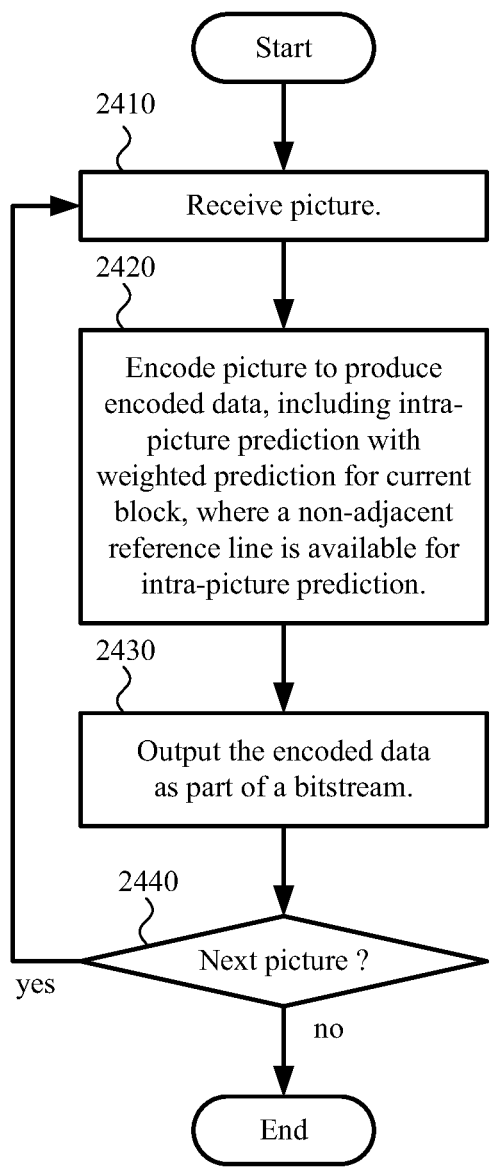
FIGS. 24 and 25 are flowcharts illustrating generalized techniques for encoding and decoding, respectively, using intra-picture prediction with weighted prediction.

FIG. 24 shows a generalized technique (2400) for encoding that includes intra-picture prediction with weighted prediction. An encoder such as the video encoder (340) of FIG. 3, another video encoder, or an image encoder can perform the technique (2400).

The encoder receives (2410) a picture, encodes (2420) the picture to produce encoded data, and outputs (2430) the encoded data as part of a bitstream. As part of the encoding (2420), the encoder performs intra-picture prediction for a current block of sample values in the picture. A non-adjacent reference line of sample values is available for the intra-picture prediction. When it performs intra-picture prediction for the current block, the encoder performs weighted prediction of the sample values of the current block using multiple reference lines of sample values. The multiple reference lines include at least one non-adjacent reference line of sample values.

The encoder checks (2440) whether to continue with the next picture. If so, the encoder receives (2410) and encodes (2420) the next picture.

Figure 25:
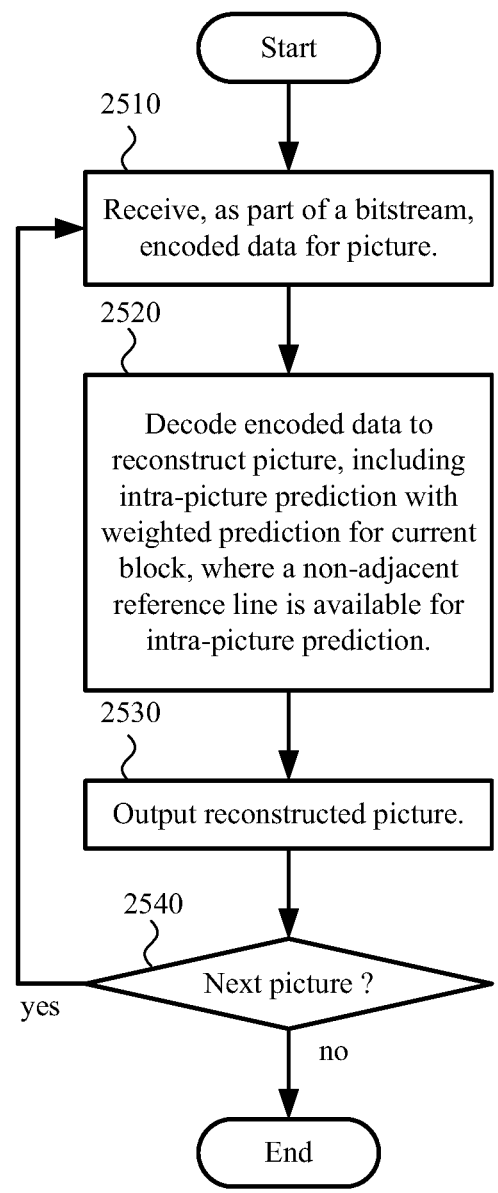

FIG. 25 shows a generalized technique (2500) for decoding that includes intra-picture prediction with weighted prediction. A decoder such as the video decoder (550) of FIG. 5, another video decoder, or an image decoder can perform the technique (2500).

The decoder receives (2510) encoded data as part of a bitstream, decodes (2520) the encoded data to reconstruct a picture, and outputs (2530) the reconstructed picture. As part of the decoding, the decoder performs intra-picture prediction for a current block of sample values in the picture. A non-adjacent reference line of sample values is available for the intra-picture prediction. When it performs intra-picture prediction for the current block, the decoder performs weighted prediction of the sample values of the current block using multiple reference lines of sample values. The multiple reference lines include at least one non-adjacent reference line of sample values.

The decoder checks (2540) whether to continue with the next picture. If so, the decoder receives (2510) encoded data for the next picture and decodes (2520) the encoded data for the next picture.

The weighted prediction performed during the encoding (2420) or decoding (2520) can include various operations. For example, for a given position in the current block, the encoder or decoder performs operations for each of multiple reference lines. Specifically, the encoder/decoder generates an intermediate predicted sample value at the given position using at least one sample value of that reference line, and applies a weight to the intermediate predicted sample value to produce a weighted sample value at the given position. The encoder/decoder can generate intermediate predicted sample values and apply weights on a reference line-by-reference line basis for all sample values of the current block (see FIG. 26). The encoder/decoder combines the weighted sample values at the given position to produce a final predicted sample value at the given position in the current block.

FIG. 26 shows an example technique (2600) for weighted prediction during intra-picture prediction with multiple reference lines for a current block. The example technique can be performed by an encoder during the encoding (2420) of FIG. 24 or by a decoder during the decoding (2520) of FIG. 25.

The encoder or decoder selects (2610) one of multiple candidate reference lines of sample values outside a current block. The multiple candidate reference lines include at least one non-adjacent reference line of sample values. The encoder or decoder generates (2620) intermediate predicted sample values for the current block using the selected reference line, and applies (2630) a weight for the reference line to the intermediate predicted sample values. This produces weighted sample values. The encoder or decoder checks (2640) whether to continue with another one of the multiple candidate reference lines. If so, the encoder or decoder selects (2610) the next one of the multiple candidate reference lines. After producing weighted sample values for each of the multiple candidate reference lines to be used in intra-picture prediction, the encoder or decoder combines (2650) the weighted sample values for the respective reference lines used in intra-picture prediction.

The encoder or decoder can repeat the technique (2600) for other blocks of the picture.

In the weighted prediction, each of the multiple reference lines used in intra-picture prediction can have a weight associated with that reference line. The weights for the respective reference lines can be signaled as part of encoded data in the bitstream. Or, the weights for the multiple lines can be pre-defined (and hence not signaled as part of encoded data in the bitstream). For example, if the multiple reference lines used in intra-picture prediction include a non-adjacent reference line (identified by reference line index) and adjacent reference line (assumed), pre-defined weights for weighted prediction can be used (e.g., ¾ and ¼, or ½ and ½). The weights for the multiple reference lines used in the intra-picture prediction can be defined at block level for the current block. Alternatively, the weights for the multiple reference lines used in the intra-picture prediction can be defined for individual sample values of the current block.

Alternatively, a weight table can include weights for the multiple reference lines used in intra-picture prediction, or weights for all of the multiple candidate reference lines whether used in intra-picture prediction or not. For example, the weight table includes a non-zero weight for each of the multiple reference lines used in the intra-picture prediction. The weight table can also include a zero weight for any other reference line of the multiple candidate reference lines. The weight table can be signaled as part of encoded data in the bitstream. Or, an identifier of the weight table can be signaled as part of the encoded data, referencing one of multiple weight tables available at the encoder and decoder.

The intra-picture prediction for the respective reference lines can use the same intra-picture prediction mode (e.g., specified for the current block at block level or unit level). Alternatively, a separate intra-picture prediction mode can be specified for each of the multiple reference lines used in the intra-picture prediction. In this case, intra-picture prediction for different reference lines into the current block can use different intra-picture prediction modes.

E. Mode-Dependent Padding to Replace Unavailable Reference Sample Values.

When performing intra-picture prediction, reference sample values may be unavailable because they lie outside a picture boundary or slice boundary. Or, reference sample values may be unavailable because they are part of a block that has not yet been encoded/decoded/reconstructed. Or, in some example implementations, sample values in a neighboring inter-coded block may be unavailable for use as reference sample values (e.g., if intra-picture prediction is constrained to only use reference sample values from intra-coded blocks—so-called "constrained intra-picture prediction"). In some previous codec standards, unavailable reference sample values in a reference line can be replaced by repeating the last available reference sample value in that reference line. This can be called horizontal repeat padding or vertical repeat padding.

This section describes examples of mode-dependent padding to replace unavailable reference sample values for intra-picture prediction. Compared to simple padding of sample values within a reference line, mode-dependent padding can yield padded sample values that provide more effective intra-picture prediction.

Mode-dependent padding to replace unavailable reference sample values can be used in combination with one or more other innovations described herein. For example, mode dependent padding as described in this section can be performed before residue compensation and/or weighted prediction.

1. Examples of Mode-Dependent Padding.

With mode-dependent padding, unavailable sample values in a reference line can be replaced with available, actual reference sample values along an intra-picture prediction direction. In general, if the sample value at a given position of a reference line is unavailable (e.g., because it is outside a picture boundary or slice boundary, or it has not yet been encoded/decoded/reconstructed, or it cannot be used for intra-picture prediction due to constrained intra-picture prediction or some other constraint), one or more reference sample values are evaluated in one or more other reference lines. The reference sample value(s) of the other reference line(s) are evaluated along a padding direction. For example, the padding direction is the prediction direction for an intra-picture prediction mode being used. Or, for a non-directional prediction mode, the padding direction is horizontal or vertical. Along the padding direction, a projection passes through the given position (with the unavailable sample value) and through the position(s) of the other reference line(s). The reference sample value(s) on the projection can be on either side of the given position with the unavailable sample value.

When a reference sample value on the projection has a fractional-sample offset, the reference sample value is determined by interpolating between the two nearest reference sample values at integer-sample offsets in the same reference line. For example, the interpolation uses bilinear filtering. If one of the two nearest reference sample values at integer-sample offsets is not available, the reference sample value on the projection is deemed to be not available.

The reference sample value(s) on the projection are checked sequentially, starting at the position closest to the given position (with the unavailable sample value), and continuing outward, until a position is found with an available, actual reference sample value or the last position is evaluated. If two positions are equidistant from the given position with the unavailable sample value, the position closer to the current block is checked first. If an available, actual sample value is found, that sample value is used in place of the unavailable sample value in the given position. If no available, actual sample value is found along the padding direction, the closest available, actual sample value in the same reference line as the given position is used (e.g., as in horizontal repeat padding or vertical repeat padding).

FIG. 27 shows a first example (2700) of mode-dependent padding to replace unavailable sample values for intra-picture prediction of sample values of a current block (2710). In FIG. 27, the sample value at position A is unavailable. The reference sample values are at integer-sample offsets in the picture. The unavailable sample value at position A is replaced with a reconstructed reference sample value at integer-sample offsets.

Along the prediction direction for the intra-picture prediction, a projection passes through position A. This projection also passes through positions B, C, D, and E of other reference lines. Positions B, C, D, and E are checked sequentially, starting with position closest to position A, and continuing outward from position A on either side, until a position is found that has an available, actual sample value. If an available, actual sample value is found at position B, C, D, or E, that sample value is used in place of the unavailable sample value at position A. If no available, actual sample value is found at positions B, C, D, and E, the closest available, actual sample value in the same reference line is used (e.g., at position F, G, and so on).

FIG. 28 shows a second example (2800) of mode-dependent padding to replace unavailable sample values for intra-picture prediction of sample values of a current block (2810). In FIG. 28, the sample value at position A is unavailable. The unavailable sample value at position A may be replaced with an interpolated sample value at a fractional-sample offset.

Along the prediction direction for the intra-picture prediction, a projection passes through position A. This projection also passes through other reference lines at fractional-sample offsets. For example, the projection passes through a reference line at a position between positions B' and B''. An interpolated sample value is calculated on the projection between B' and B''. Interpolated sample values are similarly calculated between positions C' and C'', between positions D' and D'', and between positions E' and E''. The interpolated sample values at the position between positions B' and B'', position between positions C' and C'', position between positions D' and D'', and position between positions E' and E'' are checked sequentially, starting with position closest to position A, and continuing outward from position A on either side, until a position is found that has an available, actual sample value. If an available, actual sample value is found, that sample value is used in place of the unavailable sample value at position A. Otherwise, the closest available, actual sample value in the same reference line is used (e.g., at position F, G, and so on).

In FIGS. 27 and 28, the intra-picture prediction mode is an angular prediction mode having a prediction direction. For DC prediction mode and planar prediction mode, an unavailable sample value at a position that is above the current block or above-right of the current block can be replaced with an actual sample value using vertical repeat padding. An unavailable sample value at a position that is left of the current block or below-left of the current block can be replaced with an actual sample value using horizontal repeat padding. An unavailable sample value at a top-left position relative to the current block can be replaced by aggregating nearby reference sample values as shown in FIG. 16a or 16b.

2. Examples of Mode-Dependent Padding During Encoding or Decoding.

Figure 29:
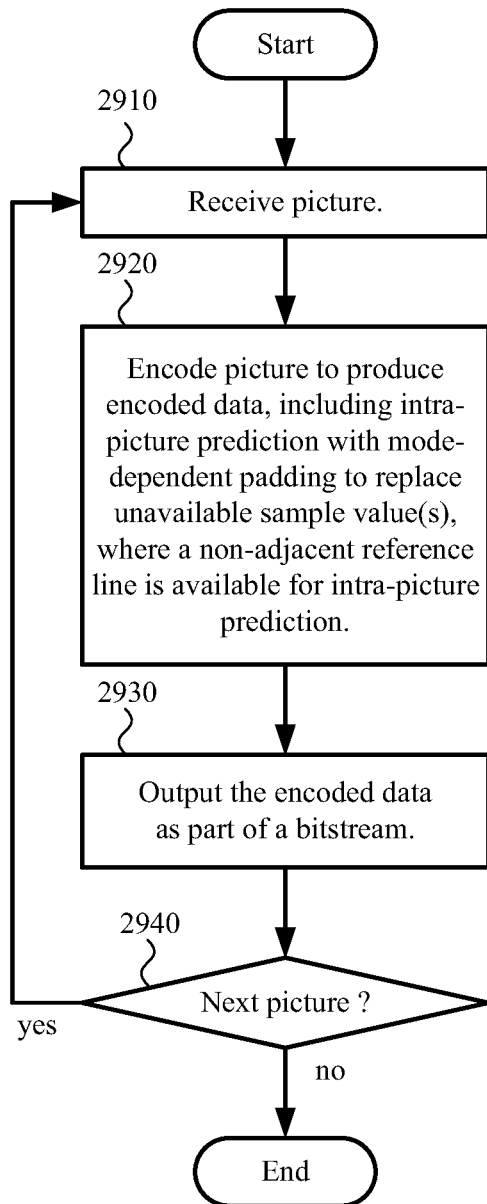
FIGS. 29 and 30 are flowcharts illustrating generalized techniques for encoding and decoding, respectively, using intra-picture prediction with mode-dependent padding.

FIG. 29 shows a generalized technique (2900) for encoding that includes intra-picture prediction with mode-dependent padding to replace one or more unavailable reference sample values. An encoder such as the video encoder (340) of FIG. 3, another video encoder, or an image encoder can perform the technique (2900).

The encoder receives (2910) a picture, encodes (2920) the picture to produce encoded data, and outputs (2930) the encoded data as part of a bitstream. As part of the encoding (2920), the encoder performs intra-picture prediction for a current block of sample values in the picture. A non-adjacent reference line of sample values is available for the intra-picture prediction. When it performs intra-picture prediction for the current block, the encoder performs mode-dependent padding to replace one or more unavailable reference sample values.

The encoder checks (2940) whether to continue with the next picture. If so, the encoder receives (2910) and encodes (2920) the next picture.

Figure 30:
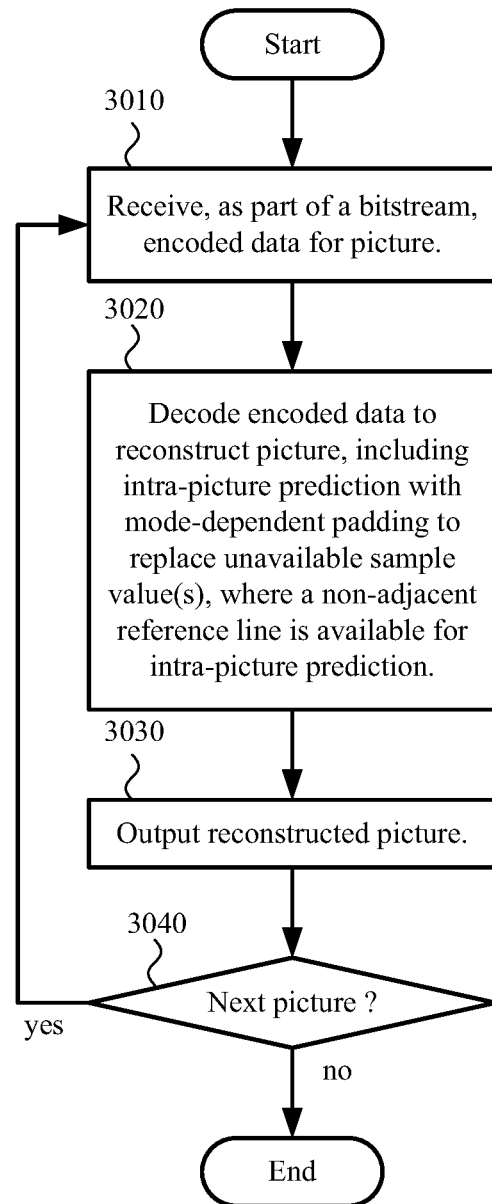

FIG. 30 shows a generalized technique (3000) for decoding that includes intra-picture prediction with mode-dependent padding to replace one or more unavailable reference sample values. A decoder such as the video decoder (550) of FIG. 5, another video decoder, or an image decoder can perform the technique (3000).

The decoder receives (3010) encoded data as part of a bitstream, decodes (3020) the encoded data to reconstruct a picture, and outputs (3030) the reconstructed picture. As part of the decoding, the decoder performs intra-picture prediction for a current block of sample values in the picture. A non-adjacent reference line of sample values is available for the intra-picture prediction. When it performs intra-picture prediction for the current block, the decoder performs mode-dependent padding to replace one or more unavailable reference sample values.

The decoder checks (3040) whether to continue with the next picture. If so, the decoder receives (3010) encoded data for the next picture and decodes (3020) the encoded data for the next picture.

Figure 31:
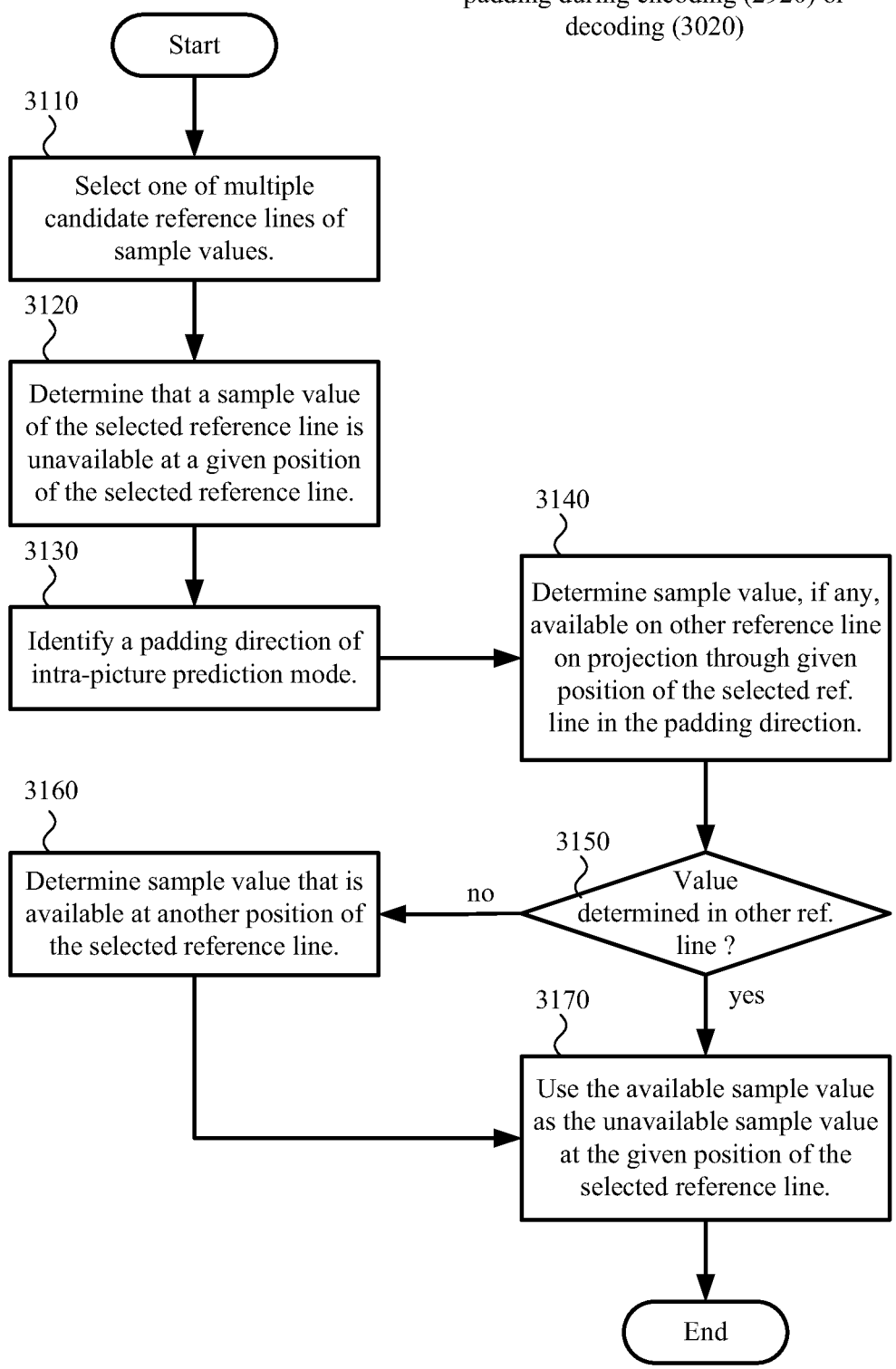
FIG. 31 is a flowchart illustrating an example technique for mode-dependent padding to replace an unavailable sample value during intra-picture prediction.

FIG. 31 shows an example technique (3100) for mode-dependent padding to replace an unavailable sample value during intra-picture prediction. The example technique can be performed by an encoder during the encoding (2920) of FIG. 29 or by a decoder during the decoding (3020) of FIG. 30.

To start, the encoder or decoder selects (3110) one of multiple candidate reference lines of sample values outside the current block. The multiple candidate reference lines include at least one non-adjacent reference line of sample values.

The encoder or decoder determines (3120) that a sample value of the selected reference line is unavailable at a given position of the selected reference line. For example, the given position is outside a picture boundary, outside a slice boundary, not reconstructed yet, constrained to not be used for reference in intra-picture prediction, or otherwise unavailable for use in intra-picture prediction.

The encoder or decoder identifies (3130) a padding direction of an intra-picture prediction mode. For example, the padding direction is a prediction direction for an angular prediction mode having the prediction direction. Or, for a non-directional prediction mode such as DC prediction mode or planar prediction mode, the padding direction is vertical or horizontal.

The encoder or decoder determines (3140) a sample value, if any, available on another reference line on a projection, in the padding direction, through the given position of the selected reference line. For example, the encoder or decoder evaluates one or more positions along the projection in one or more candidate reference lines, in order of increasing distance away from the given position of selected reference line, until an available sample value is determined in one of the candidate reference line(s) along the projection in the padding direction. The available sample value can be available, without padding, at an integer-sample offset horizontally and vertically in one of the candidate reference line(s). Or, the available sample value can be derived by interpolation from sample values available, without padding, at integer-sample offsets horizontally and vertically in one of the candidate reference line(s). In this case, the determining the sample value can include interpolating the sample value at a fractional-sample offset horizontally and/or vertically in another reference line.

The encoder or decoder checks (3150) if an available sample value has been determined in another reference line on the projection. If so, the encoder or decoder uses (3170) the determined available sample value as the unavailable sample value at the given position of the selected reference line.

Otherwise (no sample value of another reference line is determined to be available), the encoder or decoder determines (3160) a sample value that is available at another position within the selected reference line (e.g., by horizontal or vertical repeat padding). Then, the encoder or decoder uses (3170) that determined available sample value as the unavailable sample value at the given position of the selected reference line.

The encoder or decoder can repeat the technique (3100) for unavailable sample values at other positions.

F. Intra-Picture Prediction with In-Loop-Filtered Reference Sample Values.

Many conventional codec standards and formats use in-loop filtering on reconstructed sample values for use in subsequent inter-picture prediction. For example, the in-loop filtering can include deblocking and/or sample adaptive offset ("SAO") filtering. Generally, in-loop filtering makes the filtered sample values more effective for subsequent inter-picture prediction that uses the filtered sample values.

Conventionally, in-loop filtering is not performed on reference sample values before those reference sample values are used in intra-picture prediction. A typical deblocking filter or SAO filter relies on sample values on both sides of an edge that is to be filtered. For example, for the edge offset mode of an SAO filter, sample classification may be based on comparisons between current sample values and neighboring sample values. For intra-picture prediction of a current block, the current block has not yet been encoded and reconstructed, so the sample values of the current block are not available for use by the deblocking filter or SAO filter. As such, the reference sample values of an adjacent reference line (column or row) are not in-loop filtered prior to intra-picture prediction.

This section describes examples of intra-picture prediction using in-loop-filtered reference sample values. In particular, reference sample values of non-adjacent reference lines can, in some cases, be in-loop filtered before those reference sample values are used for intra-picture prediction. In-loop filtering of the reference sample values can improve the effectiveness of subsequent intra-picture prediction that uses the reference sample values.

In-loop filtering of reference sample values for intra-picture prediction can be used in combination with one or more other innovations described herein. For example, in-loop-filtered reference sample values in a non-adjacent reference frame can be used in intra-picture prediction with residue compensation or weighted prediction, or can be further filtered or used in mode-dependent padding.

1. Examples of In-Loop-Filtered Reference Sample Values.

Figure 32:
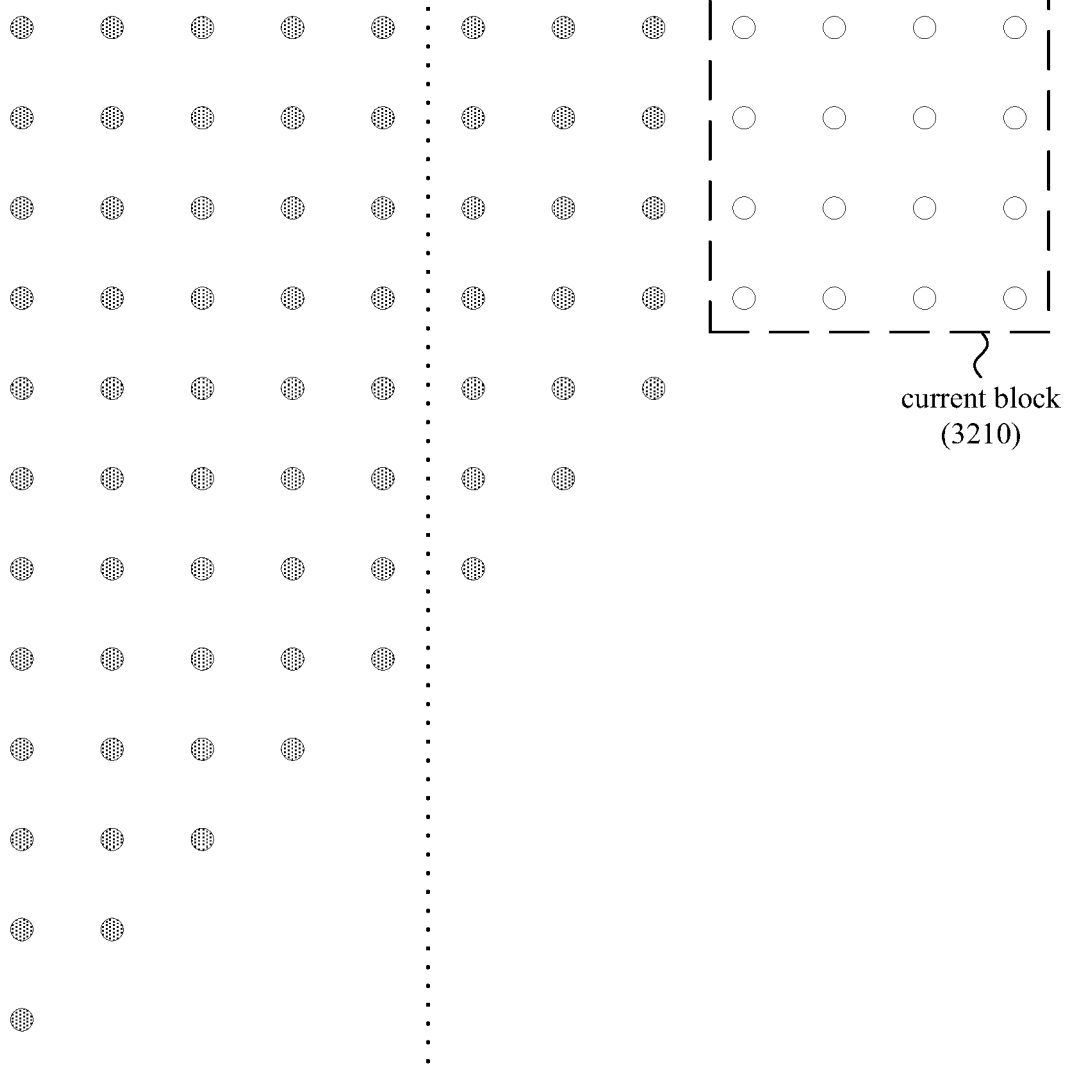
FIG. 32 is a diagram illustrating an example of in-loop-filtered reference sample values used during intra-picture prediction.

FIG. 32 shows an example (3200) of in-loop-filtered reference sample values used during intra-picture prediction. Reference sample values in multiple candidate reference lines (in FIG. 32, columns) are available for intra-picture prediction of sample values of a current block (3210). The reference sample values include reference sample values (3230) that may have been in-loop filtered. The possibly in-loop-filtered reference sample values (3230) have no dependencies on the current block (3210) or any other block that has not yet been decoded. For the possibly in-loop-filtered reference sample values (3230), in-loop filtering can be completed without waiting for reconstructed sample values of the current block (3210). In some example implementations, to improve the effectiveness of intra-picture prediction of the current block (3210), reference sample values are accessed for the intra-picture prediction of the current block (3210) after in-loop filtering is performed on those reference sample values if the in-loop filtering can be performed without using reconstructed sample values of the current block (3210). This condition is satisfied for non-adjacent reference lines farther away from the current block (3210), outside the range of in-loop filtering of the edge between the adjacent reference line and current block (3210).

In FIG. 32, the reference sample values also include reference sample values (3220) that cannot be in-loop filtered prior to the intra-picture prediction for the current block (3210). For the right-most reference columns, closest to the current block (3210), in-loop filtering depends on reconstructed sample values of the current block (3210). Similarly, for the bottom-most reference rows, which are not shown in FIG. 32, in-loop filtering depends on reconstructed sample values of the current block (3210).

2. Examples of Intra-Picture Prediction with In-Loop-Filtered Reference Sample Values During Encoding and Decoding.

Figure 33:
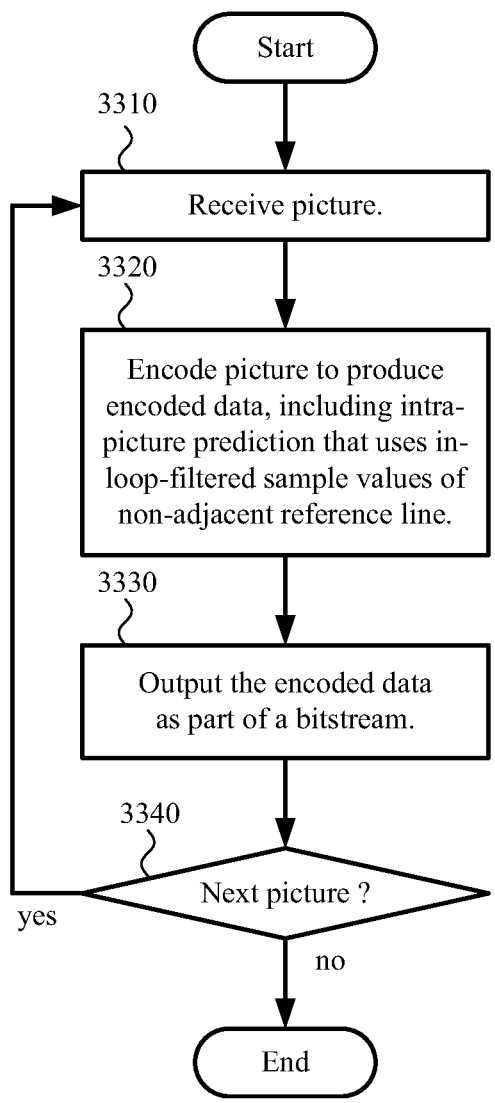
FIGS. 33 and 34 are flowcharts illustrating generalized techniques for encoding and decoding, respectively, using intra-picture prediction that uses in-loop-filtered reference sample values.

FIG. 33 shows a generalized technique (3300) for encoding that includes intra-picture prediction that uses in-loop-filtered sample values of a non-adjacent reference line. An encoder such as the video encoder (340) of FIG. 3, another video encoder, or an image encoder can perform the technique (3300).

The encoder receives (3310) a picture, encodes (3320) the picture to produce encoded data, and outputs (3330) the encoded data as part of a bitstream. As part of the encoding (3320), the encoder performs intra-picture prediction for a current block of sample values in the picture. A non-adjacent reference line of sample values is available for the intra-picture prediction. When it performs intra-picture prediction for the current block, the encoder selects the non-adjacent reference line of sample values for use in the intra-picture prediction for the current block. At least some of the sample values of the selected non-adjacent reference line have been modified by in-loop filtering prior to use in the intra-picture prediction for the current block. For the in-loop filtering, none of the modified sample values of the selected reference line is dependent on any of the sample values of the current block.

The encoder checks (3340) whether to continue with the next picture. If so, the encoder receives (3310) and encodes (3320) the next picture.

Figure 34:
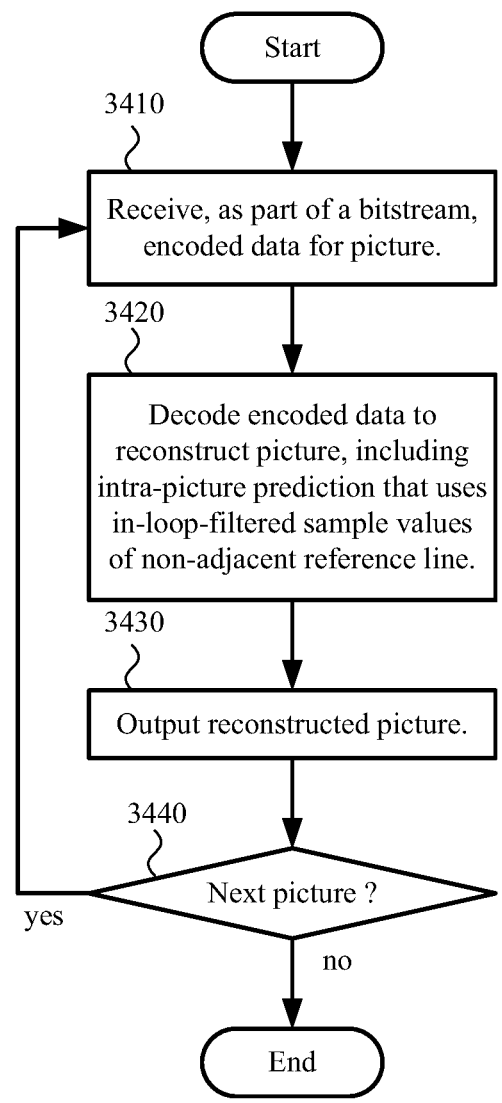

FIG. 34 shows a generalized technique (3400) for decoding that includes intra-picture prediction that uses in-loop-filtered sample values of a non-adjacent reference line. A decoder such as the video decoder (550) of FIG. 5, another video decoder, or an image decoder can perform the technique (3400).

The decoder receives (3410) encoded data as part of a bitstream, decodes (3420) the encoded data to reconstruct a picture, and outputs (3430) the reconstructed picture. As part of the decoding, the decoder performs intra-picture prediction for a current block of sample values in the picture. A non-adjacent reference line of sample values is available for the intra-picture prediction. When it performs intra-picture prediction for the current block, the encoder selects the non-adjacent reference line of sample values for use in the intra-picture prediction for the current block. At least some of the sample values of the selected non-adjacent reference line have been modified by in-loop filtering prior to use in the intra-picture prediction for the current block. For the in-loop filtering, none of the modified sample values of the selected reference line is dependent on any of the sample values of the current block.

The decoder checks (3440) whether to continue with the next picture. If so, the decoder receives (3410) encoded data for the next picture and decodes (3420) the encoded data for the next picture.

Instead of or in addition to selecting the non-adjacent reference line, the encoder or decoder can select another reference line of sample values for use in the intra-picture prediction for the current block. The selected other reference line can be between the selected non-adjacent reference line and the current block. For example, the selected other reference line is the adjacent reference line for the current block. In-loop filtering of the sample values of the selected other reference line may be dependent on at least some of the sample values of the current block. In this case, none of the sample values of the selected other reference line are modified by in-loop filtering prior to the intra-picture prediction for the current block using the selected other reference line.

G. Encoder-Side Decisions to Select Reference Lines.

This section describes examples of encoder-side decision-making approaches to select reference lines for intra-picture prediction. With the approaches, in a computationally efficient manner, an encoder can identify appropriate reference lines to use for intra-picture prediction. In general, the encoder receives a picture, encodes the picture to produce encoded data, and outputs the encoded data as part of a bitstream. As part of the encoding, the encoder performs intra-picture prediction for a current block of sample values in the picture. To select one or more reference lines for intra-picture prediction, the encoder follows one of the decision-making approaches described herein.

The approaches to making encoder-side decisions can be used in combination with one or more other innovations described herein when implemented during encoding.

1. First Approach to Making Encoder-Side Decisions.

Figure 35:
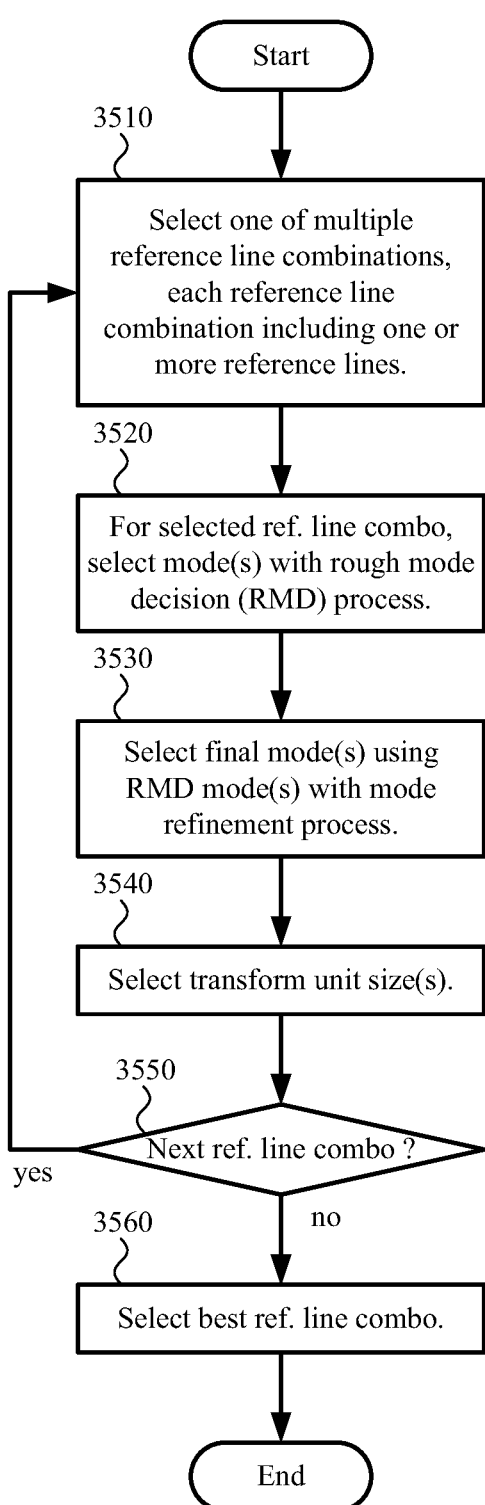
FIGS. 35-37 are flowcharts illustrating example techniques for selecting, during encoding, which reference lines to use for intra-picture prediction.

FIG. 35 shows a first example technique (3500) for selecting, during encoding, which reference lines to use for intra-picture prediction. An encoder such as the video encoder (340) of FIG. 3, another video encoder, or an image encoder can perform the technique (3500).

In the first approach, during encoding of a picture, the encoder selects a combination of one or more reference lines and one or more intra-picture prediction modes for a unit (e.g., a coding unit ("CU") or prediction unit ("PU")) of the picture. For example, for a CU, the encoder selects one or more reference line indices or a table index indicating which reference line(s) to use in intra-picture prediction for the CU, with one or more intra-picture prediction modes also signaled for the CU or its one or more PUs. In this case, the PU(s) and transform unit(s) ("TU(s)") of the CU all use the same reference line index, indices or table index. Or, as another example, for a PU, the encoder selects one or more reference line indices or a table index indicating which reference line(s) to use in intra-picture prediction for the PU, with one or more intra-picture prediction modes also signaled for the PU. In this case, the TU(s) associated with the PU all use the same reference line index, indices or table index.

To start, the encoder selects (3510) a combination of one or more reference lines ("reference line combination"). For example, the selected reference line combination is a single candidate reference line. Or, the selected reference line combination is multiple candidate reference lines.

With a rough mode decision ("RMD") process, the encoder selects (3520) one or more intra-picture prediction modes for the selected reference line combination. In general, the RMD process provides a coarse-grained decision about intra-picture prediction modes for the reference line combination under evaluation. The RMD process typically uses a cost measure that is not especially accurate but is simple to compute (e.g., sum of absolute transform differences ("SATD")). Alternatively, the encoder uses another type of cost measure in the RMD process. The RMD process may simplify evaluation by skipping evaluation of some intra-picture prediction modes. For example, the encoder evaluates only a subset of possible intra-picture prediction modes (e.g., every other mode, every third mode, or every fourth mode) in the RMD process.

Next, with a mode refinement process, the encoder selects (3530) one or more final intra-picture prediction modes for the selected reference line combination. In doing so, the encoder uses the intra-picture prediction mode(s) from the RMD process. In general, the mode refinement process provides a fine-grained decision about intra-picture prediction modes for the reference line combination under evaluation. The mode refinement process typically uses a cost measure that is accurate but complex to compute (e.g., rate-distortion cost). Alternatively, the encoder uses another type of cost measure in the mode refinement process. The mode refinement process may skip evaluation of some intra-picture prediction modes (e.g., if they are far from any of the mode(s) from the RMD process) but typically evaluates modes near the mode(s) from the RMD process. In some example implementations that permit variable-size TUs, TU size is kept fixed during the RMD process and mode refinement process.

Next, when TU size is variable, the encoder selects (3540) one or more TU sizes for the unit. In this stage, the encoder uses the final intra-picture prediction mode(s) selected in the mode refinement process for the selected reference line combination. Alternatively, the encoder selects TU size in a separate process.

The encoder checks (3550) whether to continue the decision-making process with another reference line combination. If so, the encoder selects (3510) another reference line combination for evaluation. In this way, the encoder iteratively evaluates different reference line combinations for the unit.

After evaluating all of the reference line combinations that it will evaluate, the encoder selects (3560) a best reference line combination among the multiple reference line combinations that were evaluated. For example, the encoder selects the reference line combination with lowest rate-distortion cost (considering the best intra-picture prediction mode(s) and TU sizes found when evaluating the respective reference line combinations).

2. Second Approach to Making Encoder-Side Decisions.

Figure 36:
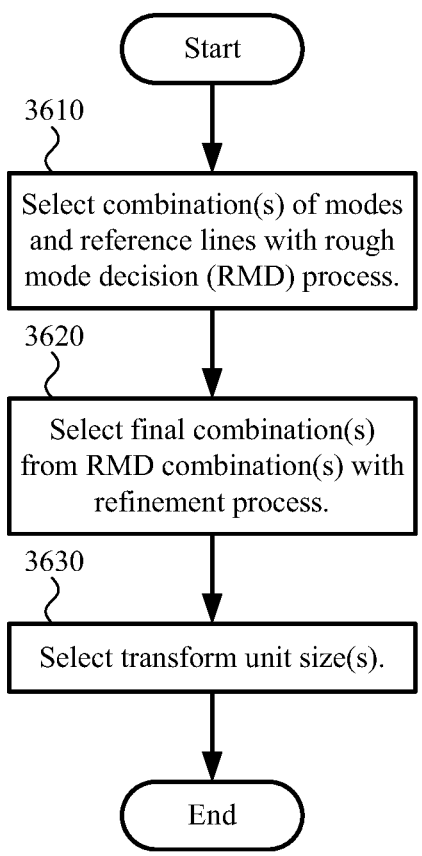

FIG. 36 shows a second example technique (3600) for selecting, during encoding, which reference lines to use for intra-picture prediction. An encoder such as the video encoder (340) of FIG. 3, another video encoder, or an image encoder can perform the technique (3600). Like the first approach, in the second approach, during encoding of a picture, the encoder selects a combination of one or more reference lines and one or more intra-picture prediction modes for a unit (e.g., CU or PU) of the picture. Unlike the first approach, different reference line combinations are not iteratively evaluated.

With a rough mode decision ("RMD") process, the encoder selects (3610) one or more combinations of intra-picture prediction modes and reference lines. Each of the one or more combinations from the RMD process includes a different pair of (a) one or more intra-picture prediction modes and (b) one or more reference lines. In general, the RMD process provides a coarse-grained decision about the combination under evaluation. The RMD process typically uses a cost measure that is not especially accurate but is simple to compute (e.g., SATD). Alternatively, the encoder uses another type of cost measure in the RMD process. The RMD process may simplify evaluation by skipping evaluation of some intra-picture prediction modes and/or some reference lines. For example, the encoder evaluates only a subset of possible intra-picture prediction modes (e.g., every other mode, every third mode, or every fourth mode) in the RMD process. Or, as another example, the encoder evaluates only a subset of possible reference lines (e.g., every other reference line) in the RMD process.

Next, with a mode refinement process, the encoder selects (3620) a final combination. In doing so, the encoder uses the combination(s) from the RMD process. In general, the mode refinement process provides a fine-grained decision about the combination(s) under evaluation. The mode refinement process typically uses a cost measure that is accurate but complex to compute (e.g., rate-distortion cost). Alternatively, the encoder uses another type of cost measure in the mode refinement process. For example, the mode refinement process selects a combination with lowest rate-distortion cost. The mode refinement process may skip evaluation of some intra-picture prediction modes and/or some reference lines (e.g., if they are far from any of the combination(s) from the RMD process), but typically evaluates modes and reference lines near the combination(s) from the RMD process. In some example implementations that permit variable-size TUs, TU size is kept fixed during the RMD process and mode refinement process.

Next, when TU size is variable, the encoder selects (3630) one or more TU sizes for the unit. In this stage, the encoder uses the final combination selected in the mode refinement process. Alternatively, the encoder selects TU size in a separate process.

In some example implementations, the second approach can be used for a CU whose partition size is 2N×2N (single PU for the CU). For a CU with another partition size, the encoder uses the first approach.

3. Third Approach to Making Encoder-Side Decisions.

Figure 37:
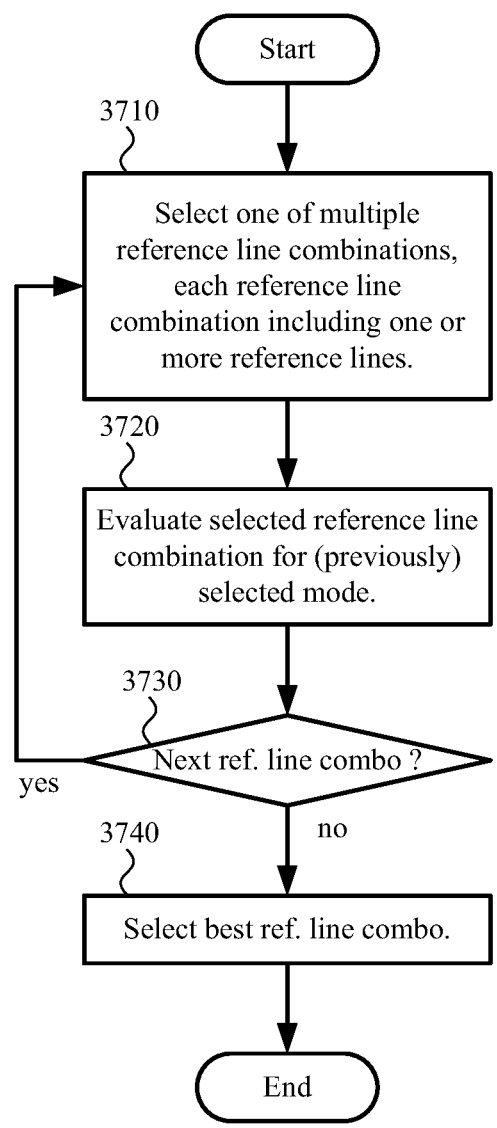

FIG. 37 shows a third example technique (3700) for selecting, during encoding, which reference lines to use for intra-picture prediction. An encoder such as the video encoder (340) of FIG. 3, another video encoder, or an image encoder can perform the technique (3700).

In the third approach, during encoding of a picture, the encoder selects a combination of one or more reference lines for a TU. For example, for a TU, the encoder selects one or more reference line indices or a table index indicating which reference lines to use in intra-picture prediction for the TU. (One or more intra-picture prediction modes are signaled for a PU associated with the TU.)

To start, the encoder selects (3710) a combination of one or more reference lines ("reference line combination"). For example, the selected reference line combination is a single candidate reference line. Or, the selected reference line combination is multiple candidate reference lines.

The encoder evaluates (3720) the selected reference line combination in conjunction with one or more intra-picture prediction modes that were previously selected (e.g., for a PU). For example, the encoder calculates a cost measure such as a rate-distortion cost when the selected reference line combination is used. Alternatively, the encoder uses another type of cost measure.

The encoder checks (3730) whether to continue the decision-making process with another reference line combination. If so, the encoder selects (3710) another reference line combination for evaluation. In this way, the encoder iteratively evaluates different reference line combinations for the TU.

After evaluating all of the reference line combinations that it will evaluate, the encoder selects (3740) a best reference line combination among the multiple reference line combinations that were evaluated. For example, the encoder selects the reference line combination with lowest rate-distortion cost. Or, as another example, the encoder selects the reference line combination with the lowest SATD. Or, the encoder uses another cost measure to select the best reference line combination.

H. Post-Filtering of Predicted Sample Values.

In some prior codec standards, an encoder and decoder can filter the predicted sample values of a current block using reference sample values of an adjacent reference line. Such post-filtering can be performed for certain intra-picture prediction modes (i.e., DC prediction mode, horizontal prediction mode, or vertical prediction mode).

This section describes examples of post-filtering of predicted sample values after intra-picture prediction. In particular, an encoder or decoder filters certain predicted sample values of a current block, using at least some sample values that are outside the current block and outside an adjacent reference line. By using reference sample values outside the adjacent reference line, in some cases, the filtering yields predicted sample values that are closer to the original sample values for the current block.

Post-filtering of predicted sample values can be used in combination with one or more other innovations described herein. For example, post-filtering of predicted sample values as described in this section can follow weighted prediction, residue compensation, filtering of reference sample values, mode-dependent padding, and/or use of in-loop-filtered reference sample values.

The post-filtering described in this section can be used when intra-picture prediction uses a non-adjacent reference line. The post-filtering described in this section can also be used when intra-picture prediction uses an adjacent reference line (e.g., in an encoder or decoder in which intra-picture prediction can only use reference sample values of an adjacent reference line).

1. Examples of Post-Filtering of Predicted Sample Values

Figure 38:
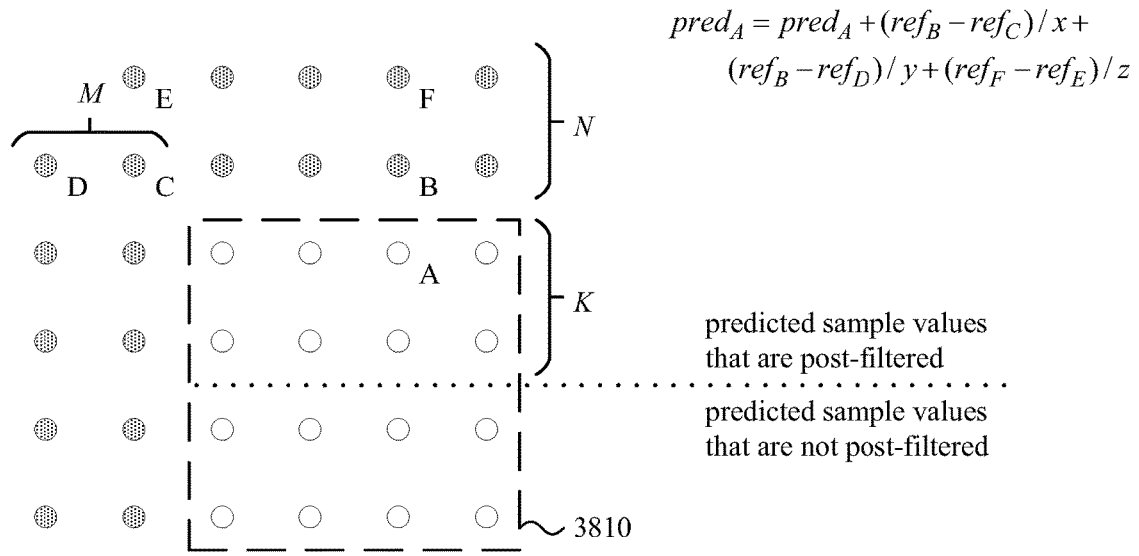
FIGS. 38 and 39 are diagrams illustrating examples of post-filtering of predicted sample values.

FIG. 38 shows an example (3800) of post-filtering of predicted sample values of a current block (3810) after horizontal intra-picture prediction. In the example (3800) of FIG. 38, the first K rows of the current block (3810) are post-filtered. The value of K depends on implementation. For example, K is 1, so the predicted sample values of the top row are post-filtered. Or, K is 2, and the predicted sample values of the top two rows are post-filtered. More generally, the value of K can depend on block size, with K increasing for larger blocks (e.g., K=1 or 2 for a 4×4 block; K=2 or 3 for an 8×8 block). The value of K can be pre-defined, in which case it is not signaled as part of encoded data in the bitstream. Alternatively, the value of K can change. In this case, the value of K can be signaled as part of encoded data in the bitstream (e.g., in an SPS, PPS, slice header or associated structure).

FIG. 38 shows post-filtering of a predicted sample value pred$_A$ at position A of the current block (3810), using reference sample values ref$_B$, ref$_C$, ref$_D$, ref$_E$, and ref$_F$ at positions B, C, D, E, and F, respectively. Positions B and F are in the same column as position A. Positions B, C and D are in the adjacent reference row, while positions E and F are in a non-adjacent reference row. Positions C and E are in the adjacent reference column, while position D is in a non-adjacent reference column. The values M and N control the distances between the positions of reference sample values used. The values of M and N depend on implementation. For example, M=N=1, as shown in FIG. 38. Alternatively, M and/or N have higher values. For example, the values of M and N can depend on block size, with M and/or N increasing for larger blocks. Instead of indicating distances between the positions of reference sample values used, M and N can indicate a number of gradients considered in post-filtering operations, with more gradients considered for higher values of M and N. The values of M and N can be pre-defined, in which case they are not signaled as part of encoded data in the bitstream. Alternatively, the values of M and N can change. In this case, the values of M and N can be signaled as part of encoded data in the bitstream (e.g., in an SPS, PPS, slice header or associated structure).

The predicted sample value at position A of the current block (3810) is calculated as: pred$_A$=pred$_A$+(ref$_B$−ref$_C$)/x+(ref$_B$−ref$_D$)/y+(ref$_F$−ref$_E$)/z, where x, y, and z are weights that depend on implementation. For example, x, y, and z are 2, 3, and 4. Alternatively, x, y, and z have other values. The values of x, y, and z can change depending on the block size of the current block (3810), e.g., as K increases. The weights x, y, and z can also change depending on position of sample value within the current block. For example, the weights are smaller (and hence weighting is more aggressive, since weights are only in the denominators) for the first row of post-filtered positions, and successively larger for later rows of post-filtered positions. More generally, the weights x, y, and z are smaller (and hence the weighting is more aggressive) if the sample values used to perform the post-filtering are closer to the positions being filtered in the current block (3810). The values of x, y, and z can be pre-defined, in which case they are not signaled as part of encoded data in the bitstream. Alternatively, the values of x, y, and z can change. In this case, the values of x, y, and z can be signaled as part of encoded data in the bitstream (e.g., in an SPS, PPS, slice header or associated structure).

The differences ref$_B$−ref$_C$, ref$_B$−ref$_D$, and ref$_F$−ref$_E$ indicate gradients between reference sample values outside the current block (3810). The gradients are parallel to the prediction direction of intra-picture prediction. Two of the gradients use sample values at positions (D, E, F) not adjacent to the current block (3810). Thus, even if intra-picture prediction uses only reference sample values of an adjacent reference line, sample values of one or more non-adjacent reference lines can be considered for the post-filtering operations.

Post-filtering of predicted sample values of a current block can also be performed after vertical intra-picture prediction. In this case, the first K columns of the current block are post-filtered, with K being defined as described with reference to FIG. 38. The gradients shown in FIG. 38 are transposed if the prediction direction is vertical, with corresponding changes to positions B, C, D, E, and F of reference sample values. Values for M, N, x, y, and z are defined as described with reference to FIG. 38.

Figure 39:
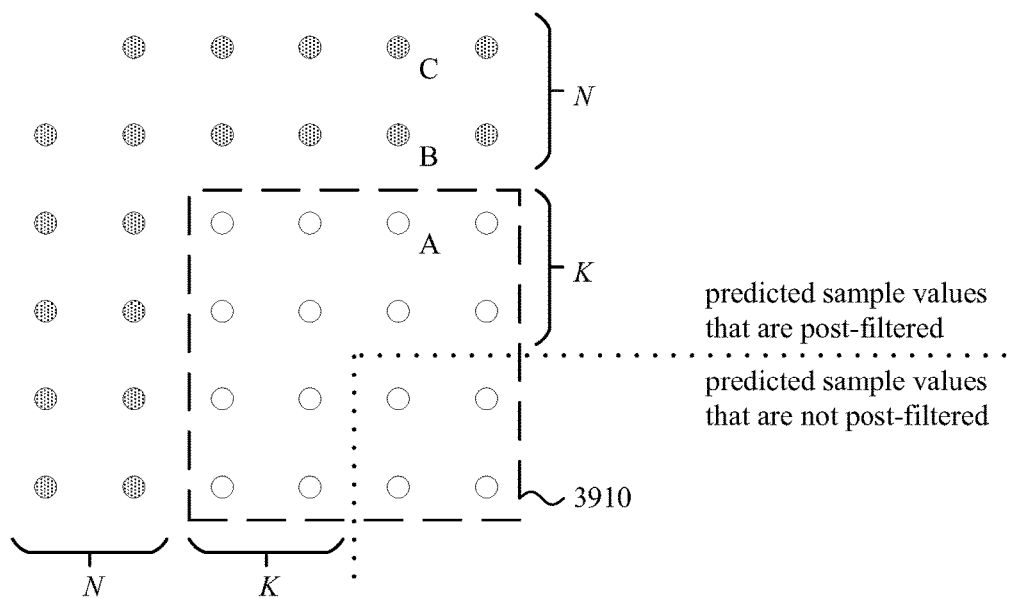

FIG. 39 shows an example (3900) of post-filtering of predicted sample values of a current block (3910) after intra-picture prediction with a non-directional prediction mode such as DC prediction mode or planar prediction mode. In the example (3900) of FIG. 39, the first K rows of the current block (3910) are post-filtered, and the first K columns of the current block (3910) are post-filtered. The value of K depends on implementation. For example, K is 1, so the predicted sample values of the top row and left column are post-filtered. Or, K is 2, and the predicted sample values of the top two rows and left two columns are post-filtered. More generally, the value of K can depend on block size, with K increasing for larger blocks (e.g., K=1 or 2 for a 4×4 block; K=2 or 3 for an 8×8 block). The value of K can be pre-defined, in which case it is not signaled as part of encoded data in the bitstream. Alternatively, the value of K can change. In this case, the value of K can be signaled as part of encoded data in the bitstream (e.g., in an SPS, PPS, slice header or associated structure).

FIG. 39 shows post-filtering of a predicted sample value pred$_A$ at position A of the current block (3910), using reference sample values ref$_B$ and ref$_C$ at positions B and C, respectively. Positions B and C are in the same column as position A. Position B is in the adjacent reference row, while position C is in a non-adjacent reference row. The value N controls the distance between the positions of reference sample values used in post-filtering. The value of N depends on implementation. For example, N=1, as shown in FIG. 39. Alternatively, N has a higher value. For example, the value of N can depend on block size, with N increasing for larger blocks. Instead of indicating distances between the positions of reference sample values used in post-filtering, the value of N can indicate a number of reference sample values considered in post-filtering operations, with more reference sample values considered for higher values of N. The value of N can be pre-defined, in which case it is not signaled as part of encoded data in the bitstream. Alternatively, the value of N can change. In this case, the value of N can be signaled as part of encoded data in the bitstream (e.g., in an SPS, PPS, slice header or associated structure).

The predicted sample value at position A of the current block (3910) is calculated as: pred$_A$=(x×pred$_A$+y×ref$_B$+z×ref$_C$)/(x+y+z), where x, y, and z are weights that depend on implementation. For example, x, y, and z are 5, 2, and 1. Alternatively, x, y, and z have other values. In general, the weights are larger (and hence weighting is more aggressive, since weights are in the numerator) for the position being filtered (position A) and for the reference sample value closer to the current block (3910). The values of x, y, and z can change depending on the block size of the current block (3910), e.g., as K increases. The weights x, y, and z can also change depending on position of sample value within the current block. For example, the weights are larger (and hence weighting is more aggressive) for the first row of post-filtered positions, and successively smaller for later rows of post-filtered positions. The values of x, y, and z can be pre-defined, in which case they are not signaled as part of encoded data in the bitstream. Alternatively, the values of x, y, and z can change. In this case, the values of x, y, and z can be signaled as part of encoded data in the bitstream (e.g., in an SPS, PPS, slice header or associated structure).

For post-filtering of predicted sample values in one of the first K columns of the current block (3910), the positions of reference sample values shown in FIG. 39 are transposed.

For a position of the current block (3910) that is in one of the first K columns of the current block (3910) and also in one of the first K rows of the current block (3910), either set of reference sample values (to the left or above) can be used for post-filtering, depending on implementation.

2. Examples of Post-Filtering of Predicted Sample Values During Encoding or Decoding.

Figure 40:
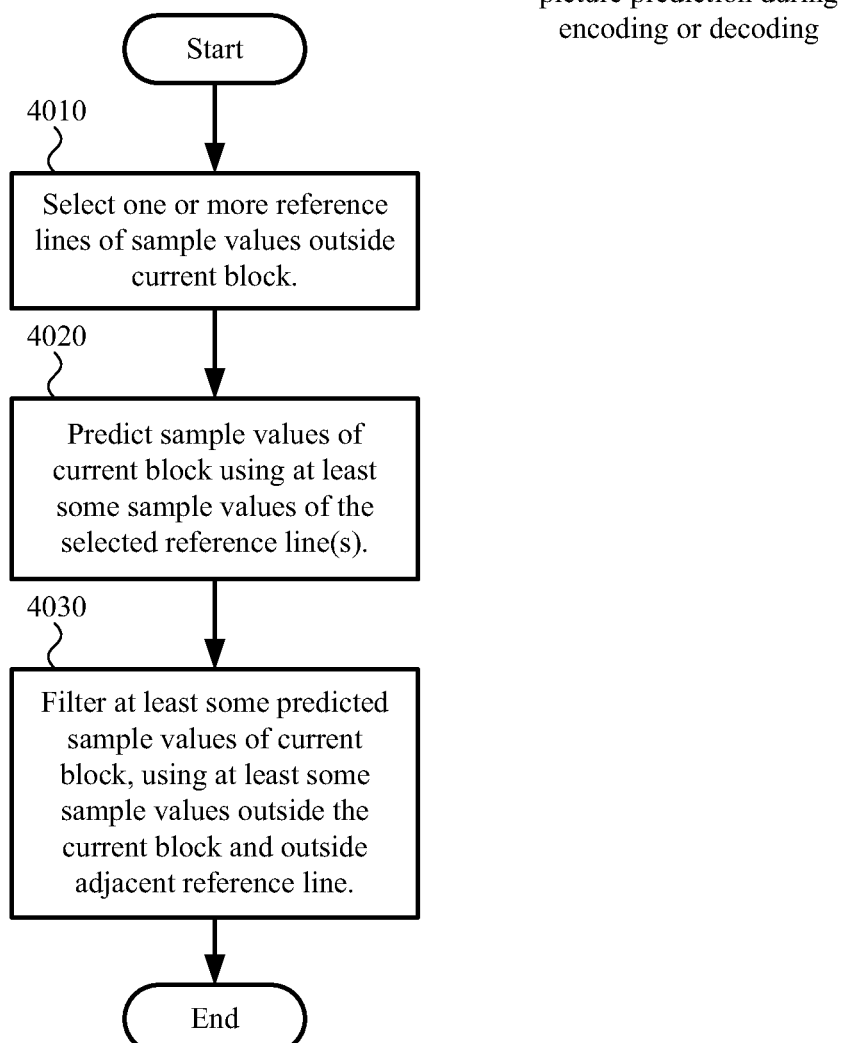
FIG. 40 is a flowchart illustrating a generalized technique for post-filtering of predicted sample values during encoding or decoding for a current block.

FIG. 40 shows a generalized technique (4000) for post-filtering of predicted sample values during encoding or decoding for a current block. An encoder such as the video encoder (340) of FIG. 3, another video encoder, or an image encoder can perform the technique (4000), for example, during the encoding (1420) described with reference to FIG. 14. Or, a decoder such as the video decoder (550) of FIG. 5, another video decoder, or an image decoder can perform the technique (4000), for example, during the decoding (1520) described with reference to FIG. 15. For the post-filtering shown in FIG. 40, the encoder or decoder performs intra-picture prediction for a current block of sample values in the picture. An adjacent reference line of sample values is available for the intra-picture prediction.

The encoder or decoder selects (4010) one or more reference lines of sample values outside the current block and predicts (4020) sample values of the current block using at least some sample values of the selected reference line(s). The encoder or decoder filters (4030) at least some of the predicted sample values of the current block. The filtering uses at least some sample values outside the current block and outside the adjacent reference line. The filtering can include various operations.

For example, for a given predicted sample value of the predicted sample values of the current block, the filtering includes computing one or more gradients between sample values outside the current block, and adjusting the given predicted sample value based on the gradient(s). The sample values that are used to compute the gradient(s) can depend on block size of the current block. The gradient(s) can be parallel to the prediction direction of the intra-picture prediction. A weight can be applied to each of the gradient(s), with the weighted gradient(s) being used in the adjusting. The weight(s) applied to the gradient(s) can depend on block size of the current block as well as position of the given predicted sample value in the current block. In some example implementations, such post-filtering operations are performed if the prediction direction is horizontal or vertical (see, e.g., FIG. 38) but not for other prediction directions.

As another example, for a given predicted sample value of the predicted sample values of the current block, the filtering includes adjusting the given predicted sample value based on one or more sample values outside the current block and outside the adjacent reference line. The sample value(s) that are used to adjust the given predicted sample value can depend on block size of the current block. A weight can be applied to each of the sample value(s) from outside the current block, with the weighted sample value(s) being used in the adjusting. The weight(s) applied to the sample value(s) can depend on block size of the current block as well as position of the given predicted sample value in the current block. In some example implementations, such post-filtering operations are performed if the intra-picture prediction mode is a non-directional prediction mode such as DC prediction mode or planar prediction mode (see, e.g., FIG. 39).

Returning to FIG. 40, the encoder or decoder can repeat the technique (4000) for other blocks of the picture.

I. Adaptive, Direction-Dependent Filtering of Reference Sample Values.

This section describes examples of adaptive, direction-dependent filtering of reference sample values used for intra-picture prediction. In some cases, such filtering yields reference sample values that provide more effective intra-picture prediction.

Adaptive, direction-dependent filtering of reference sample values can be used in combination with one or more other innovations described herein. For example, reference sample values can be filtered as described in this section before weighted prediction and/or residue compensation.

The filtering described in this section can be used when intra-picture prediction uses a non-adjacent reference line. The filtering described in this section can also be used when intra-picture prediction uses an adjacent reference line (e.g., in an encoder or decoder in which intra-picture prediction can only use reference sample values of an adjacent reference line).

1. Examples of Adaptive, Direction-Dependent Filtering

Figure 41:
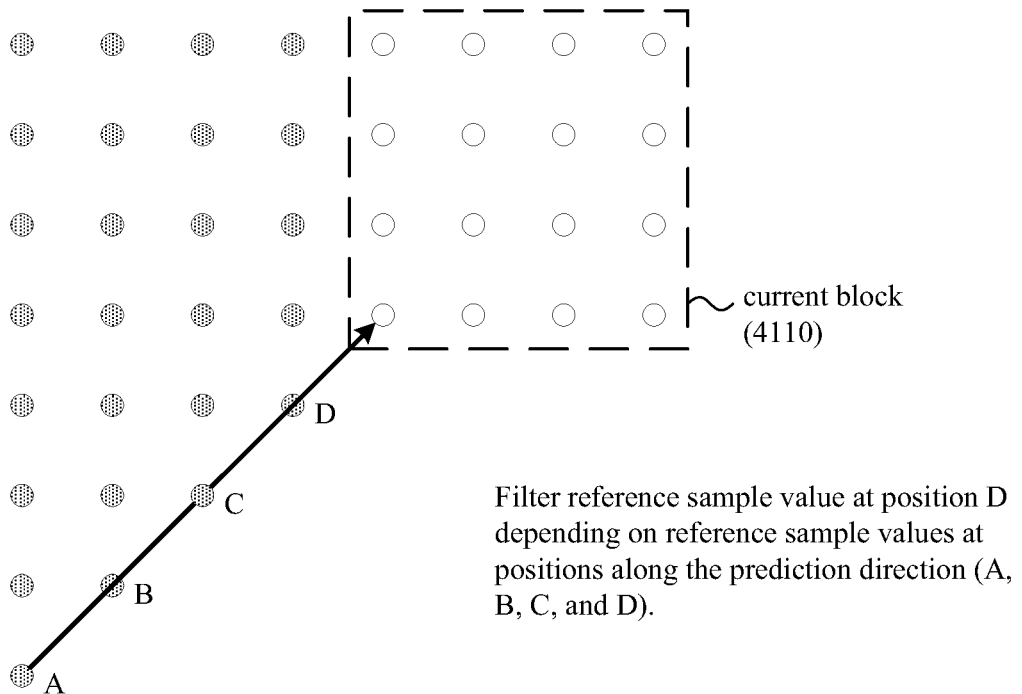
FIGS. 41 and 42 are diagrams illustrating examples of adaptive, direction-dependent filtering of reference sample values.

FIG. 41 shows an example (4100) of adaptive, direction-dependent filtering of reference sample values. Sample values of a current block (4110) are predicted using an intra-picture prediction mode having a prediction direction. The intra-picture prediction uses reference sample values in an adjacent reference column (reference line 0), including position D.

In FIG. 41, the reference sample value at position D is filtered. The filtering is adaptive, depending on the differences between reference sample values along the prediction direction. In particular, the filtering of the reference sample value at position D depends on the pattern of reference sample values at positions A, B, C, and D. For example, if there is no significant difference among reference sample values at positions A, B, and C, the reference sample value at position D is filtered by weighting the reference sample values at positions A, B, and C. The weights depend on implementation. For example, the weights applied at positions A, B, C, and D are 1, 2, 4, and 8, respectively. Alternatively, the weights have other values. In general, the weight is highest for a position to be filtered (position D in FIG. 41), and weights decrease for positions further away from the position to be filtered. As another example, if the reference sample values at positions A, B, C, and D vary monotonically (e.g., increasing along the prediction direction, or decreasing along the prediction direction), the reference value at position D is filtered as the average of the reference sample values at positions A, B, C, and D. Again, the weights depend on implementation. In general, when sample values vary monotonically, the weight for the position to be filtered is increased. Alternatively, the filtering of the reference sample value at position D follows another rule. In FIG. 41, the reference sample values along the prediction direction are at integer-sample offsets horizontally and vertically.

Figure 42:
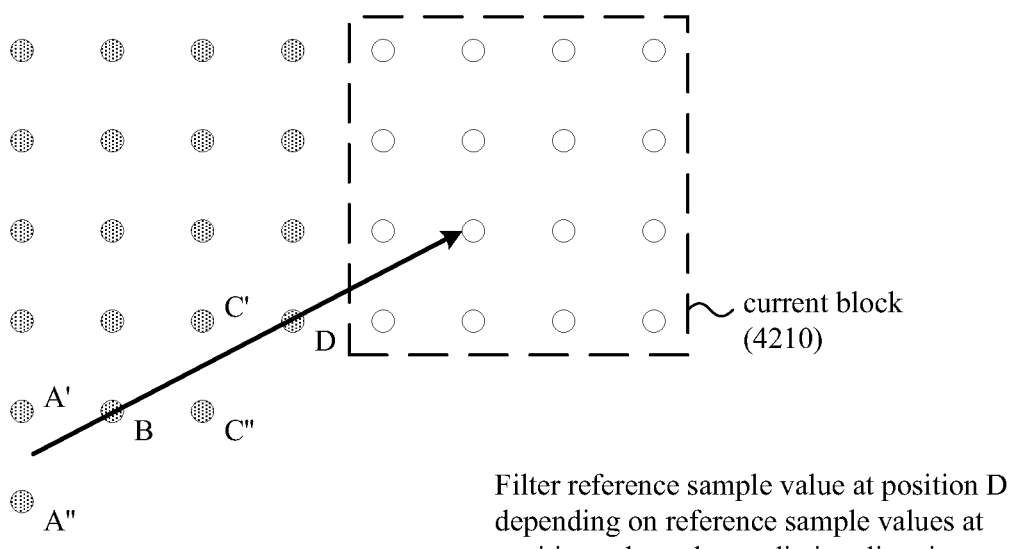

FIG. 42 shows another example (4200) of adaptive, direction-dependent filtering of reference sample values, in which some of the values along the prediction direction are at fractional-sample offsets. In FIG. 42, sample values of a current block (4210) are predicted using an intra-picture prediction mode having a prediction direction. The intra-picture prediction uses reference sample values in an adjacent reference column (reference line 0) that includes position D.

In FIG. 42, the reference sample value at position D is filtered. The filtering is adaptive, depending on the differences between reference sample values along the prediction direction. Some of the reference sample values along the prediction direction are at positions with fractional-sample offsets. A value, along the prediction direction, between positions A' and A" is calculated by interpolating (e.g., with bilinear interpolation) between the reference sample values at positions A' and A". Another value is similarly interpolated between the reference sample values at positions C' and C". The filtering of the reference sample value at position D depends on the pattern of values at the position between A' and A", position B, the position between C' and C", and position D. With respect to the pattern of values along the prediction direction, the filtering of the reference sample value at position D follows the same rules as the example (4100) of FIG. 41.

Adaptive, direction-dependent filtering can be performed for other intra-picture prediction modes having different prediction directions. The reference sample values filtered using adaptive, direction-dependent filtering can be part of an adjacent reference line or non-adjacent reference line.

2. Examples of Adaptive, Direction-Dependent Filtering During Encoding and Decoding.

FIG. 43 shows a generalized technique (4300) for adaptive, direction-dependent filtering of reference sample values during encoding or decoding for a current block. An encoder such as the video encoder (340) of FIG. 3, another video encoder, or an image encoder can perform the technique (4300), for example, during the encoding (1420) described with reference to FIG. 14. Or, a decoder such as the video decoder (550) of FIG. 5, another video decoder, or an image decoder can perform the technique (4300), for example, during the decoding (1520) described with reference to FIG. 15. After the filtering shown in FIG. 43, the encoder or decoder performs intra-picture prediction for a current block of sample values in the picture.

The encoder or decoder selects (4310) a reference line of sample values outside the current block. The encoder or decoder filters (4320) the selected reference line of sample values. The filtering adapts to differences in a set of sample values along a prediction direction for the intra-picture prediction. At least some of the set of sample values is outside the current block and outside an adjacent reference line. The set of sample values along the prediction direction can include reference sample values at integer-sample offsets horizontally and vertically (see, e.g., FIG. 41). The set of sample values along the prediction direction can also include interpolated values at fractional-sample offsets horizontally or vertically (see, e.g., FIG. 42).

Returning to FIG. 43, the encoder or decoder can repeat the technique (4300) for other blocks of the picture.

VI. Features.

Different embodiments may include one or more of the inventive features shown in the following table of features.

| # | Feature |
|---|---|
| | A. Residue Compensation in Intra-Picture Prediction |
| A1 | In a computer system that implements a video encoder or image encoder, a method comprising: receiving a picture; encoding the picture to produce encoded data, including performing intra-picture prediction for a current block of sample values in the picture, wherein a non-adjacent reference line of sample values is available for the intra-picture prediction, and wherein the performing intra-picture prediction for the current block includes performing residue compensation; and outputting the encoded data as part of a bitstream. |
| A2 | In a computer system that implements a video decoder or image decoder, a method comprising: receiving encoded data as part of a bitstream; decoding the encoded data to reconstruct a picture, including performing intra-picture prediction for a current block of sample values in the picture, wherein a non-adjacent reference line of sample values is available for the intra-picture prediction, and wherein the performing intra-picture prediction for the current block includes performing residue compensation; and outputting the reconstructed picture. |
| A3 | The method of A1 or A2, wherein the residue compensation includes, for a predicted sample value at a given position in the current block: calculating, at a given position in an offset region outside the current block, a residual value based on a difference between a reconstructed sample value at the given position in the offset region and a predicted sample value at the given position in the offset region; and using the residual value to adjust the predicted sample value at the given position in the current block. |
| A4 | The method of A3, wherein the residue compensation further includes, for the predicted sample value at the given position in the current block: applying a weight to the residual value to produce a weighted residual value, wherein the weighted residual value is used to adjust the predicted sample value at the given position in the current block. |
| A5 | The method of A4, wherein the weight depends on the given position in the current block. |
| A6 | The method of A5, wherein the weight further depends on one or more of: number of lines of sample values of the current block that are processed with the residue compensation; and prediction direction of the intra-picture prediction for the current block. |
| A7 | The method of A3, wherein the given position in the offset region is at a fractional-sample offset horizontally and/or vertically, and wherein the predicted sample value at the given position in the offset region and the reconstructed sample value at the given position in the offset region are interpolated values. |

| # | Feature |
|---|---|
| A8 | The method of A3, wherein the intra-picture prediction for the predicted sample value at the given position in the current block follows a prediction direction, wherein the residue compensation follows a residue compensation direction from the given position in the offset region to the given position in the current block, and wherein the residue compensation direction is orthogonal to the prediction direction. |
| A9 | The method of A3, wherein the intra-picture prediction for the predicted sample value at the given position in the current block follows a prediction direction, wherein the residue compensation follows a residue compensation direction from the given position in the offset region to the given position in the current block, and wherein the residue compensation direction is opposite the prediction direction. |
| A10 | The method of A3, wherein the intra-picture prediction for the predicted sample value at the given position in the current block follows a prediction direction, wherein the residue compensation follows a residue compensation direction from the given position in the offset region to the given position in the current block, and wherein the residue compensation direction is aligned with the prediction direction. |
| A11 | The method of A1 or A2, wherein the residue compensation includes, for a predicted sample value at a given position in the current block: calculating, at a first position in an offset region outside the current block, a first residual value based on a difference between a reconstructed sample value at the first position in the offset region and a predicted sample value at the first position in the offset region; calculating, at a second position in the offset region outside the current block, a second residual value based on a difference between a reconstructed sample value at the second position in the offset region and a predicted sample value at the second position in the offset region; and using the first residual value and the second residual value to adjust the predicted sample value at the given position in the current block. |
| A12 | One or more computer-readable media storing computer-executable instructions for causing a computer system, when programmed thereby, to perform operations of the method of any one of A1 to A11. |
| A13 | A computer system configured to perform operations of the method of any one of A1 and A3 to A11, the computer system comprising: a picture buffer configured to store the picture; a video encoder or image encoder configured to perform the encoding; and a coded data buffer configured to store the encoded data for output. |
| A14 | A computer system configured to perform operations of the method of any one of A2 to A11, the computer system comprising: a coded data buffer configured to store the encoded data; a video decoder or image decoder configured to perform the decoding; and a picture buffer configured to store the reconstructed picture for output. |
| | B. Filtering of Reference Lines in Intra-Picture Prediction |
| B1 | In a computer system that implements a video encoder or image encoder, a method comprising: receiving a picture; encoding the picture to produce encoded data, including performing intra-picture prediction for a current block of sample values in the picture, wherein a non-adjacent reference line of sample values is available for the intra-picture prediction, and wherein the performing intra-picture prediction includes: selecting one of multiple candidate reference lines of sample values outside the current block, the multiple candidate reference lines including the non-adjacent reference line of sample values; and filtering the selected reference line of sample values; and outputting the encoded data as part of a bitstream. |
| B2 | In a computer system that implements a video decoder or image decoder, a method comprising: receiving encoded data as part of a bitstream; decoding the encoded data to reconstruct a picture, including performing infra-picture prediction for a current block of sample values in the picture, wherein a non-adjacent reference line of sample values is available for the intra-picture prediction, and wherein the performing intra-picture prediction includes: selecting one of multiple candidate reference lines of sample values outside the current block, the multiple candidate reference lines including the non-adjacent reference line of sample values; and filtering the selected reference line of sample values; and outputting the reconstructed picture. |
| B3 | The method of B1 or B2, wherein the filtering uses a filter having a one-dimensional kernel that covers multiple sample values within the selected reference line. |
| B4 | The method of B3 wherein the one-dimensional kernel has three taps or five taps. |
| B5 | The method of B1 or B2, wherein the filtering uses a filter having a two-dimensional kernel that covers multiple sample values of the selected reference line and one or more sample values of each of one or more reference lines next to the selected reference line. |
| B6 | The method of B5 wherein the two-dimensional kernel has five taps in a cross pattern. |

| # | Feature |
|---|---|
| B7 | The method of B1 or B2, wherein the bitstream includes a filtering flag that indicates whether or not to perform the filtering, and wherein the performing intra-picture prediction further includes:<br>deciding to perform the filtering based at least in part on the filtering flag. |
| B8 | The method of B7, wherein the filtering flag is in the bitstream at syntax level of a sequence, picture, slice, coding unit, coding block, prediction unit, prediction block, transform unit, or transform block. |
| B9 | The method of B7, wherein the filtering flag is jointly signaled with a reference line index. |
| B10 | The method of B1 or B2, wherein the performing intra-picture prediction further includes:<br>deciding to perform the filtering based at least in part on one or more factors, the one or more factors including one or more of intra-picture prediction mode for the current block and block size of the current block. |
| B11 | One or more computer-readable media storing computer-executable instructions for causing a computer system, when programmed thereby, to perform operations of the method of any one of B1 to B10. |
| B12 | A computer system configured to perform operations of the method of any one of B1 and B3 to B10, the computer system comprising:<br>a picture buffer configured to store the picture;<br>a video encoder or image encoder configured to perform the encoding; and<br>a coded data buffer configured to store the encoded data for output. |
| B13 | A computer system configured to perform operations of the method of any one of B2 to B10, the computer system comprising:<br>a coded data buffer configured to store the encoded data;<br>a video decoder or image decoder configured to perform the decoding; and<br>a picture buffer configured to store the reconstructed picture for output. |
| | C. Weighted Prediction in Intra-Picture Prediction |
| C1 | In a computer system that implements a video encoder or image encoder, a method comprising:<br>receiving a picture;<br>encoding the picture to produce encoded data, including performing intra-picture prediction for a current block of sample values in the picture, wherein a non-adjacent reference line of sample values is available for the intra-picture prediction, and wherein the performing intra-picture prediction includes performing weighted prediction of the sample values of the current block using multiple reference lines of sample values, the multiple reference lines including the non-adjacent reference line of sample values; and<br>outputting the encoded data as part of a bitstream. |
| C2 | In a computer system that implements a video decoder or image decoder, a method comprising:<br>receiving encoded data as part of a bitstream;<br>decoding the encoded data to reconstruct a picture, including performing intra-picture prediction for a current block of sample values in the picture, wherein a non-adjacent reference line of sample values is available for the intra-picture prediction, and wherein the performing intra-picture prediction includes performing weighted prediction of the sample values of the current block using multiple reference lines of sample values, the multiple reference lines including the non-adjacent reference line of sample values; and<br>outputting the reconstructed picture. |
| C3 | The method of C1 or C2, wherein the weighted prediction includes, for a given position in the current block:<br>for each of the multiple reference lines:<br>generating an intermediate predicted sample value at the given position using at least one sample value of that reference line; and<br>applying a weight to the intermediate predicted sample value at the given position to produce a weighted sample value at the given position; and<br>combining the weighted sample values at the given position to produce a final predicted sample value at the given position in the current block. |
| C4 | The method of C3, wherein the generating and the applying are performed on a reference line-by-reference line basis for all sample values of the current block. |
| C5 | The method of C1 or C2, wherein each of the multiple reference lines has a weight associated with that reference line. |
| C6 | The method of C5, wherein, the multiple reference lines further include an adjacent reference line of sample values, and wherein the weights for the non-adjacent reference line and adjacent reference line are pre-defined and not signaled in the bitstream. |
| C7 | The method of C5, wherein the weights for the multiple reference lines are signaled in the bitstream. |
| C8 | The method of C1 or C2, wherein multiple candidate reference lines of sample values include the multiple reference lines used for the weighted prediction, wherein a weight table includes a non-zero weight for each of the multiple reference lines used for the intra-picture prediction and includes a zero weight for any other reference line of the multiple candidate reference lines. |
| C9 | The method of C8, wherein the weight table is signaled as part of the encoded data. |
| C10 | The method of C8, wherein an identifier of the weight table is signaled as part of the encoded data. |

| # | Feature |
|---|---|
| C11 | The method of C1 or C2, wherein weights for the multiple reference lines are defined at block level for the current block. |
| C12 | The method of C1 or C2, wherein weights for the multiple reference lines are defined for individual sample values of the current block. |
| C13 | The method of C1 or C2, wherein, for the weighted prediction of the sample values of the current block, an intra-picture prediction mode is specified for the current block. |
| C14 | The method of C1 or C2, wherein, for the weighted prediction of the sample values of the current block, an intra-picture prediction mode is specified for each of the multiple reference lines. |
| C15 | One or more computer-readable media storing computer-executable instructions for causing a computer system, when programmed thereby, to perform operations of the method of any one of C1 to C14. |
| C16 | A computer system configured to perform operations of the method of any one of C1 and C3 to C14, the computer system comprising:<br>a picture buffer configured to store the picture;<br>a video encoder or image encoder configured to perform the encoding; and<br>a coded data buffer configured to store the encoded data for output. |
| C17 | A computer system configured to perform operations of the method of any one of C2 to C14, the computer system comprising:<br>a coded data buffer configured to store the encoded data;<br>a video decoder or image decoder configured to perform the decoding; and<br>a picture buffer configured to store the reconstructed picture for output. |
| | D. Mode-Dependent Padding in Intra-Picture Prediction |
| D1 | In a computer system that implements a video encoder or image encoder, a method comprising:<br>receiving a picture;<br>encoding the picture to produce encoded data, including performing intra-picture prediction for a current block of sample values in the picture, wherein a non-adjacent reference line of sample values is available for the intra-picture prediction, wherein the performing intra-picture prediction includes performing mode-dependent padding to replace one or more unavailable reference sample values; and<br>outputting the encoded data as part of a bitstream. |
| D2 | In a computer system that implements a video decoder or image decoder, a method comprising:<br>receiving encoded data as part of a bitstream;<br>decoding the encoded data to reconstruct a picture, including performing intra-picture prediction for a current block of sample values in the picture, wherein a non-adjacent reference line of sample values is available for the intra-picture prediction, and wherein the performing intra-picture prediction includes performing mode-dependent padding to replace one or more unavailable reference sample values; and<br>outputting the reconstructed picture. |
| D3 | The method of D1 or D2, wherein the mode-dependent padding includes:<br>selecting one of multiple candidate reference lines of sample values outside the current block, the multiple candidate reference lines including the non-adjacent reference line of sample values;<br>determining that a sample value of the selected reference line is unavailable at a given position of the selected reference line;<br>identifying a padding direction of an intra-picture prediction mode;<br>determining a sample value available on another reference line on a projection through the given position of the selected reference line in the padding direction; and<br>using the determined sample value as the unavailable sample value at the given position of the selected reference line. |
| D4 | The method of D3, wherein the determining the sample value of another reference line includes evaluating positions of one or more candidate reference lines, in order of increasing distance away from the given position of the selected reference line, until an available sample value is determined in one of the multiple candidate reference lines along the projection in the padding direction. |
| D5 | The method of D4, wherein the available sample value is:<br>available, without padding, at an integer-sample offset horizontally and vertically in one of the multiple candidate reference lines; or<br>derived by interpolation from sample values available, without padding, at integer-sample offsets horizontally and vertically in one of the multiple candidate reference lines. |
| D6 | The method of D3, wherein the determining the sample value of another reference line includes interpolating a sample value at a fractional-sample offset horizontally and/or vertically in the other reference line. |
| D7 | The method of D3, wherein:<br>if the intra-picture prediction mode is an angular mode having a prediction direction, the padding direction is the prediction direction of the intra-picture prediction mode; and<br>otherwise, if the intra-picture prediction mode is DC mode or planar mode, the padding direction is horizontal or vertical. |

| # | Feature |
|---|---|
| D8 | The method of D1 or D2, wherein the mode-dependent padding includes:<br>determining that a sample value of the non-adjacent reference line is unavailable at a given position of the non-adjacent reference line;<br>identifying a padding direction of an intra-picture prediction mode;<br>determining a sample value, if any, of another reference line on a projection through the given position of the non-adjacent reference line in the padding direction;<br>if no sample value of another reference line is determined, determining a sample value that is available at another position of the non-adjacent reference line; and<br>using the determined sample value as the unavailable sample value at the given position of the non-adjacent reference line. |
| D9 | One or more computer-readable media storing computer-executable instructions for causing a computer system, when programmed thereby, to perform operations of the method of any one of D1 to D8. |
| D10 | A computer system configured to perform operations of the method of any one of D1 and D3 to D8 the computer system comprising:<br>a picture buffer configured to store the picture;<br>a video encoder or image encoder configured to perform the encoding; and<br>a coded data buffer configured to store the encoded data for output. |
| D11 | A computer system configured to perform operations of the method of any one of D2 to D10, the computer system comprising:<br>a coded data buffer configured to store the encoded data;<br>a video decoder or image decoder configured to perform the decoding; and<br>a picture buffer configured to store the reconstructed picture for output. |
| | E. Intra-Picture Prediction with In-Loop-Filtered Reference Sample Values |
| E1 | In a computer system that implements a video encoder or image encoder, a method comprising:<br>receiving a picture;<br>encoding the picture to produce encoded data, including performing intra-picture prediction for a current block of sample values in the picture, wherein a non-adjacent reference line of sample values is available for the intra-picture prediction, wherein the performing intra-picture prediction includes selecting the non-adjacent reference line of sample values for use in the intra-picture prediction for the current block, and wherein at least some of the sample values of the selected non-adjacent reference line have been modified by in-loop filtering prior to use in the intra-picture prediction for the current block; and<br>outputting the encoded data as part of a bitstream. |
| E2 | In a computer system that implements a video decoder or image decoder, a method comprising:<br>receiving encoded data as part of a bitstream;<br>decoding the encoded data to reconstruct a picture, including performing intra-picture prediction for a current block of sample values in the picture, wherein a non-adjacent reference line of sample values is available for the intra-picture prediction, wherein the performing intra-picture prediction includes selecting the non-adjacent reference line of sample values for use in the intra-picture prediction for the current block, and wherein at least some of the sample values of the selected non-adjacent reference line have been modified by in-loop filtering prior to use in the intra-picture prediction for the current block; and<br>outputting the reconstructed picture. |
| E3 | The method of E1 or E2, wherein, for the in-loop filtering, none of modified the sample values of the selected non-adjacent reference line is dependent on any of the sample values of the current block. |
| E4 | The method of E1 or E2, wherein the performing intra-picture prediction further includes:<br>selecting another reference line of sample values for use in the intra-picture prediction for the current block, wherein none of the sample values of the selected other reference line have been modified by in-loop filtering prior to the intra-picture prediction for the current block using the selected other reference line. |
| E5 | The method of E4, wherein the selected other reference line is between the selected non-adjacent reference line and the current block. |
| E6 | The method of E4, wherein in-loop filtering of the sample values of the selected other reference line is dependent on at least some of the sample values of the current block. |
| E7 | One or more computer-readable media storing computer-executable instructions for causing a computer system, when programmed thereby, to perform operations of the method of any one of E1 to E6. |
| E8 | A computer system configured to perform operations of the method of any one of E1 and E3 to E6 the computer system comprising:<br>a picture buffer configured to store the picture;<br>a video encoder or image encoder configured to perform the encoding; and<br>a coded data buffer configured to store the encoded data for output. |
| E9 | A computer system configured to perform operations of the method of any one of E2 to E6, the computer system comprising:<br>a coded data buffer configured to store the encoded data;<br>a video decoder or image decoder configured to perform the decoding; and<br>a picture buffer configured to store the reconstructed picture for output. |

| # | Feature |
|---|---|
| | F. Encoder-Side Decisions to Select Reference Line(s) for Intra-Picture Prediction |
| F1 | In a computer system that implements a video encoder or image encoder, a method comprising:<br>receiving a picture;<br>encoding the picture to produce encoded data, including performing intra-picture prediction for a current block of sample values in the picture, wherein the encoding includes, for a unit of the picture:<br>for each of multiple reference line combinations of one or more reference lines:<br>selecting, with a rough mode decision (RMD) process, one or more intra-picture prediction modes for the reference line combination; and<br>selecting, with a mode refinement decision process, one or more final intra-picture prediction modes for the reference line combination using the one or more intra-picture prediction modes from the RMD process; and<br>selecting a best reference line combination among the multiple reference line combinations; and<br>outputting the encoded data as part of a bitstream. |
| F2 | In a computer system that implements a video encoder or image encoder, a method comprising:<br>receiving a picture;<br>encoding the picture to produce encoded data, including performing intra-picture prediction for a current block of sample values in the picture, wherein the encoding includes, for a unit of the picture:<br>selecting, with a rough mode decision (RMD) process, one or more combinations of modes and reference lines, each of the one or more combinations from the RMD process including a different pair of one or more intra-picture prediction modes and one or more reference lines; and<br>selecting, with a mode refinement decision process, a final combination using the one or more combinations from the RMD process; and<br>outputting the encoded data as part of a bitstream. |
| F3 | The method of F1 or F2, wherein the encoding further includes:<br>selecting one or more transform sizes for the unit. |
| F4 | The method of F1 or F2, wherein the unit is a coding unit or prediction unit. |
| F5 | The method of F1 or F2, wherein the RMD process uses sum of absolute transform differences as a cost measure and includes evaluation of a subset of possible intra-picture prediction modes. |
| F6 | The method of F1 or F2, wherein the mode refinement decision process uses rate-distortion cost as a cost measure. |
| F7 | In a computer system that implements a video encoder or image encoder, a method comprising:<br>receiving a picture;<br>encoding the picture to produce encoded data, including performing intra-picture prediction for a current block of sample values in the picture, wherein the encoding includes, for a transform unit of the picture:<br>for each of multiple reference line combinations of one or more reference lines, evaluating the reference line combination for a previously selected intra-picture prediction mode; and<br>selecting a best reference line combination among the multiple reference line combinations; and<br>outputting the encoded data as part of a bitstream. |
| F8 | One or more computer-readable media storing computer-executable instructions for causing a computer system, when programmed thereby, to perform operations of the method of any one of F1 to F7. |
| F9 | A computer system configured to perform operations of the method of any one of F1 to F7 the computer system comprising:<br>a picture buffer configured to store the picture;<br>a video encoder or image encoder configured to perform the encoding; and<br>a coded data buffer configured to store the encoded data for output. |
| | G. Post-Filtering of Predicted Sample Values in Intra-Picture Prediction |
| G1 | In a computer system that implements a video encoder or image encoder, a method comprising:<br>receiving a picture;<br>encoding the picture to produce encoded data, including performing intra-picture prediction for a current block of sample values in the picture, wherein an adjacent reference line of sample values is available for the intra-picture prediction, and wherein the performing intra-picture prediction includes:<br>selecting one or more reference lines of sample values outside the current block;<br>predicting the sample values of the current block using at least some sample values of the one or more selected reference lines; and<br>filtering at least some of the predicted sample values of the current block, wherein the filtering uses at least some sample values outside the current block and outside the adjacent reference line; and<br>outputting the encoded data as part of a bitstream. |

| # | Feature |
|---|---|
| G2 | In a computer system that implements a video decoder or image decoder, a method comprising:<br>receiving encoded data as part of a bitstream;<br>decoding the encoded data to reconstruct a picture, including performing intra-picture prediction for a current block of sample values in the picture, wherein an adjacent reference line of sample values is available for the intra-picture prediction, and wherein the performing intra-picture prediction includes:<br>selecting one or more reference lines of sample values outside the current block;<br>predicting the sample values of the current block using at least some sample values of the one or more selected reference lines; and<br>filtering at least some of the predicted sample values of the current block, wherein the filtering uses at least some sample values outside the current block and outside the adjacent reference line; and<br>outputting the reconstructed picture. |
| G3 | The method of G1 or G2, wherein the filtering includes, for a given predicted sample value of the predicted sample values of the current block:<br>computing one or more gradients between sample values outside the current block: and<br>adjusting the given predicted sample value based on the one or more gradients. |
| G4 | The method of G3, wherein the filtering further includes, for the given predicted sample value:<br>applying a weight to each of the one or more gradients, wherein the one or more weighted gradients are used in the adjusting. |
| G5 | The method of G4, wherein the one or more weights depend on block size of the current block and position of the given predicted sample value in the current block. |
| G6 | The method of G3, wherein the sample values that are used to compute the one or more gradients depend on block size of the current block. |
| G7 | The method of G3, wherein the intra-picture prediction has a prediction direction, and wherein the one or more gradients are parallel to the prediction direction. |
| G8 | The method of G1 or G2, wherein the filtering includes, for a given predicted sample value of the predicted sample values of the current block:<br>adjusting the given predicted sample value based on one or more sample values outside the current block and outside the adjacent reference line. |
| G9 | The method of G8, wherein the filtering further includes, for the given predicted sample value:<br>applying a weight to each of the one or more sample values used in the adjusting. |
| G10 | The method of G9, wherein the one or more weights depend on block size of the current block and position of the given predicted sample value in the current block. |
| G11 | The method of G9, wherein the one or more sample values used in the adjusting depend on block size of the current block. |
| G12 | One or more computer-readable media storing computer-executable instructions for causing a computer system, when programmed thereby, to perform operations of the method of any one of G1 to G11. |
| G13 | A computer system configured to perform operations of the method of any one of G1 and G3 to G11 the computer system comprising:<br>a picture buffer configured to store the picture;<br>a video encoder or image encoder configured to perform the encoding; and<br>a coded data buffer configured to store the encoded data for output. |
| G14 | A computer system configured to perform operations of the method of any one of G2 to G11, the computer system comprising:<br>a coded data buffer configured to store the encoded data;<br>a video decoder or image decoder configured to perform the decoding; and<br>a picture buffer configured to store the reconstructed picture for output. |
| | H. Adaptive, Direction-Dependent Filtering of Reference Sample Values |
| H1 | In a computer system that implements a video encoder or image encoder, a method comprising:<br>receiving a picture;<br>encoding the picture to produce encoded data, including performing intra-picture prediction for a current block of sample values in the picture, wherein the performing intra-picture prediction includes:<br>selecting a reference line of sample values outside the current block; and<br>filtering the selected reference line of sample values, wherein the filtering adapts to differences in a set of sample values along a prediction direction for the intra-picture prediction, at least some of the set of sample values being outside the current block and outside an adjacent reference line; and<br>outputting the encoded data as part of a bitstream. |

| # | Feature |
|---|---|
| H2 | In a computer system that implements a video decoder or image decoder, a method comprising:<br>receiving encoded data as part of a bitstream;<br>decoding the encoded data to reconstruct a picture, including performing intra-picture prediction for a current block of sample values in the picture, wherein the performing intra-picture prediction includes:<br>selecting a reference line of sample values outside the current block; and<br>filtering the selected reference line of sample values, wherein the filtering adapts to differences in a set of sample values along a prediction direction for the intra-picture prediction, at least some of the set of sample values being outside the current block and outside an adjacent reference line; and<br>outputting the reconstructed picture. |
| H3 | The method of H1 or H2, wherein the set of sample values along the prediction direction are at integer-sample offsets horizontally and vertically. |
| H4 | The method of H1 or H2, wherein at least some of the set of sample values along the prediction direction are interpolated values at fractional-sample offsets horizontally or vertically. |
| H5 | One or more computer-readable media storing computer-executable instructions for causing a computer system,when programmed thereby, to perform operations of the method of any one of H1 to H4. |
| H6 | A computer system configured to perform operations of the method of any one of H1 and H3 to H4 the computer system comprising:<br>a picture buffer configured to store the picture;<br>a video encoder or image encoder configured to perform the encoding; and<br>a coded data buffer configured to store the encoded data for output. |
| H7 | A computer system configured to perform operations of the method of any one of H2 to H4, the computer system comprising:<br>a coded data buffer configured to store the encoded data;<br>a video decoder or image decoder configured to perform the decoding; and<br>a picture buffer configured to store the reconstructed picture for output. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising:
a picture buffer configured to store a picture;
a video encoder configured to perform operations to encode the picture, thereby producing encoded data, the operations including performing intra-picture prediction for a current block of sample values in the picture, wherein a non-adjacent reference line of sample values is available for the intra-picture prediction for the current block, and wherein the performing the intra-picture prediction for the current block includes:
selecting one of multiple candidate reference lines of sample values outside the current block, the multiple candidate reference lines including the non-adjacent reference line of sample values; and
filtering the selected reference line of sample values; and
a coded data buffer configured to store the encoded data for output as part of a bitstream.

2. The computer system of claim 1, wherein the filtering uses a filter having a one-dimensional kernel that covers multiple sample values within the selected reference line.

3. The computer system of claim 2, wherein the one-dimensional kernel has three taps.

4. The computer system of claim 3, wherein the one-dimensional kernel is a symmetric low-pass filter having a normalization factor of 4.

5. The computer system of claim 1, wherein the performing the intra-picture prediction for the current block further includes deciding to perform the filtering based at least in part on one or more factors, the one or more factors including intra-picture prediction mode for the current block.

6. The computer system of claim 1, wherein the performing the intra-picture prediction for the current block further includes deciding to perform the filtering based at least in part on one or more factors, the one or more factors including block size of the current block.

7. The computer system of claim 1, wherein the performing the intra-picture prediction for the current block further includes predicting the sample values of the current block using at least some sample values of the filtered reference line of sample values.

8. The computer system of claim 7, wherein the performing the intra-picture prediction for the current block further includes one or more of:
performing padding to replace one or more unavailable reference sample values in the selected reference line;
performing residue compensation; and
performing weighted prediction.

9. In a computer system that implements a video decoder, a method comprising:
receiving encoded data as part of a bitstream;
decoding the encoded data, thereby reconstructing a picture, including performing intra-picture prediction for a current block of sample values in the picture, wherein a non-adjacent reference line of sample values is available for the intra-picture prediction for the current block, and wherein the performing the intra-picture prediction for the current block includes:
selecting one of multiple candidate reference lines of sample values outside the current block, the multiple candidate reference lines including the non-adjacent reference line of sample values; and
filtering the selected reference line of sample values; and
outputting the reconstructed picture.

10. The method of claim 9, wherein the filtering uses a filter having a one-dimensional kernel that covers multiple sample values within the selected reference line.

11. The method of claim 10, wherein the one-dimensional kernel has three taps.

12. The method of claim 11, wherein the one-dimensional kernel is a symmetric low-pass filter having a normalization factor of 4.

13. The method of claim 9, wherein the performing the intra-picture prediction for the current block further includes deciding to perform the filtering based at least in part on one or more factors, the one or more factors including intra-picture prediction mode for the current block.

14. The method of claim 9, wherein the performing the intra-picture prediction for the current block further includes deciding to perform the filtering based at least in part on one or more factors, the one or more factors including block size of the current block.

15. The method of claim 9, wherein the performing the intra-picture prediction for the current block further includes predicting the sample values of the current block using at least some sample values of the filtered reference line of sample values.

16. The method of claim 15, wherein the performing the intra-picture prediction for the current block further includes one or more of:
   performing padding to replace one or more unavailable reference sample values in the selected reference line;
   performing residue compensation; and
   performing weighted prediction.

17. One or more computer-readable media having stored thereon encoded data in a bitstream, the encoded data having been produced by a video encoder performing operations comprising:
   receiving a picture;
   encoding the picture, thereby producing the encoded data, including performing intra-picture prediction for a current block of sample values in the picture, wherein a non-adjacent reference line of sample values is available for the intra-picture predicition for the current block, and wherein the performing the intra-picture prediction for the current block includes:
      selecting one of multiple candidate reference lines of sample values outside the current block, the multiple candidate reference lines including the non-adjacent reference line of sample values; and
      filtering the selected reference line of sample values; and
   outputting the encoded data as part of the bitstream.

18. The one or more computer-readable media of claim 17, wherein the filtering uses a filter having a one-dimensional kernel that covers multiple sample values within the selected reference line.

19. The one or more computer-readable media of claim 18, wherein the one-dimensional kernel has three taps.

20. The one or more computer-readable media of claim 19, wherein the one-dimensional kernel is a symmetric low-pass filter having a normalization factor of 4.

* * * * *